United States Patent
Date et al.

(10) Patent No.: US 7,890,556 B2
(45) Date of Patent: Feb. 15, 2011

(54) CONTENT RECORDING APPARATUS, CONTENT PLAYBACK APPARATUS, CONTENT PLAYBACK SYSTEM, IMAGE CAPTURING APPARATUS, PROCESSING METHOD FOR THE CONTENT RECORDING APPARATUS, THE CONTENT PLAYBACK APPARATUS, THE CONTENT PLAYBACK SYSTEM, AND THE IMAGE CAPTURING APPARATUS, AND PROGRAM

(75) Inventors: Osamu Date, Tokyo (JP); Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 504 days.

(21) Appl. No.: 12/053,072

(22) Filed: Mar. 21, 2008

(65) Prior Publication Data
US 2008/0250037 A1 Oct. 9, 2008

(30) Foreign Application Priority Data
Apr. 4, 2007 (JP) ............................. 2007-098100
May 22, 2007 (JP) ............................. 2007-134947

(51) Int. Cl.
*G06F 12/00* (2006.01)

(52) U.S. Cl. ..................... 707/831; 707/778; 707/914; 707/915; 711/117

(58) Field of Classification Search .............. 396/229, 396/1; 700/94; 715/500.1; 707/778, 829, 707/831, 914, 915; 711/117, 171
See application file for complete search history.

(56) References Cited

U.S. PATENT DOCUMENTS

| | | | | |
|---|---|---|---|---|
| 5,586,633 A | * | 12/1996 | Mizukami et al. | 192/70.252 |
| 2002/0064074 A1 | * | 5/2002 | Kamise et al. | 365/200 |
| 2003/0014630 A1 | * | 1/2003 | Spencer et al. | 713/168 |
| 2003/0018978 A1 | * | 1/2003 | Singal et al. | 725/115 |
| 2003/0122966 A1 | * | 7/2003 | Markman et al. | 348/563 |
| 2005/0238314 A1 | * | 10/2005 | Asayama et al. | 386/1 |
| 2005/0240530 A1 | * | 10/2005 | Watanabe et al. | 705/52 |
| 2005/0244147 A1 | * | 11/2005 | Yamagata et al. | 386/125 |
| 2006/0045488 A1 | * | 3/2006 | Maeda | 386/95 |
| 2006/0059200 A1 | * | 3/2006 | Sakai et al. | 707/104.1 |
| 2007/0088674 A1 | * | 4/2007 | Kawate et al. | 707/2 |

(Continued)

FOREIGN PATENT DOCUMENTS

JP    2003-134435    5/2003

(Continued)

*Primary Examiner*—Cheyne D Ly
(74) *Attorney, Agent, or Firm*—Oblon, Spivak, McClelland, Maier & Neustadt, L.L.P.

(57) ABSTRACT

A content recording apparatus includes: a content management file storing section that stores a content management file that records hierarchical entries organized in a virtual hierarchical structure; a content inputting section that inputs content files; a virtual management information creating section that creates virtual management information for virtually managing each of the inputted content files, on the basis of the content file; a meta data creating section that creates meta data related to each of the inputted content files, on the basis of the content file; and a recording control section that records file entries, which are the hierarchical entries including the created virtual management information, into the content management file, and records meta data entries, which are the hierarchical entries including the created meta data, at a lower hierarchical level than the file entries in the content management file.

31 Claims, 35 Drawing Sheets

U.S. PATENT DOCUMENTS

2008/0177775 A1* 7/2008 Kawate et al. .............. 707/102

FOREIGN PATENT DOCUMENTS

| JP | 2004-336466 | 11/2004 |
| JP | 2006-139682 | 6/2006 |
| JP | 2006-343791 | 12/2006 |
| WO | WO 2005/069172 A1 | 7/2005 |

* cited by examiner

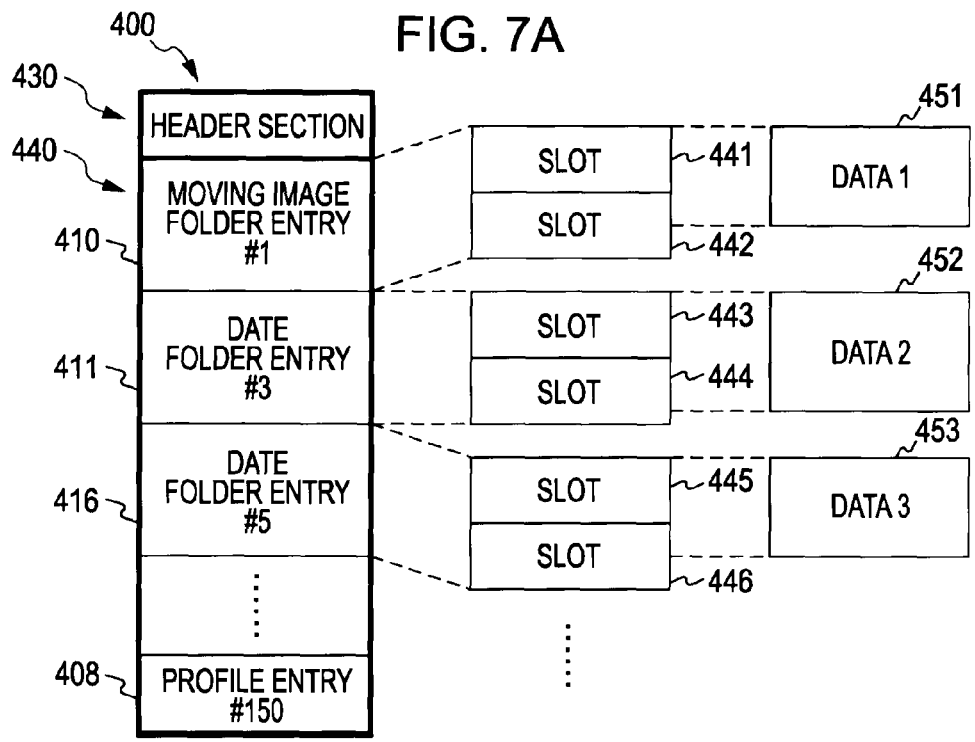
FIG. 7A
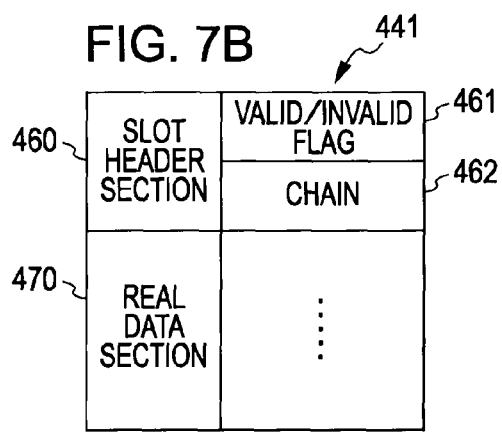
FIG. 7B
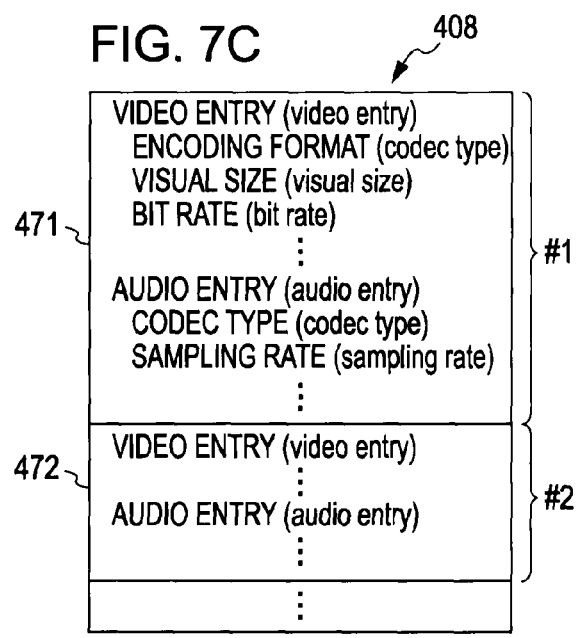
FIG. 7C
FIG. 7D
| HD MOVING IMAGE | SD MOVING IMAGE | STILL IMAGE | RESERVE | | | | |
|---|---|---|---|---|---|---|---|
| 1 | 1 | 0 | 0 | 0 | 0 | 0 | 0 |

| FIELD NAME | | SIZE | | CONTENTS |
|---|---|---|---|---|
| FACE DETECTION TIME INFORMATION | | 5 bytes | | TIME AT WHICH FACE DATA WAS DETECTED |
| FACE BASIC INFORMATION | FACE POSITION | 8 bytes | UPPER 4 bytes | POSITION INFORMATION OF DETECTED FACE |
| | FACE SIZE | | LOWER 4 bytes | IMAGE SIZE OF DETECTED FACE |
| FACE SCORE | | 4 bytes | | SCORE INFORMATION INDICATING FACENESS |
| SMILE SCORE | | 4 bytes | | SCORE INFORMATION INDICATING DEGREE OF SMILING OF FACE |
| FACE IMPORTANCE | | 1 byte | | INFORMATION INDICATING IMPORTANCE OF IMAGES DETECTED AT SAME TIME |

| Bit | FLAG NAME<br>(CORRESPONDING TO FIELD NAME WITHIN FACE DATA SECTION) |
|---|---|
| 0 | FACE DETECTION TIME INFORMATION |
| 1 | FACE BASIC INFORMATION |
| 2 | FACE SCORE |
| 3 | SMILE SCORE |
| 4 | FACE IMPORTANCE |
| 127-5 | RESERVED AREA = 0 |

FIG. 13A

| FACE DATA |
|---|
| FACE DETECTION TIME INFORMATION |
| FACE BASIC INFORMATION |
| FACE SCORE |
| SMILE SCORE |
| FACE IMPORTANCE |

| Bit | FLAG NAME (CORRESPONDING TO FIELD NAME WITHIN FACE DATA SECTION) | VALUE |
|---|---|---|
| 0 | FACE DETECTION TIME INFORMATION | 1 |
| 1 | FACE BASIC INFORMATION | 1 |
| 2 | FACE SCORE | 1 |
| 3 | SMILE SCORE | 1 |
| 4 | FACE IMPORTANCE | 1 |
| 127-5 | RESERVED AREA = 0 | 0 |

| FACE DATA |
|---|
| FACE DETECTION TIME INFORMATION |
| FACE BASIC INFORMATION |
| FACE SCORE |

660

| Bit | FLAG NAME<br>(CORRESPONDING TO FIELD NAME WITHIN FACE DATA SECTION) | VALUE |
|---|---|---|
| 0 | FACE DETECTION TIME INFORMATION | 1 |
| 1 | FACE BASIC INFORMATION | 1 |
| 2 | FACE SCORE | 1 |
| 3 | SMILE SCORE | 0 |
| 4 | FACE IMPORTANCE | 0 |
| 127-5 | RESERVED AREA = 0 | 0 |

FIG. 15A

| FACE DATA |
|---|
| FACE DETECTION TIME INFORMATION |
| FACE BASIC INFORMATION |
| FACE SCORE |
| SMILE SCORE |
| FACE IMPORTANCE |
| GENDER SCORE |
| ANGLE INFORMATION |

| Bit | FLAG NAME (CORRESPONDING TO FIELD NAME WITHIN FACE DATA SECTION) | VALUE |
|---|---|---|
| 0 | FACE DETECTION TIME INFORMATION | 1 |
| 1 | FACE BASIC INFORMATION | 1 |
| 2 | FACE SCORE | 1 |
| 3 | SMILE SCORE | 1 |
| 4 | FACE IMPORTANCE | 1 |
| 5 | GENDER SCORE | 1 |
| 6 | ANGLE INFORMATION | 1 |
| 127-7 | RESERVED AREA = 0 | 0 |

FIG. 16A

| FACE DATA |
|---|
| FACE DETECTION TIME INFORMATION |
| FACE BASIC INFORMATION |
| FACE SCORE |
| FACE IMPORTANCE |
| ANGLE INFORMATION |

| Bit | FLAG NAME<br>(CORRESPONDING TO FIELD NAME WITHIN FACE DATA SECTION) | VALUE |
|---|---|---|
| 0 | FACE DETECTION TIME INFORMATION | 1 |
| 1 | FACE BASIC INFORMATION | 1 |
| 2 | FACE SCORE | 1 |
| 3 | SMILE SCORE | 0 |
| 4 | FACE IMPORTANCE | 1 |
| 5 | GENDER SCORE | 0 |
| 6 | ANGLE INFORMATION | 1 |
| 127-7 | RESERVED AREA = 0 | 0 |

CONTENT RECORDING APPARATUS, CONTENT PLAYBACK APPARATUS, CONTENT PLAYBACK SYSTEM, IMAGE CAPTURING APPARATUS, PROCESSING METHOD FOR THE CONTENT RECORDING APPARATUS, THE CONTENT PLAYBACK APPARATUS, THE CONTENT PLAYBACK SYSTEM, AND THE IMAGE CAPTURING APPARATUS, AND PROGRAM

CROSS REFERENCES TO RELATED APPLICATIONS

The present invention contains subject matter related to Japanese Patent Application JP 2007-098100 filed in the Japanese Patent Office on Apr. 4, 2007, and Japanese Patent Application JP 2007-134947 filed in the Japanese Patent Office on May 22, 2007, the entire contents of which are incorporated herein by reference.

BACKGROUND OF THE INVENTION

1. Field of the Invention

The present invention relates to a content recording apparatus. More specifically, the present invention relates to a content recording apparatus, a content playback apparatus, an image capturing apparatus, a content playback system, a processing method for the content recording apparatus, the content playback apparatus, the image capturing apparatus, and the content playback system, and a program for causing a computer to execute the method.

2. Description of the Related Art

In the related art, there have been proposed many techniques for recording content, such as a still image or moving image, and meta data accompanying this content in association with each other, and using this meta data to facilitate various operations.

Also, in recent years, there are techniques for detecting the face of a person included in content such as a still image or moving image, and there have been proposed techniques for registering information related to the detected face as meta data. An identification process is now available for identifying whether or not this detected face of a person is the face of a specific person.

For example, there has been proposed a meta data registration method in which a face is detected from a photographed image, a rectangular area including the detected face and personal information such as a person's name are stored as meta data in the XML format, and these pieces of meta data are written into a part of an image file for registration (for example, see Japanese Unexamined Patent Application Publication No. 2004-336466 (FIG. 2)).

SUMMARY OF THE INVENTION

According to the above-described related art, meta data including the rectangular area that includes the detected face, and personal information is stored as a part of an image file. Accordingly, for example, by clicking on a predetermined face while viewing this image file, it is possible to perform an operation using meta data registered in association with that face.

Now, a case of retrieving an image file is considered. To retrieve an image file by using meta data registered by the above-described related art, since meta data is written into a part of the image file, it is necessary to repeatedly open and close the image file to read meta data used for retrieval. In this case, the time for reading meta data used for retrieval is required, leading to an increase in image file retrieval time. Therefore, it may be difficult to quickly access content for use.

It is thus desirable to make content quickly accessible for use.

According to an embodiment corresponding to a first aspect of the present invention, there is provided a content playback system, its processing method, and a program for causing a computer to execute the method. The content playback system includes: inputting means for inputting content files; content storing means for storing the inputted content files; content management file storing means for storing a content management file that records hierarchical entries organized in a virtual hierarchical structure; virtual management information creating means for creating virtual management information for virtually managing each of the inputted content files, on the basis of the content file; meta data creating means for creating meta data related to each of the inputted content files, on the basis of the content file; recording control means for recording file entries, which are the hierarchical entries including the created virtual management information, into the content management file, and records meta data entries, which are the hierarchical entries including the created meta data, at a lower hierarchical level than the file entries in the content management file; extracting means for extracting a desired piece of meta data from the meta data included in each of the meta data entries recorded in the content management file, and extracting a content file stored in the content storing means on the basis of the virtual management information included in a file entry recorded at a higher hierarchical level than a meta data entry including the extracted meta data; playback control means for controlling playback of the extracted content file on the basis of the extracted meta data; and playback means for playing back the extracted content file on the basis of control by the playback control means. Therefore, file entries each including virtual management information created on the basis of an inputted content file are recorded to the content management file, meta data entries each including meta data created on the basis of the inputted content file are recorded at a lower hierarchical level than the file entries, and on the basis of meta data extracted from the content management file, playback of a content file extracted from the content storing means is controlled.

According to an embodiment corresponding to a second aspect of the present invention, there is provided a content recording apparatus, its processing method, and a program for causing a computer to execute the method. The content recording apparatus includes: content management file storing means for storing a content management file that records hierarchical entries organized in a virtual hierarchical structure; content inputting means for inputting content files; virtual management information creating means for creating virtual management information for virtually managing each of the inputted content files, on the basis of the content file; meta data creating means for creating meta data related to each of the inputted content files, on the basis of the content file; and recording control means for recording file entries, which are the hierarchical entries including the created virtual management information, into the content management file, and records meta data entries, which are the hierarchical entries including the created meta data, at a lower hierarchical level than the file entries in the content management file. Therefore, file entries each including virtual management information created on the basis of an inputted content file are recorded to the content management file, and meta data entries each including meta data created on the basis of the inputted content file are recorded at a lower hierarchical level than the file entries.

In the second aspect, the recording control means may assign to each of the hierarchical entries an entry identifier for identifying the hierarchical entry, record the entry identifier of each of the file entries to each of the meta data entries recorded at a lower hierarchical level than the file entries, and record the entry identifier of each of the meta data entries to each of the file entries recorded at a higher hierarchical level than the meta data entries. Therefore, entry identifier is assigned to each hierarchical entry, and entry identifiers are recorded for parent and child entries of each hierarchical entry.

In the second aspect, the virtual management information may include a recording position of a content file corresponding to a file entry including the virtual management information on a file system. Therefore, the recording position of a content file on the file system is included in the virtual management information.

In the second aspect, the recording control means may record, to the content management file, folder entries that are the hierarchical entries for sorting and managing the inputted content files, and sort and record the created file entries at a lower hierarchical level than the folder entries. Therefore, folder entries for sorting and managing content files are recorded to the content management file, and file entries are sorted and recorded at a lower hierarchical level than the folder entries. In this case, the recording control means may assign to each of the hierarchical entries an entry identifier for identifying the hierarchical entry, record the entry identifier of each of the folder entries to each of the file entries recorded at a lower hierarchical level than the folder entries, and record the entry identifier of each of the file entries to each of the folder entries recorded at a higher hierarchical level than the file entries. Therefore, entry identifier is assigned to each hierarchical entry, and entry identifiers are recorded for parent and child entries of each hierarchical entry.

In the second aspect, each of the hierarchical entries may be a hierarchical entry including at least one slot that is a physically fixed-length data area. Therefore, virtual management information and content attribute information are stored in association with each other to hierarchical entries each including at least one slot that is a physically fixed-length data area. In this case, the slot may be sequentially recorded in order into a property file included in the content management file, and an entry identifier may be assigned to each of the hierarchical entries to identify the hierarchical entry is an entry number assigned in accordance with an ordinal number of the slot constituting the hierarchical entry as counted from the top of the slots recorded in the property file. Therefore, individual slots are sequentially recorded into the property file, and an entry number is assigned in accordance with the ordinal number as counted from the top of the slots recorded in the property file.

In the second aspect, the content management file may be stored under a directory different from the content files, and the directory may be set to be invisible. Therefore, the content management file is stored under a directory different from content files, and the directory is set to be invisible.

In the second aspect, the content files may be each an image content file, and the meta data recorded in each of the meta data entries may include at least positions and sizes of face images included in the image content file. Therefore, meta data including the positions and sizes of face images included in an image content file is created.

In the second aspect, the recording control means may record the meta data related to each of the content files to the content file. Therefore, meta data related to a content file is recorded to the corresponding content file. Further, in this case, if the content files are each a still image content file recorded by a DCF standard, the recording control means may record the meta data related to the still image content file to a maker note in the still image content file. Therefore, meta data related to a still image content file recorded by the DCF standard is recorded to the maker note of the still image content file.

In the second aspect, if the content files are each a moving image content file, the meta data creating means may create the meta data related to the moving image content file for each of positions that satisfy a predetermined condition in the moving image content file, and the recording control means may record, to the moving image content file, the meta data created for each of the positions that satisfy the predetermined condition with respect to the moving image content file. Therefore, meta data related to a moving image content file is created for each position that satisfies a predetermined condition, and the created meta data is recorded to the corresponding moving image content file. Further, in this case, if the content files are each a moving image content file encoded in AVC codec, the meta data creating means may create the meta data related to the moving image content file for each of IDR pictures or I pictures that is included in an AU to which an SPS is added, and the recording control means may record the meta data created for each of the IDR pictures or I pictures with respect to the moving image content file, to SEI in the AU including the IDR picture or I picture. Therefore, meta data related to a moving image content file encoded in AVC codec is created for each IDR picture or I picture included in an AU to which an SPS is added, and the meta data created for each IDR picture or I picture is recorded to SEI in the AU including the corresponding IDR picture or I picture.

In the second aspect, when recording the meta data created at a predetermined interval with respect to the moving image content file to the moving image content file, the recording control means may record the meta data to the moving image content file in accordance with a recording condition that is less restrictive than a recording condition that applies when recording the meta data to the content management file. Therefore, meta data is recorded to a moving image content file in accordance with a recording condition that is less restrictive than the recording condition that applies when recording meta data to the content management file.

According to an embodiment corresponding to a third aspect of the present invention, there is provided a content recording apparatus, its processing method, and a program for causing a computer to execute the method. The content recording apparatus includes: content management file storing means for storing a content management file that records hierarchical entries organized in a virtual hierarchical structure; content inputting means for inputting content files; virtual management information creating means for creating virtual management information for virtually managing each of the inputted content files, on the basis of the content file; content attribute information creating means for creating content attribute information as attribute information related to each of the inputted content files, on the basis of the content file; and recording control means for recording, to the content management file, file entries that are the hierarchical entries which store the created virtual management information and the created content attribute information in association with each other. Therefore, file entries that each store virtual management information created on the basis of an inputted content file, and content attribute information created on the basis of the inputted content file in association with other are recorded to the content management file.

In the third aspect, the content recording apparatus may further include representative image extracting means for extracting from the inputted content files representative images of the content files, the content management file may include a representative image file that records the extracted representative images, the content attribute information creating means may create the content attribute information by adding recording positions of the representative images in the representative image file to the content attribute information related to the content files corresponding to the extracted representative images, and the recording control means may record the extracted representative images to the representative image file included in the content management file. Therefore, representative images are extracted from inputted content files, content attribute information is created so as to include the recording positions of the extracted representative images, and the representative images are recorded to the representative image file.

According to an embodiment corresponding to a fourth aspect of the present invention, there is provided a content playback apparatus, its processing method, and a program for causing a computer to execute the method. The content playback apparatus includes: content storing means for storing content files; content management file storing means for storing a content management file in which hierarchical entries organized in a virtual hierarchical structure are recorded, the content management file recording file entries that are the hierarchical entries including virtual management information for virtually managing each of the content files, and meta data entries that include meta data related to each of the content files and are the hierarchical entries at a lower hierarchical level than the file entries; operation accepting means for accepting an operation input for selecting a desired piece of meta data from among the meta data included in each of the meta data entries recorded in the content management file; selecting means for selecting, when the operation input for selecting the desired piece of meta data is accepted by the operation accepting means, a meta data entry including the selected meta data from among the meta data entries recorded in the content management file; and extracting means for extracting a content file recorded in the content storing means on the basis of the virtual management information included in a file entry recorded at a higher hierarchical level than the selected meta data entry. Therefore, when an operation input for selecting meta data is accepted, a meta data entry including the selected meta data is selected from among meta data entries recorded in the content management file, and a content file is extracted on the basis of virtual management information included in a file entry recorded at a higher hierarchical level than the selected meta data entry.

In the fourth aspect, the content files may each be an image content file, the meta data may include positions and sizes of face images included in the image content file, and the extracting means may extract face images included in the extracted image content file on the basis of the meta data included in the selected meta data entry. Therefore, face images included in an image content file are extracted on the basis of meta data included in a selected meta data entry.

In the fourth aspect, the content files may each be a moving image content file, the meta data may include positions and sizes of face images included in the moving image content file, and the extracting means may extract face images included in the extracted moving image content file on the basis of the meta data included in the selected meta data entry. Therefore, face images included in a moving image content file are extracted on the basis of meta data included in a selected meta data entry. In this case, the content playback apparatus may further include rendering means for rendering the extracted face images, the operation accepting means may accept an operation input for selecting a desired face image from among the rendered face images, the selecting means may select, when the operation input for selecting the desired face image is accepted by the operation accepting means, meta data corresponding to the selected face image from among the meta data entries recorded in the content management file, and the extracting means may extract from the extracted moving image content file a moving image recorded after a recording time of the face image corresponding to the selected meta data. Therefore, when an operation input for selecting a face image is accepted, a meta data entry corresponding to the selected face image is selected from among meta data entries recorded in the content management file, and a moving image recorded after the recording time of the selected face image is extracted.

According to an embodiment corresponding to a fifth aspect of the present invention, there is provided a content playback apparatus, its processing method, and a program for causing a computer to execute the method. The content playback apparatus includes: content storing means for storing content files; content management file storing means for storing a content management file in which hierarchical entries organized in a virtual hierarchical structure are recorded, the content management file recording file entries that are the hierarchical entries each storing virtual management information for virtually managing each of the content files, and content attribute information as attribute information related to each of the content files in association with each other; operation accepting means for accepting an operation input for selecting a desired piece of content attribute information from among the content attribute information included in each of the file entries recorded in the content management file; selecting means for selecting, when the operation input for selecting the desired piece of content attribute information is accepted by the operation accepting means, a file entry including the selected content attribute information from among the file entries recorded in the content management file; and extracting means for extracting a content file recorded in the content storing means on the basis of the virtual management information included in the selected file entry. Therefore, when an operation input for selecting content attribute information is accepted, a file entry including the selected content attribute information is selected from among file entries recorded in the content management file, and a content file is extracted on the basis of virtual management information included in the selected file entry.

In the fifth aspect, the content management file may include a representative image file that records representative images that are images included in the content files, the content attribute information may include recording positions of the representative images in the representative image file, the content playback apparatus may further include rendering means for rendering the representative images recorded in the representative image file, the operation accepting means may accept an operation input for selecting a desired representative image from among the rendered representative images, the selecting means may select, when the operation input for selecting the desired representative image is accepted by the operation accepting means, a file entry corresponding to the selected representative image from among the file entries recorded in the content management file, and the extracting means may extract a content file stored in the content storing means on the basis of the virtual management information included in the selected file entry. Therefore, when an operation input for selecting a representative image is accepted, a file entry corresponding to the selected representative image is selected from among file entries recorded in the content management file, and a content file is extracted on the basis of virtual management information included in the selected file entry.

In the fifth aspect, in the content management file, meta data entries that are the hierarchical entries including meta data related to each of the content files may be recorded at a lower hierarchical level than the file entries corresponding to the content files, and the extracting means may extract meta data included in a meta data entry recorded at a lower hierarchical level than the selected file entry, and extract a predetermined portion corresponding to the extracted meta data from the extracted content file. Therefore, meta data included in a meta data entry recorded at a lower hierarchical level than a selected file entry is extracted, and a predetermined portion corresponding to the extracted meta data is extracted from a content file.

According to an embodiment corresponding to a sixth aspect of the present invention, there is provided an image capturing apparatus, its processing method, and a program for causing a computer to execute the method. The image capturing apparatus includes: image capturing means for capturing an image of a subject; content inputting means for inputting content files each corresponding to the image captured by the image capturing means; content management file storing means for storing a content management file that records hierarchical entries organized in a virtual hierarchical structure; virtual management information creating means for creating virtual management information for virtually managing each of the inputted content files, on the basis of the content file; meta data creating means for creating meta data related to each of the inputted content files, on the basis of the content file; and recording control means for recording file entries, which are the hierarchical entries including the created virtual management information, into the content management file, and records meta data entries, which are the hierarchical entries including the created meta data, at a lower hierarchical level than the file entries in the content management file. Therefore, file entries including virtual management information created on the basis of content files each corresponding to a captured image are recorded to the content management file, and meta data entries including meta data created on the basis of the inputted content files are recorded at a lower hierarchical level than the file entries.

The present invention makes it advantageously possible to quickly access content for use.

BRIEF DESCRIPTION OF THE DRAWINGS

FIGS. 7A to 7C are diagrams showing an example of the basic structure of a property file;

FIG. 11 is a diagram schematically showing face data stored in a face data section;

FIG. 12 is a diagram showing the data structure of face data structure flag of a header section;

FIGS. 13A and 13B are diagrams showing the relationship between bits stored in face data structure flag, and face data stored in a face data section;

FIGS. 15A and 15B are diagrams showing the relationship between bits stored in face data structure flag, and face data stored in a face data section;

FIGS. 16A and 16B are diagrams showing the relationship between bits stored in face data structure flag, and face data stored in a face data section;

DESCRIPTION OF THE PREFERRED EMBODIMENTS

Next, an embodiment of the present invention will be described in detail with reference to the drawings.

Figure 1:
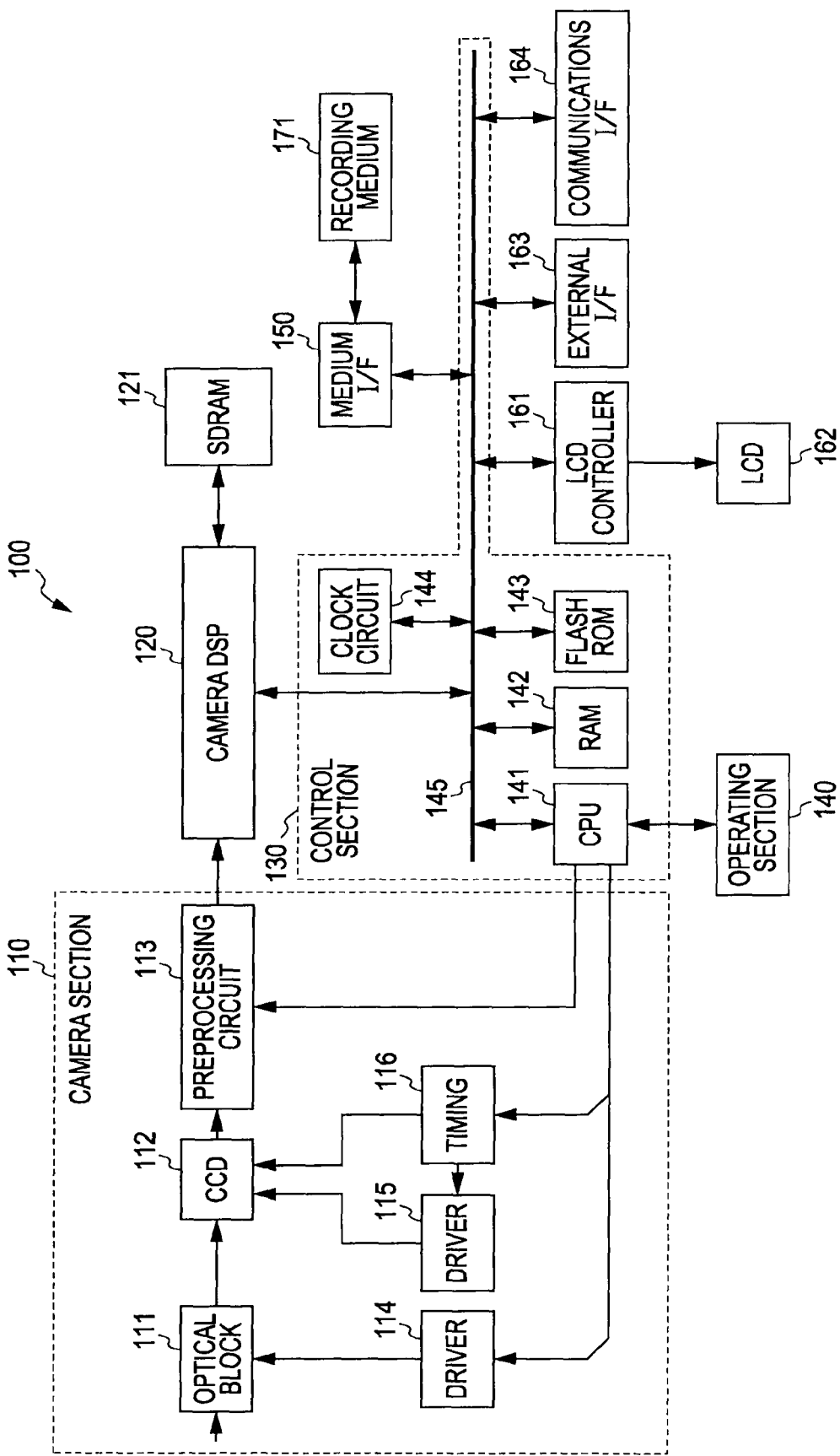
FIG. 1 is a block diagram showing the configuration of an image capturing apparatus.

FIG. 1 is a block diagram showing the configuration of an image capturing apparatus 100 according to an embodiment of the present invention. Roughly speaking, the image capturing apparatus 100 includes a camera section 110, a camera DSP (Digital Signal Processor) 120, an SDRAM (Synchronous Dynamic Random Access Memory) 121, a control section 130, an operating section 140, a medium interface (hereinafter, referred to as the medium I/F) 150, an LCD (Liquid Crystal Display) controller 161, an LCD 162, an external interface (hereinafter, referred to as the external I/F) 163, and a communications interface (hereinafter, referred to as the communications I/F) 164. A recording medium 170 to be connected to the medium interface 150 may be built in the image capturing apparatus 100 or may be removable from the image capturing apparatus 100.

Various kinds of recording medium may be used as the recording medium 170, including an optical recording medium such as a so-called memory card using a semiconductor memory, a recordable DVD (Digital Versatile Disc), or a recordable CD (Compact Disc), a magnetic disc, an HDD (Hard Disk Drive), and the like.

The camera section 110 includes an optical block 111, a CCD (Charge Coupled Device) 112, a preprocessing circuit 113, an optical block driver 114, a CCD driver 115, and a timing generator circuit 116. The optical block 111 includes a focusing mechanism, a shutter mechanism, an iris mechanism, and the like.

A CPU (Central Processing Unit) 141, a PAM (Random Access Memory) 142, a flash ROM (Read Only Memory) 143, and a clock circuit 144 are connected to the control section 130 via a system bus 145. The control section 130 is formed by, for example, a general-purpose embedded microcomputer or dedicated system LSI (Large Scale Integrated circuit). The control section 130 controls the respective sections of the image capturing apparatus 100.

The RAM 142 is mainly used as a working area for temporarily storing the results of processing in progress or the like. The flash ROM 143 stores various programs executed by the CPU 141, data necessary for processing, and the like. The clock circuit 144 provides the current year, month, and day, the current day of the week, and the current time, and also the date and time of photography or the like.

When photographing an image, in accordance with control from the control section 130, the optical block driver 114 generates a drive signal for causing the optical block 111 to operate, and supplies the drive signal to the optical block 111, thereby causing the optical block 111 to operate. In accordance with the drive signal from the optical block driver 114, the focusing mechanism, shutter mechanism, and iris mechanism of the optical block 111 are controlled. The optical block 111 captures an optical image of a subject and forms the resulting image on the CCD 112.

The CCD 112 performs photoelectric conversion on the optical image from the optical block 111, and outputs an electrical signal of the image obtained by the conversion. That is, the CCD 112 operates in accordance with a drive signal from the CCD driver 115 and captures an optical image of a subject from the optical block 111, and on the basis of a timing signal from the timing generator circuit 116 controlled by the control section 130, supplies the image (image information) of the captured subject image to the preprocessing circuit 113 as an electric signal. A photoelectric conversion device such as a CMOS (Complementary Metal-Oxide Semiconductor) sensor may be used instead of the CCD 112.

As described above, the timing generator circuit 116 generates a timing signal for providing a predetermined timing in accordance with control from the control section 130. The CCD driver 115 generates a drive signal to be supplied to the CCD 111, on the basis of a timing signal from the timing generator circuit 116.

The preprocessing circuit 113 performs a CDS (Correlated Double Sampling) process with respect to the image information of an electrical signal supplied from the CCD 112 to keep a favorable S/N ratio. Also, the preprocessing circuit 113 performs an AGC (Automatic Gain Control) process for gain control, and performs A/D (Analog/Digital) conversion to generate image data as a digital signal.

The image data converted into a digital signal in the preprocessing circuit 113 is supplied to the camera DSP 120. The camera DSP 120 applies camera signal processing such as AF (Auto Focus), AE (Auto Exposure), and AWB (Auto White Balance) to the image data supplied to the camera DSP 120. The image data that has undergone various adjustments in this way is encoded in a predetermined encoding format such as JPEG (Joint Photographic Experts Group) or JPEG 2000, for example. The encoded image data is then supplied to the recording medium 170 via the system bus 145 and the medium I/F 150, and recorded as a file onto the recording medium 170. The camera DSP 120 performs data compression and data decompression processes on the basis of the MPEG4-AVC standard.

Of the image data recorded on the recording medium 170, a piece of target image data is read from the recording medium 170 via the medium I/F 150 in response to an operation input from the user accepted via the operating section 140 formed by a touch panel, a control key, or the like. The read image data is supplied to the camera DSP 120.

The camera DSP 120 decodes the encoded image data read from the recording medium 170 and supplied to the camera DSP 120 via the medium I/F 150, and supplies the decoded image data to the LCD controller 161 via the system bus 145. From the image data supplied to the LCD controller 161, the LCD controller 161 generates an image signal to be supplied to the LCD 162, and supplies the image signal to the LCD 162. An image corresponding to the image data recorded on the recording medium 170 is thus displayed on the display screen of the LCD 162. The camera DSP 120 detects a face included in the image data supplied from the preprocessing circuit 113 or the recording medium 170, and outputs information related to the detected face to the control section 130.

The image capturing apparatus 100 has the external I/F 163. The image capturing apparatus 100 can connect to, for example, an external personal computer via the external I/F 163 to receive supply of image data from the personal computer, and record this image data onto the recording medium 170 mounted on the image capturing apparatus 100, or supply image data recorded on the recording medium 170 mounted on the image capturing apparatus 100 to an external computer or the like.

The communications I/F 164 is formed by a so-called network interface card (NIC) or the like. The communications I/F 164 connects to a network and acquires various kinds of image data and other such information via the network.

Also, as described above, information such as the image data acquired via an external personal computer or network and recorded on the recording medium 170 can be read by the image capturing apparatus 100 for playback, and displayed on the LCD 162 for use by the user.

The communications I/F 164 can be also provided as a wired interface conforming to such a standard as the IEEE (Institute of Electrical and Electronic Engineers) 1394 or USB (Universal Serial Bus), or can be also provided as a wireless interface using light or radio conforming to the IEEE802.11a, IEEE802.11b, or IEEE802.11g, or Bluetooth standard. That is, the communications interface 164 may be either a wired or wireless interface.

As described above, the image capturing apparatus 100 can photograph an image of a subject and record the image to the recording medium 170 loaded in the image capturing apparatus 100, and also read image data recorded on the recording medium 170 and playback the image data for use. Further, the image capturing apparatus 100 can also receive supply of image data via an external personal computer or network and record the image data onto the recording medium 170 loaded in the image capturing apparatus 100 or read the image data for playback.

Next, moving image content files used in the embodiment of the present invention will be described in detail with reference to the drawings.

Figure 2:
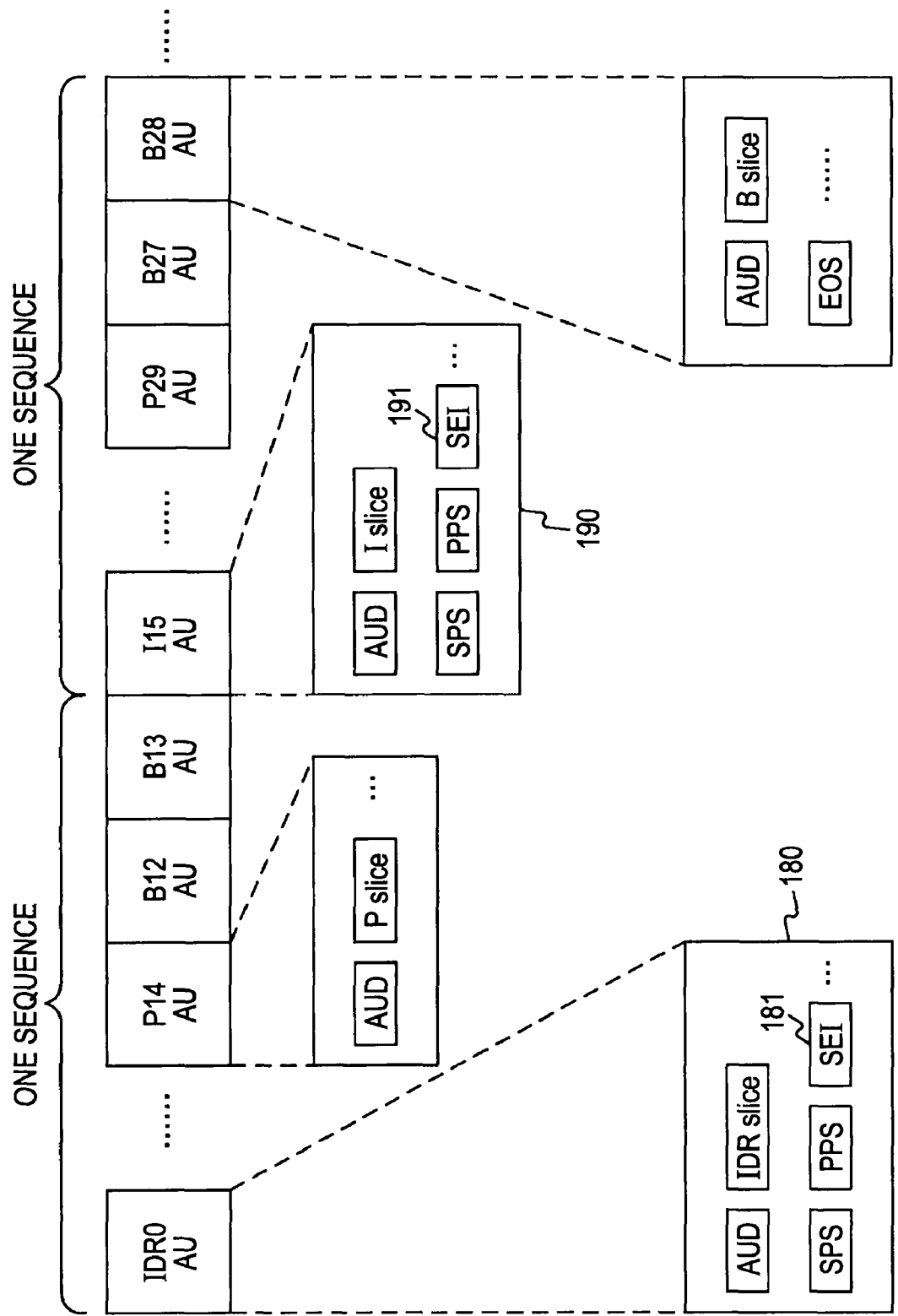
FIG. 2 is a diagram schematically showing predetermined frames of a video signal obtained by encoding image data photographed with an image capturing apparatus in MPEG4-AVC.

FIG. 2 is a diagram schematically showing predetermined frames of a video signal obtained by encoding image data photographed with the image capturing apparatus 100 in MPEG4-AVC (MPEG-1 part 10:AVC).

In the embodiment of the present invention, a description will be given of a recording method of detecting a human face included in one of the frames of a video signal encoded in MPEG4-AVC, and recording face meta data corresponding to the detected face.

According to the MPEG4-AVC standard, a NAL (Network Abstraction Layer) exists between a VCL (Video Coding Layer) for handling a moving image encoding process, and a lower system that transfers and accumulates encoded information. Further, a parameter set corresponding to a sequence or header information of a picture can be handled separately from information generated by the VCL. Furthermore, mapping of bit streams to a lower system such as the MPEG-2 system is performed with a "NAL unit" representing one section of the NAL.

Now, main types of NAL unit will be described. An SPS (Sequence Parameter Set) NAL unit includes information related to encoding of the entire sequence such as a profile or level information. In an AU (Access Unit) described later, an AU section in which the SPS NAL unit is inserted is generally referred to as one sequence. Editing such as partition deletion or combining of streams is performed with this one sequence as an editing unit. A PPS (Picture Parameter Set) NAL unit includes information related to the coding mode of the entire picture such as the entropy coding mode, picture-by-picture quantization parameters, and the like.

Coded data of an IDR (Instantaneous Decoder Refresh) picture is stored in a Coded slice of an IDR picture NAL unit. Coded data of another, non-IDR picture is stored in a Coded Slice of a non IDR picture NAL unit.

Additional information not absolutely necessary for the coding of VCL is stored in a SEI (Supplemental Enhancement Information) NAL unit. For example, information convenient for performing random access, information uniquely defined by the user, and the like are stored. An AUD (Access Unit Delimiter) NAL unit is added to the top of an access unit (AU) described later. The AUD NAL unit contains information indicating the kind of a slide included in an access unit. Other than this, an EOS (End Of Sequence) NAL unit, and an EOST (End of Stream) NAL unit indicating the end of a stream are defined.

A collection of several NAL units used for accessing information in a bit stream on a picture-by-picture basis is referred to as an access unit (AU). An access unit must contain a NAL unit corresponding to a slice of a picture (Coded Slice of an IDR picture NAL unit or Coded Slide of a non IDR picture NAL unit). In the embodiment of the present invention, a series of AUs with an AU containing a given SPS NAL unit as the starting point and an AU containing an EOS NAL unit as the end point is defined as a sequence. Further, it is assumed that an AU containing an SPS contains a NAL unit corresponding to a slice of an IDR picture or I picture. That is, since an IDR picture or I picture that can be decoded independent of other pictures is present at the top in the decoding order of one sequence, one sequence can be set as a random access unit, or an editing unit at the time of editing.

For example, it is assumed that as shown in FIG. 2, an AU 180 containing an SPS contains a SET NAL unit 181, and an AU 190 containing an SPS contains a SET NAL unit 191. The SEI NAL unit 181 and the SEI NAL unit 191 will be described in detail later with reference to a modification of an embodiment of the present invention.

It should be noted that in an embodiment of the present invention, when extracting a human face from a moving image content, this one sequence serves as the unit of detection. That is, within one sequence, a face is detected from only one frame included in this sequence, and a face is not detected from other frames. It should be noted, however, that a face may be detected at each predetermined sequence interval, or a face may be detected at each sequence including an IDR.

Next, real files recorded on the recording medium 170 will be described in detail with reference to the drawings.

Figure 3:
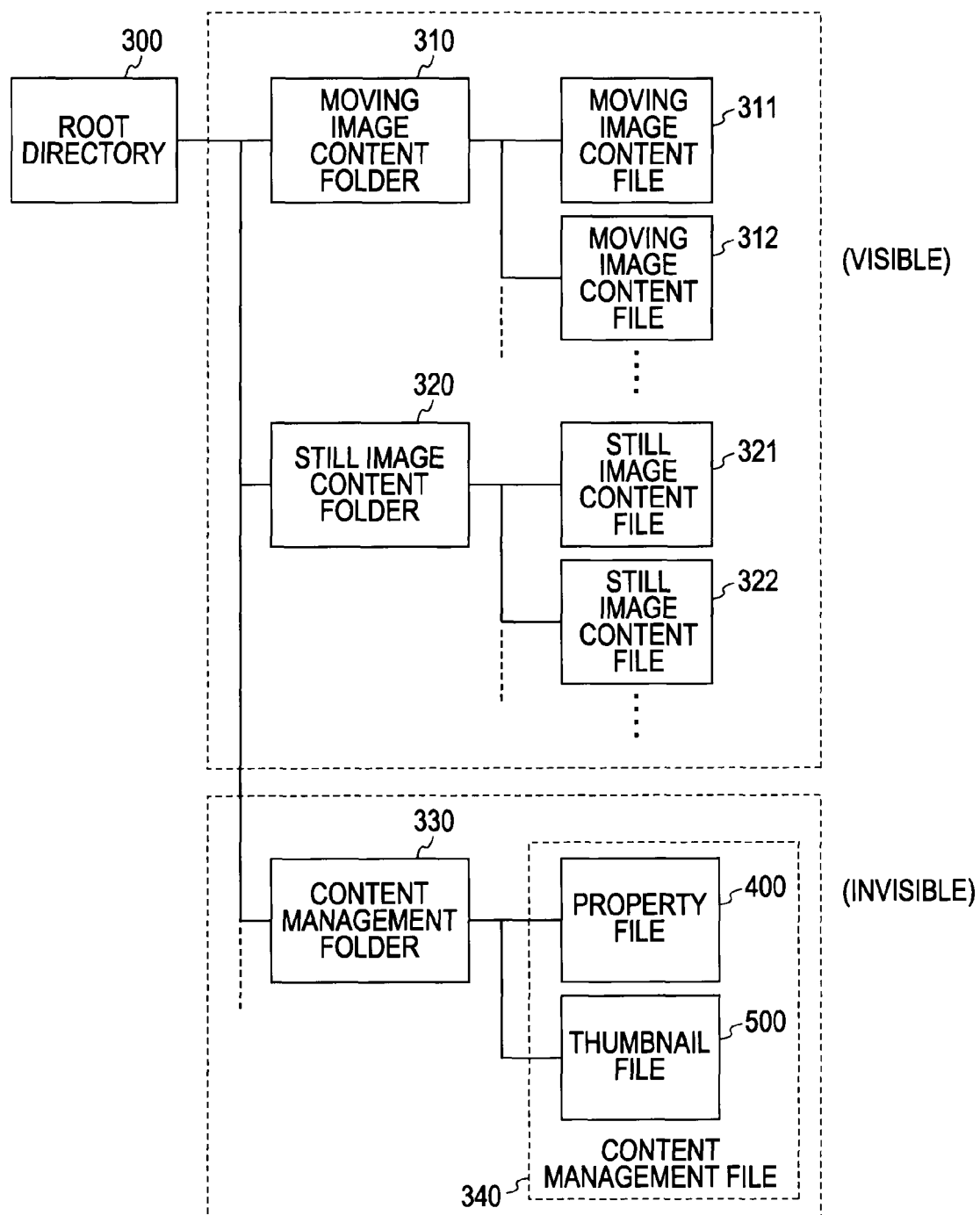
FIG. 3 is a diagram schematically showing the file structure of real files registered on a file system.

FIG. 3 is a diagram schematically showing the file structure of real files registered on the file system. In the embodiment of the present invention, moving image or still image content files and face meta data related to these content files are managed by a virtual entry structure different from a real directory. Specifically, other than moving image or still image content files, a content management file 340 for managing these files and face meta data is recorded on the recording medium 170.

A moving image content folder 310, a still image content folder 320, and a content management folder 330 belong to a root directory 300.

The moving image content folder 310 is a moving image content folder to which moving image content files 311 and 312 as moving image data captured with the image capturing apparatus 100 belong. In this example, it is assumed that the moving image content files 311 and 312 belong to the moving image content folder 310.

The still image content folder 320 is a still image content folder to which still image content files 321 and 322 as still image data captured with the image capturing apparatus 100 belong. In this example, it is assumed that the still image content files 321 and 322 belong to the still image content folder 320.

The content management folder 330 is a content management folder to which the content management file 340 belongs. The content management file 340 is a file that manages the individual content files belonging to the moving image content folder 310 and the still image content folder 320 by virtual hierarchical entries, and includes a property file 400 and a thumbnail file 500. The property file 400 is a file in which management information for virtually managing individual content files, content attribute information such as the creation dates and times of individual content files, and meta data such as face meta data accompanying individual content files are recorded. The thumbnail file 500 is a file in which representative thumbnail images of individual content files are stored. The property file 400 and the thumbnail file 500 will be described later in detail with reference to FIGS. 4 to 8.

The individual moving image content files belonging to the moving image content folder 310, and the individual still image content files belonging to the still image content folder 320 are visible to the user. That is, images corresponding to these content files can be displayed on the LCD 162 by an operation input from the user.

On the other hand, the content management file 340 is made invisible to the user in order to prevent the contents of the content management file 340 from being altered by the user. As for the specific setting method for making the contents of the content management file 340 invisible, for example, the contents of the content management file 340 can be made invisible by turning on a flag for making the content management folder 330 to be managed by the file system invisible. As for the timing for making the content management file 340 invisible, for example, in a case where the image capturing apparatus 100 is connected to a PC (personal computer) via a USB (Universal Serial Bus), the above-mentioned flag may be turned on when the image capturing apparatus 100 senses that connection (upon receiving from a PC (host) a signal indicating that connection has been successfully established).

Next, the virtual entry structure of the property file 400 will be described in detail with reference to the drawings.

Figure 4:
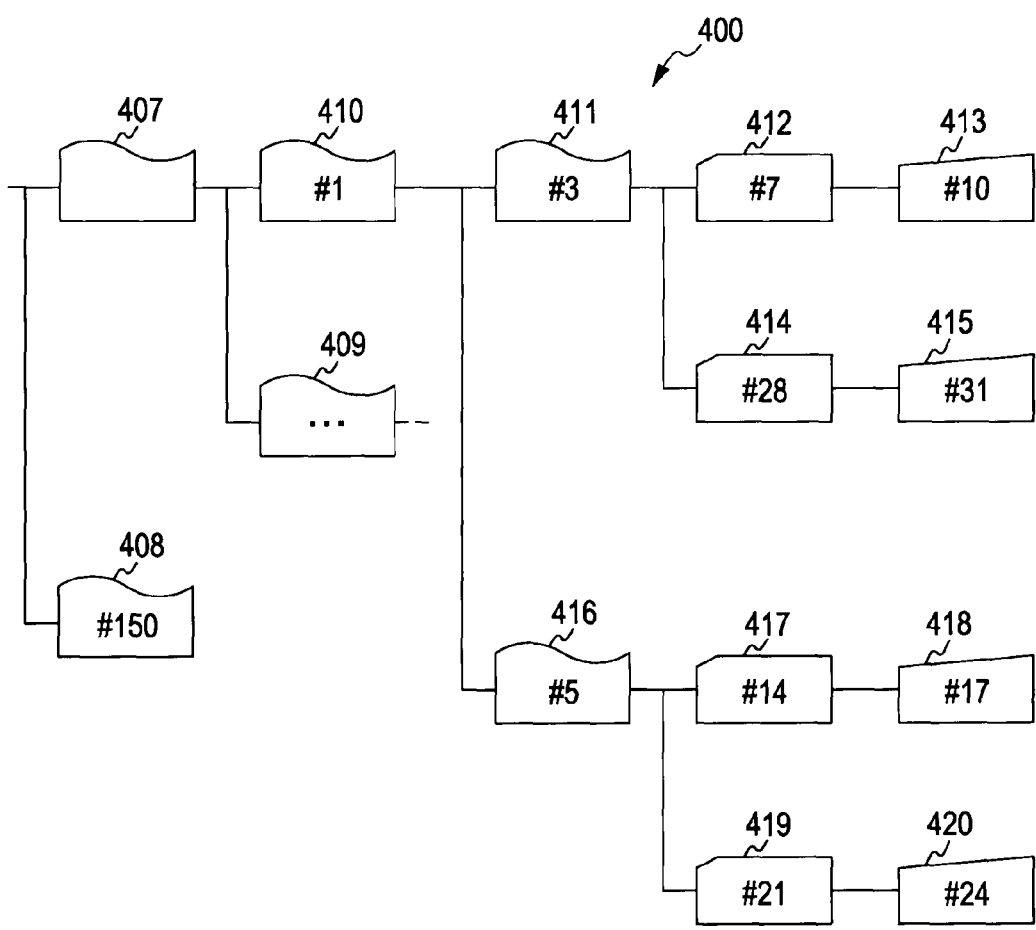
FIG. 4 is a diagram showing an example of the configuration of virtual folders and virtual files managed by a property file.

FIG. 4 is a diagram showing an example of the configuration of virtual folders and virtual files managed by the property file 400.

As described above, the property file 400 manages moving image or still image content files recorded on the recording medium 170, and allows a flexible management method adapted to each application. For example, moving image or still image content files can be managed in accordance with the dates and times the files were recorded. Also, moving image or still image content files can be managed in accordance with moving image or still image types. In this case, a description will be given of a management method of managing moving image content files by sorting the files by recorded date and time. A numeral shown within each entry indicates an entry number. The entry number will be described later in detail with reference to FIGS. 7A to 7D.

A root entry 407 is the highest level entry in the hierarchical entry structure. In this example, a moving image folder entry 410 and a still image folder entry 409 belong to the root entry 407. A profile entry 408 (entry number: #150) is an entry that collectively stores the codec information (encoding format, visual size, bit rate, and the like) of individual file entries. The profile entry 408 will be described later in detail with reference to FIG. 7C. The still image folder entry 409 is an entry for managing a date folder entry related to still images at a lower hierarchical level. The moving image folder entry 410 (entry number: #1) is an entry for managing a date folder entry at a lower hierarchical level. In this example, a date folder entry 411 and a date folder entry 416 belong to the moving image folder entry 410.

The date folder entry 411 (entry number: #3) and the date folder entry 416 (entry number: #5) are entries that manage moving image content files recorded on the recording medium 170 by sorting the files by date, and manage the sorted moving image content files at a lower hierarchical level. In this example, the date folder entry 411 is an entry that manages moving image content files recorded on "Jan. 11, 2006", and a moving image file entry 412 and a moving image file entry 414 belong to the date folder entry 411. The date folder entry 416 is an entry that manages moving image content files recorded on "Jul. 28, 2006", and a moving image file entry 417 and a moving image file entry 419 belong to the date folder entry 416. Folder entries will be described later in detail with reference to FIG. 5.

The moving image file entry 412 (entry number: #7), the moving image file entry 414 (entry number: #28), the moving image file entry 417 (entry number: #14), and the moving image file entry 419 (entry number: #21) store management information for virtually managing individual moving image content files recorded on the recording medium 170, and content attribute information such as the creation dates and times of individual moving image content files. The file entries will be described later in detail with reference to FIG. 5.

A meta data entry 413 (entry number: #10), a meta data entry 415 (entry number: #31), a meta data entry 418 (entry number: #17), and a meta data entry 420 (entry number: #24) are each a meta data entry that stores meta data accompanying a moving image content file managed by a moving image file entry to which the meta data entry is connected. In this example, face data extracted from a moving image content file is stored as meta data. This face data includes various kinds of data related to a face extracted from a moving image content file. For example, as shown in FIG. 11, the face data includes such data as face detection time information, face basic information, face score, and smile score. The meta data entries will be described later with reference to FIGS. 5 to 16B.

Next, the relationship between content management files and content files will be described in detail with reference to the drawings.

Figure 5:
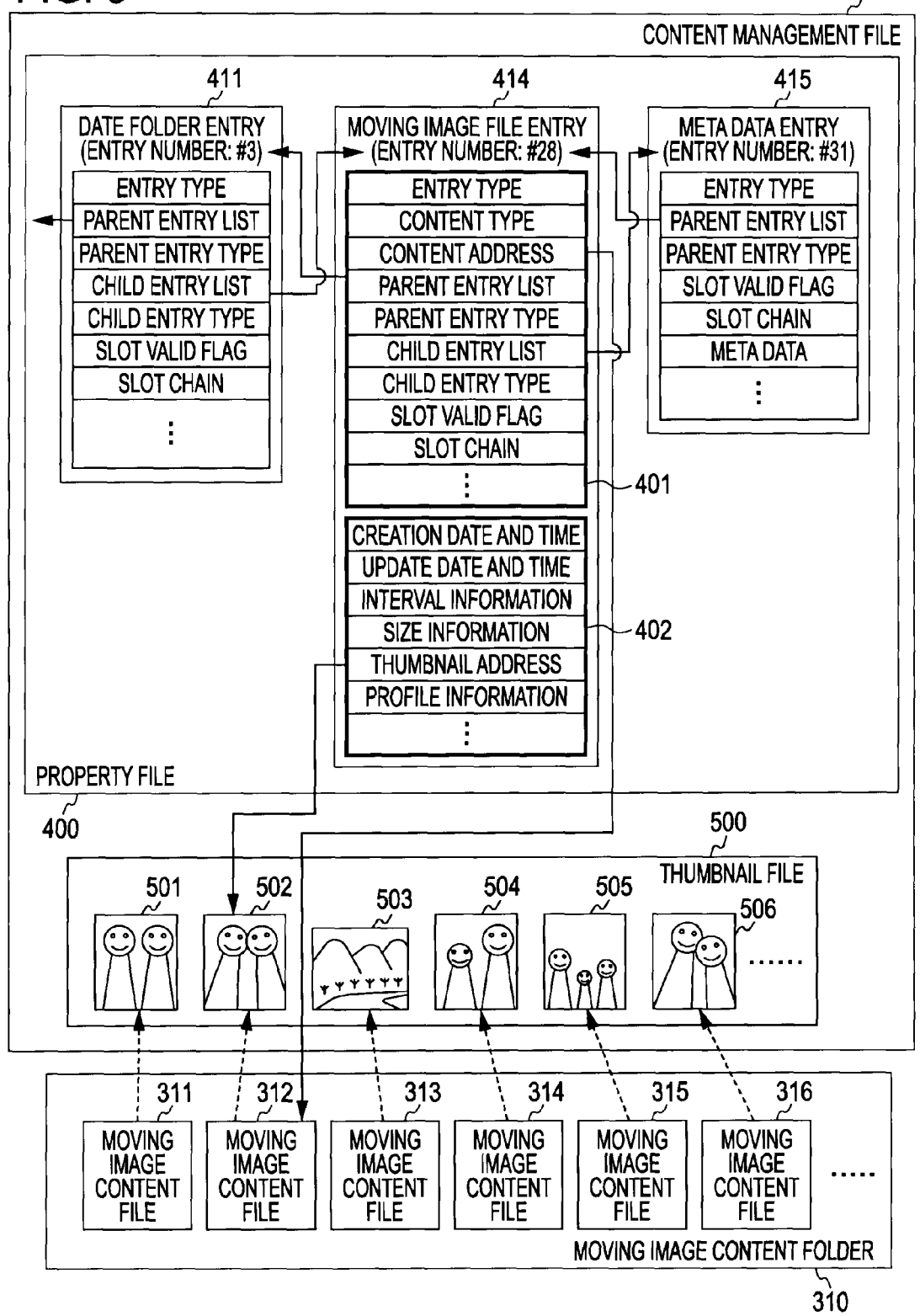
FIG. 5 is a diagram schematically showing the relationship between a property file and a thumbnail file, and moving image content files.

FIG. 5 is a diagram schematically showing the relationship between the property file 400 and the thumbnail file 500 constituting the content management file 340, and the moving image content files 311 to 316 belonging to the moving image content folder 310. Here, a description will be given of the relationship between the date folder entry 411, the moving image file entry 414, and the meta data entry 415 shown in FIG. 4, a representative thumbnail image 502, and the moving image content file 312.

The date folder entry 411 is a folder entry that virtually manages the dates of real content files, and stores such information as the "entry type", "parent entry list", "parent entry type", "child entry list", "child entry type", "slot valid flag", and "slot chain".

An entry number is an identification number for identifying each individual entry, and "#3" is assigned as the entry number of the date folder entry 411. The method of assigning this entry number will be described later with reference to FIGS. 7A to 8.

The "entry type" indicates the kind of this entry, and stores "moving image folder entry", "date folder entry", "moving image file entry", "still image file entry", "meta data entry", or the like depending on the kind of the entry. For example, "date folder entry" is stored in the "entry type" of the date folder entry 411.

The "parent entry list" stores an entry number corresponding to a parent entry that is a higher hierarchical entry to which this entry belongs. For example, "#1" is stored in the "parent entry list" of the date folder entry 411.

The "parent entry type" indicates the kind of a parent entry corresponding to an entry number stored in the "parent entry list", and stores "moving image folder entry", "date folder entry", "moving image file entry", "still image file entry", or the like depending on the kind of the parent entry. For example, "moving image folder entry" is stored in the "parent entry type" of the date folder entry 411.

The "child entry list" stores entry numbers corresponding to child entries that are lower level entries that belong to this entry. For example, "#7" and "#28" are stored in the "parent entry list" of the date folder entry 411.

The "child entry type" indicates the kind of child entries corresponding to entry numbers stored in the "child entry list", and stores "moving image folder entry", "date folder entry", "moving image file entry", "still image file entry", "meta data entry", or the like depending on the kind of the child entries. For example, "moving image folder entry" is stored in the "child entry type" of the date folder entry 411.

The "slot valid flag" is a flag indicating whether each slot constituting this entry is valid or invalid. The "slot chain" indicates information such as a link or linkage related to each slot constituting this entry. The "slot valid flag" and "slot chain" will be described later in detail with reference to FIG. 7B.

The moving image file entry 414 is a file entry that virtually manages real content files, and stores virtual management information 401 and content attribute information 402. The virtual management information 401 stores such information as the "entry type", "content type", "content address", "parent entry list", "parent entry type", "child entry list", "child entry type", "slot valid flag", and "slot chain". Since the "entry type", "parent entry list", "parent entry type", "child entry list", "child entry type", "slot valid flag", and "slot chain" are the same as those described with reference to the date folder entry 411, description thereof is omitted here.

The "content type" indicates the kind of a content file corresponding to this file entry, and stores "moving image content file", "still image content file", or the like depending on the kind of the content file corresponding to the file entry. For example, "moving image content file" is stored in the "content type" of the moving image file entry 414.

The "content address" represents information indicating the recording position of a moving image content file recorded on the recording medium 170. This recording position information enables access to a moving image content file recorded on the recording medium 170. For example, "A312" indicating the address of the moving image content file 312 is stored in the "content address" of the moving image file entry 414.

The content attribute information 402 represents attribute information of a content file stored in the virtual management information 401, and stores such information as the "creation date and time", "update date and time", "interval information", "size information", "thumbnail address", and "profile information".

The "creation date and time" stores the date and time a content file corresponding to this file entry was created. "Update date and time" stores the date and time a content file corresponding to this file entry was updated. A mismatch of meta data is determined by using the "update date and time".

The "interval information" stores information indicating the length of time of a content file corresponding to this file entry. The "size information" stores information indicating the size of a content file corresponding to this file entry.

The "thumbnail address" represents information indicating the recording position of a representative thumbnail image stored in the thumbnail file 500. This position information enables access to a representative thumbnail image stored in the thumbnail file 500. For example, the entry number of the representative thumbnail image 502 as a representative image of the moving image content file 312 within the thumbnail file 500 is stored in the "thumbnail address" of the moving image file entry 414.

The "profile information" records the entry number of a video/audio entry (video audio entry) stored within the profile entry 408. The video/audio entry will be described later in detail with reference to FIG. 7C.

The meta data entry 415 stores such information as the "entry type", "parent entry list", "parent entry type", "slot valid flag", "slot chain", and "meta data". Since the "entry type", "parent entry list", "child entry list", "child entry type", "slot valid flag", and "slot chain" are the same as those described with reference to the date folder entry 411, description thereof is omitted here.

The "meta data" represents various kinds of attribute information (meta data) acquired from a content file corresponding to a parent entry as a higher hierarchical file entry to which this meta data entry belongs. The various kinds of information stored in this "meta data" will be described later in detail with reference to FIGS. 9 to 16B.

The thumbnail file 500 is a thumbnail file in which representative thumbnail images as representative images of individual content files are stored. For example, as shown in FIG. 5, as representative images of the moving image content files 311 to 316 belonging to the moving image content folder 310, representative thumbnail images 501 to 506 are stored in the thumbnail file 500. Access to each thumbnail image stored in the thumbnail file 500 can be made on the basis of the "thumbnail address" of the content attribute information 402 included in the property file 400. Also, access to each content file can be made on the basis of the "content address" of the virtual management information 401 included in the property file 400.

Next, the parent-child relationships between individual entries stored in a property file will be described in detail with reference to the drawings.

Figure 6:
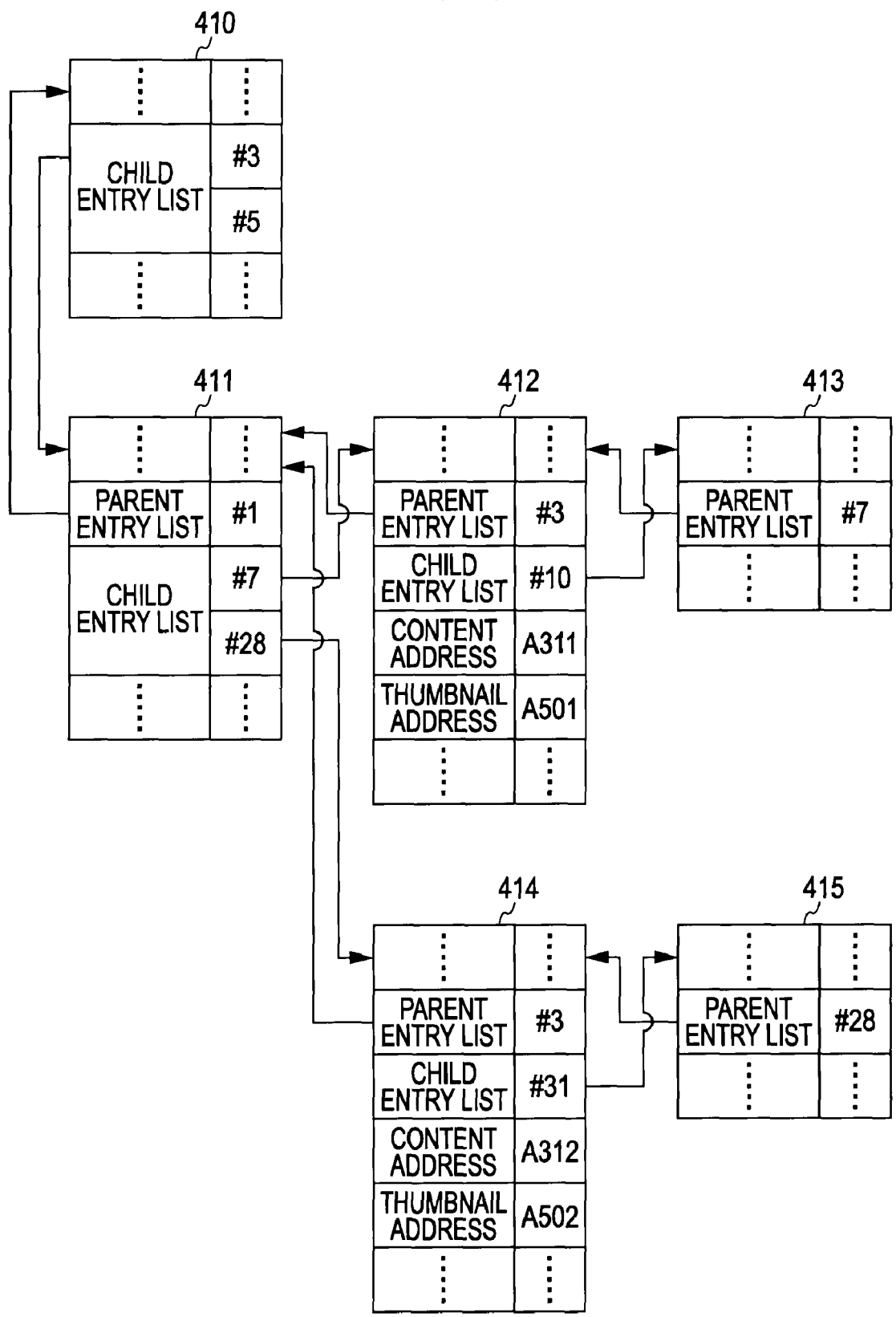
FIG. 6 is a diagram schematically showing the parent-child relationships between a moving image folder entry, a date folder entry, moving image file entries, and meta data entries.

FIG. 6 is a diagram schematically showing the parent-child relationships between the moving image folder entry 410, the date folder entry 411, the moving image file entries 412 and 414, and the meta data entries 413 and 415 shown in FIG. 4.

The moving image folder entry 410 (entry number: #1) stores such information as the "child entry list". For example, "#3" and "#5" are stored in the "child entry list".

The date folder entry 411 (entry number: #3) stores such information as the "parent entry list" and "child entry list". For example, "#7" and "#28" are stored in the "child entry list".

The moving image file entries 412 (entry number: #7) and 414 (entry number: #28) each store such information as the "parent entry list", "child entry list", "content address", and "thumbnail address". For example, in the moving image file entry 412, "#3" is stored in the "parent entry list", "#10" is stored in the "child entry list", "A311" is stored in the "content address", and "#1" is stored in the "thumbnail address". "#1" stored in the "thumbnail address" is an entry number in the thumbnail file 500, and differs from the entry number of each entry stored in the property file 400. The "thumbnail address" will be described later in detail with reference to FIGS. 7A to 7D.

The meta data entries 413 (entry number: #10) and 415 (entry number: #31) each store such information as the "parent entry list". For example, in the meta data entry 413, "#7" is stored in the "parent entry list". As for the parent-child relationships between these entries, in FIG. 6, the parent-child relationships between individual entries are indicated by arrows extending from the "parent entry list" or "child entry list". The same parent-child relationships hold between the moving image folder entry 410, the date folder entry 416, the moving file entries 417 and 419, and the meta data entries 418 and 420 shown in FIG. 4 as well.

While the property file 400 shown in FIGS. 4 and 6 represents an example of configuration in which one meta data entry is associated within one file entry, a plurality of meta data entries may be associated with one file entry. That is, a plurality of child meta data entries can be associated with one parent file entry.

For example, as the child meta data entry of the moving image file entry 412, a meta data entry (entry number: 40) (not shown) that stores GPS information is associated in addition to the meta data entry 413 that stores face meta data, and "#10" and "#40" are recorded to the child entry list of the moving image file entry 412. In this case, the storing order in the child entry list is determined in advance in accordance with the kind of meta data. This prevents data management from becoming complicated when the number of pieces of meta data increases in a case where a plurality of pieces of meta data are stored in one file entry, thus making it possible to reduce the time required for extracting a desired piece of meta data. Here, the kind of meta data may simply refer to the kind of data (kind such as face meta data or GPS), or may be the kind of coding such as whether meta data is binary data or text data.

Figure 8:
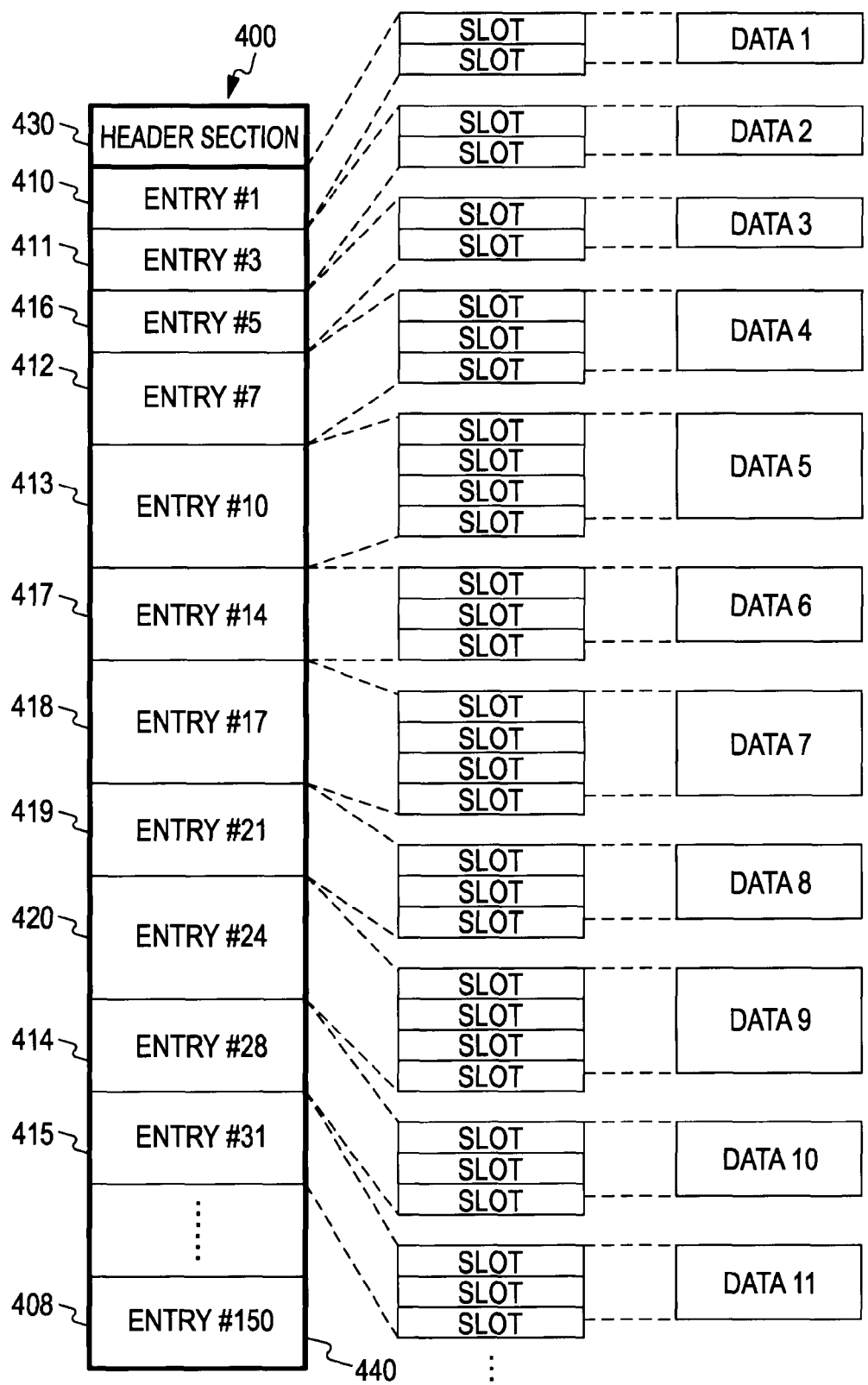
FIG. 8 is a diagram schematically showing the overall structure of a property file.

FIG. 7A is a diagram showing an example of the basic structure of the property file 400, FIG. 7B is a diagram showing the structure of slots constituting each entry, FIG. 7C is a diagram showing an example of information included in the profile entry, and FIG. 7D is a diagram showing an example of information indicating the type of content managed by the content management file 340, from among information included in a header section 430. FIG. 8 is a diagram schematically showing the overall structure of the property file 400 shown in FIG. 4.

As shown in FIG. 7A, the property file 400 is a file of a basic structure including the header section 430 and an entry portion 440. Each of these individual entries serves as a unit representing one virtual folder, one virtual file, or the like.

Each entry constituting the entry portion 440 is formed by one or a plurality of slots. One or a plurality of slots are assigned to each entry in accordance with the size of data stored in each entry. Further, slots constituting each entry are each defined as a data block of a fixed length that is determined for each file such as a property file or thumbnail file. It should be noted, however, that since the number of constituent slots varies depending on the entry, the length of each entry is variable in integer multiples of slots.

For example, as shown in FIG. 7A, two slots 441 and 442 are assigned to the moving image folder entry 410 in accordance with the data size of data 451 stored therein. Further, two slots 443 and 444 are assigned to the date folder entry 411 in accordance with the data size of data 452 stored therein.

Since the length of a slot is fixed, there are times when not the entire area of the slot is filled with valid data, leading to possible data loss. Despite this, the above-mentioned structure is preferred with a focus on the ease of data access and ease of data management realized by making the slot length fixed.

As shown in FIGS. 4 and 6, each entry constituting the entry portion 440 is managed by its entry number. This entry number is assigned in accordance with the ordinal position of the top slot constituting an entry as counted from the top of slots constituting the entire property file 400. For example, as shown in FIGS. 7A and 8, "#1" is assigned as an entry number to the moving image folder entry 410 because the top slot within this entry is the first slot as counted from the top of the slots constituting the entire property file 400. Further, "#3" is assigned as an entry number to the date folder entry 411 because the top slot within this entry is the third slot as counted from the top of the slots constituting the entire property file 400. Further, "#5" is assigned as an entry number to the date folder entry 416 because the top slot within this entry is the fifth slot as counted from the top of the slots constituting the entire property file 400. The same applies to entry numbers assigned to other individual entries. Individual entries and the parent-child relationships between the individual entries are managed on the basis of these entry numbers. When searching for an entry, the target entry is searched for by counting the slots constituting the entry portion 440 from the beginning.

As shown in FIG. 7B, each of slots constituting each entry is of a structure having a slot header section 460 and a real data section 470. The slot header section 460 includes valid/invalid flag 461 indicating whether a slot is valid or invalid, and chain 462.

In the valid/invalid flag 461, a valid flag is set when a corresponding content file is present as a valid file, and an invalid flag is set when a corresponding content file is deleted. By setting an invalid flag in the valid/invalid Flag 461 in this way when a corresponding content file is deleted, a slot corresponding to the deleted content file can be made to appear not to exist, without going through a process of deleting information within this slot. If the valid/invalid Flag 461 is not provided, the process of deleting information within the slot corresponding to the deleted content file is required, and also information within a slot located physically behind the deleted slot must be moved forward, requiring a complicated process.

The chain 462 stores such information as links for linking individual slots or linkage. Slots are linked together on the basis of the information stored in the chain 462 to form one entry. The real data of each entry is stored in the real data section 470.

In the profile entry 408, about 100 kinds of data with paired pieces of codec information related to the video and audio of each content file are recorded. As codec information related to video, a video entry (video entry) stores "encoding format (codec type)", "visual size (visual size)", "bit rate (bit rate)", and the like. As codec information related to audio, an audio entry (audio entry) stores "encoding format (codec type)", "sampling rate (sampling rate)", and the like. An entry number is assigned to each video/audio entry. A number indicating the recording order within the profile entry 408 is assigned as this entry number. For example, as shown in FIG. 7C, "#1" is assigned to the first video/audio entry 471, and "#2" is assigned to the second video/audio entry 472. This entry number of a video/audio entry is recorded in the "profile information" (shown in FIG. 5) of a file entry. Then, codec information of a content file corresponding to a file entry is read on the basis of an entry number recorded in the "profile information".

The basic structure of the thumbnail file 500 (shown in FIG. 5) is the same as that of the property file 400, with each entry including one or a plurality of slots. Each such entry serves as a unit representing one representative thumbnail image. It should be noted, however, that no header section exists in the thumbnail file 500. Each slot has a fixed length within a file, and a slot size related to this fixed length of one slot is recorded in the header section 430 of the property file 400. The correspondence between individual entries of the thumbnail file 500 is stored in the property file 400. The slot size of the thumbnail file 500 differs from the slot size of the property file 400.

The slot size of the thumbnail file 500 can be set for each thumbnail file, and this size is recorded in the header section 430 of the property file 400. Further, the thumbnail file name of the thumbnail file 500 is recorded in the header section 430.

In the thumbnail file 500, one representative thumbnail image as a representative image of a content file is recorded for each file entry corresponding to the content file. For example, in a case where a content file is a moving image, its top image displayed across the entire screen can be set as the representative image of the content file. Further, in the case of an ordinary thumbnail file, one slot corresponds to one file entry. An entry number is assigned to each of entries constituting the thumbnail file 500. This entry number of the thumbnail file is a slot number in the case of a configuration where one slot corresponds to one entry within the thumbnail file. Further, this entry number of the thumbnail file is stored in the "thumbnail address" (shown in FIG. 5) of each file entry.

Various kinds of information for managing each entry are recorded in the header section 430. For example, as shown in FIG. 7D, information indicating the types of content files managed by the content management file 340 is stored in the header section 430. In the example shown in FIG. 7D, content files managed by the content management file 340 are an HD moving image and an SD moving image, and no still images are managed. This is because there are times when still images are not managed by the content management file 340 even in the case of a content recording apparatus that can record moving and still images. When information is recorded in the header section 430 as shown in FIG. 7D, still images are managed on the basis of an ordinary file system. As for moving images, in the case of a content playback apparatus or the like in which moving images are also managed by an ordinary file system and which thus cannot understand the content management file, playback of content is executed on the basis of information of the file system. Further, in cases such as when the image capturing apparatus 100 is connected to another content playback apparatus, when a removable recording medium is moved to another content playback apparatus for content playback, or the like, if the other content playback apparatus can understand the content management file, reading or the like of a content file is executed on the basis of the content management file. The entry number of the profile entry 408 (entry number: #150) is recorded in the header section 430. This makes it possible to locate the position of the profile entry from among individual entries constituting the entry portion 440.

FIG. 8 schematically shows the relationship between individual entries constituting the property file 400 shown in FIG. 4, slots corresponding to the individual entries, and data stored in individual slots. The name of each entry is omitted and only its entry number is shown.

Figure 9:
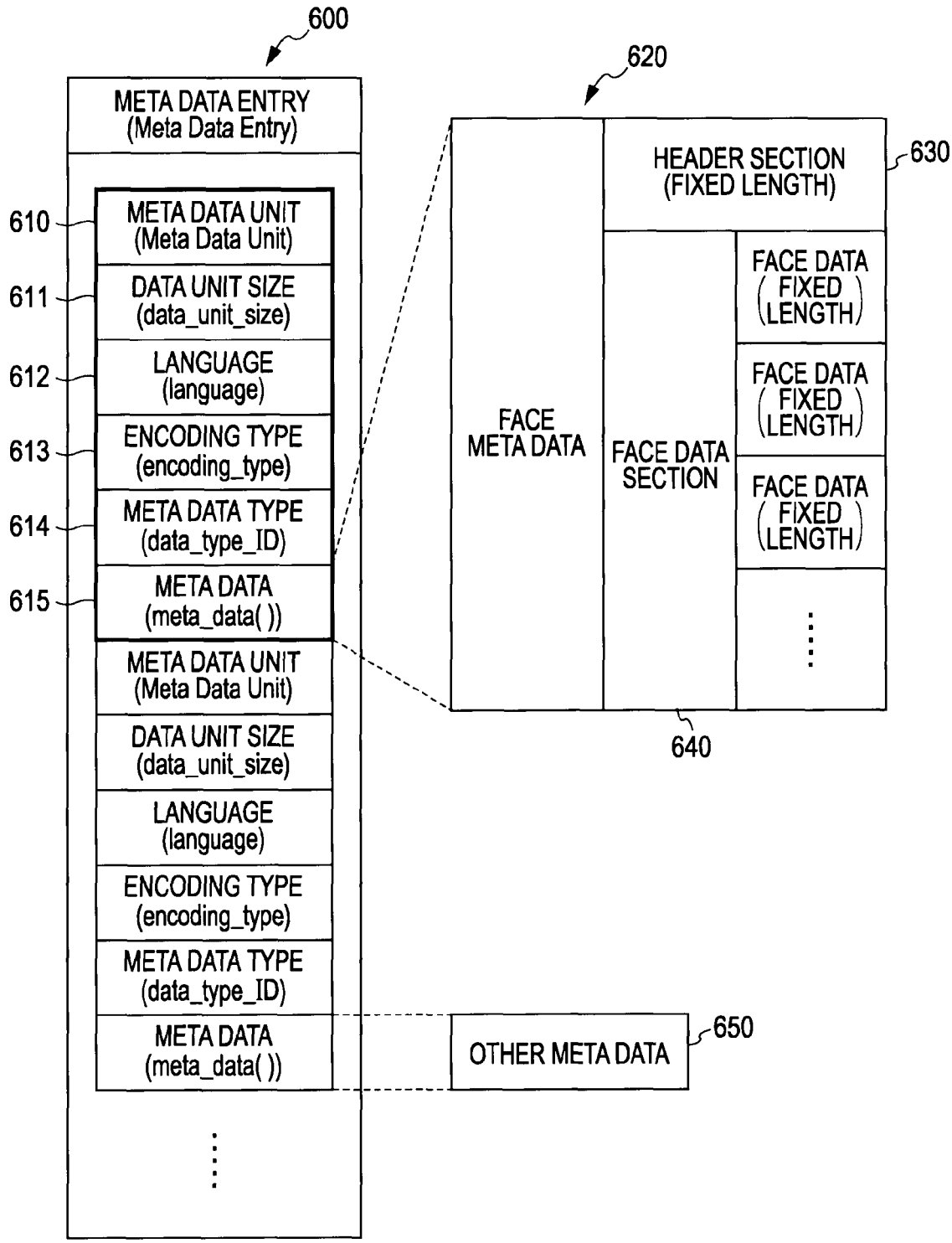
FIG. 9 is a diagram schematically showing the internal configuration of a meta data entry.

FIG. 9 is a diagram schematically showing the internal configuration of meta data entry 600. The meta data entry 600 corresponds to the meta data entry 413, 415, 418, 420 shown in FIG. 4, FIG. 6, or the like. Further, in the embodiment of the present invention, face meta data is recorded for every one moving image content file.

The meta data entry 600 includes one or a plurality of meta data units (Meta_Data_Units) 610. Each meta data unit 610 includes data unit size (data_unit_size) 611, language (language) 612, encoding type (encoding_type_ID) 613, meta data type (data_type_ID) 614, and meta data (meta_data( )) 615.

The data unit size 611 records the size of meta data stored in the meta data unit 610. The language 612 records the language of meta data stored in the meta data unit 610. The encoding type 613 records the encoding type of meta data stored in the meta data unit 610. The meta data type 614 records information for identifying the kind of each individual meta data.

The meta data 615 records face meta data, and other meta data 650 as meta data other than the face meta data. For example, such information as the title information or genre information of a content file is stored as the other meta data 650.

Face meta data 620 includes a header section 630 and a face data section 640. The header section 630 stores information for managing face meta data. The header section 630 has a fixed length for every moving image content file. The face data section 640 records face data for every face recorded as face meta data with respect to a face detected from a moving image content file. For example, the face data section 640 stores pieces of face data 621 to 623. As shown in FIG. 11, each of these pieces of face data include such data as face detection time information, face basic information, face score, and smile score. Further, the face data section 640 has a fixed length within one moving image content file. Since the header section 603 and the face data section 640 have fixed lengths as described above, access to face data can be made easily.

The configuration of the other meta data 650 is the same as the configuration of the face meta data 620.

In an embodiment of the present invention, of faces detected in one frame, the value of face data to be recorded into the face data section is specified. For example, on the basis of a predetermined condition such as the size of a face detected in one frame or a face with a higher face score, the maximum value of face data to be recorded into the face data section can be specified and restricted. By placing a restriction in this way, it is possible to prevent a strain from being placed on the capacity of the recording medium 170 due to unnecessary faces (faces with poor conditions, faces that are not face-like, and the like) in one frame being recorded into the face data section.

When recording moving image content files onto the recording medium 170, if face data is created for every one of the faces detected by a face detection engine, the size of created face data will become enormous. The size further increases when the face detection time interval is short. Accordingly, if the number of pieces of face data of faces to be recorded with respect to a frame at time t0 is the same as the number of pieces of face data of faces to be recorded with respect to a frame at time t1 that is the time of the next detection, the face data with respect to the faces detected at time t1 will not be recorded into the face data section. This is because, since the number of detected faces are the same, it is highly likely that meta data related to the same face will be recorded. That is, face data is recorded only when there is a change in the number of pieces of face data to be recorded before and after the time of face detection, thereby preventing unnecessary, overlapping pieces of face data from being recorded onto the recording medium. As described above, according to an embodiment of the present invention, there is no need to create face data with respect to all of faces detected in one frame.

Figure 10:
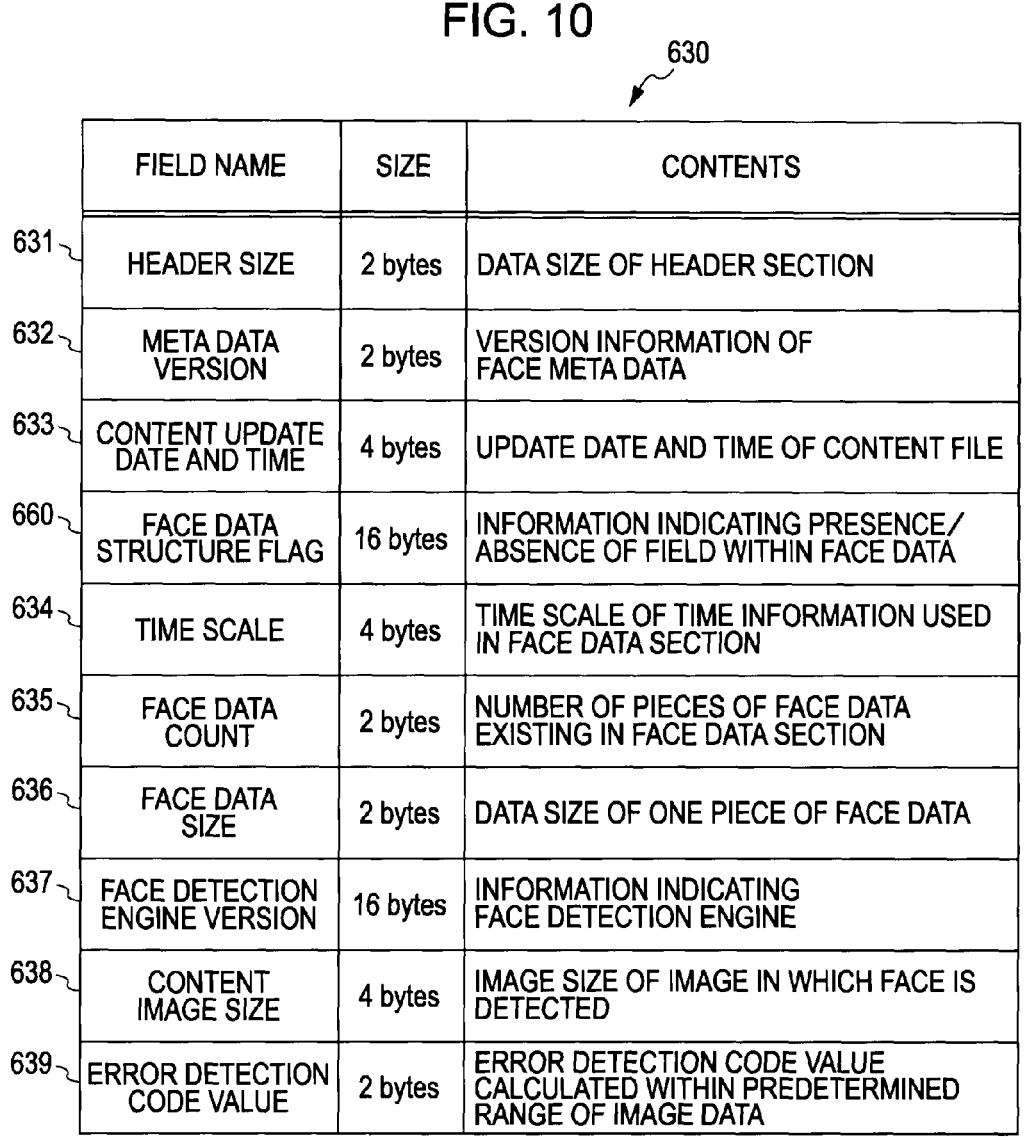
FIG. 10 is a diagram schematically showing various kinds of information stored in a header section.

FIG. 10 is a diagram schematically showing various kinds of information stored in the header section 630.

The header section 630 stores header size 631, meta data version 632, content update date and time 633, face data structure flag 660, time scale 634, face data count 635, face data size 636, face detection engine version 637, content image size 638, and error detection code value 639. The storage units of these pieces of data are specified in bytes, as indicated by the word "size" in FIG. 10.

The header size 631 stores the data size of the header section 630. Due to the header size 631, when accessing the face data section 640, access can be immediately made to the face data section 640 by jumping over the header section 630. 2 bytes is specified as the data size.

The meta data version 632 stores the version information of face meta data recorded in the face data section 640 corresponding to the header section 630. When playing back a content file by a content playback apparatus, by checking the contents of information stored in the meta data version 632, the content playback apparatus itself can confirm whether or not the data can be supported by the content playback apparatus. In the embodiment of the present invention, for example, "1.00" is recorded. Further, 2 bytes is specified as the data size, the upper 8 bits indicate major version, and the lower 8 bits indicate minor version. If the face meta data format is extended in the future, the updated version information is stored.

The content update date and time 633 stores update date and time recorded in a moving image content file. For example, in cases such as when a moving image content file photographed with the image capturing apparatus 100 is moved to another apparatus and edited, and then the edited moving image content file is recorded onto the image capturing apparatus 100 again, a mismatch occurs between the edited moving image content file and face meta data. Specifically, a case in point here is one in which a moving image content file is moved in the steps (1) to (3) described below. In such a case, this mismatch is detected, and face meta data is detected from a moving image content file B again, thereby making it possible to correct the mismatch that has occurred between the edited moving image content file and face meta data.

(1) Step 1

A moving image content file A is recorded by a content recording apparatus A, and face meta data corresponding to the moving image content file A is generated. In this case, the creation date and time and update date and time of the moving image content file A are the same as the content update date and time of the face meta data.

(2) Step 2

The moving image content file A is moved to a content playback apparatus B, and then edited on the content playback apparatus B, creating a moving image content file B. In this case, the update date and time of the moving image content file B is updated to the date and time of editing.

(3) Step 3

The moving image content file B is returned to the content recording apparatus A. In this case, the content update date and time differs between the moving image content file B and the face meta data.

The face data structure flag 660 stores a flag indicating the presence/absence of meta data defined by face data stored in the face data section 640. The face data structure flag 660 will be described later in detail with reference to FIGS. 12 to 16B.

The time scale 634 stores the time scale (value indicating the number of units per second) of time information used in the face data section. That is, while information indicating the time a face was detected from a moving image content file (face detection time information) is recorded as face data in the face data section, the time scale of that time information is stored in the time scale 634. The unit is in Hz.

The face data count 635 stores information indicating the number of pieces of face data recorded subsequent to the header section 603. "0" is recorded if no face is detected.

The face data size 636 stores information indicating the data size of one piece of face data recorded subsequence to the header section 630. It is possible to jump between individual pieces of face data on the basis of the information stored in the face data size 636. "0" is recorded if no face was detected.

The face detection engine version 637 records information related to a face detection engine for detecting a face from a moving image content file. At the time of playing back face meta data, this information is used as an index to indicate whether or not to detect face meta data again, upon recognizing that the detected face meta data is face meta data detected by a face detection engine having lower performance than the face detection engine of the own system. Information related to a face detection engine is described in, for example, the ASCII code.

For example, in a case where the meta data version is "1.00", individual pieces of data are recorded into the face data section 640 in the data order as shown in FIG. 11. Therefore, since each piece of data has a fixed length and is arranged at a predetermined position, when it is recognized by a content playback apparatus that the meta data version is "1.00", access can be quickly made to the position of a desired piece of data in the face data section 640.

The content image size 638 records information indicating the height and width of an image from which a face is detected. The error detection code value 639 records information indicating an error detection code value (error correction code value) calculated within a predetermined range in the image from which a face is detected. For example, the error detection code value 639 records the value of a checksum calculated from corresponding image data at the time of creation of face meta data. As the error detection code value, a CRC (Cyclic Redundancy Check), a hash value using a hash function, or the like can be used.

Like the content update date and time 633, the content image size 638 and the error detection code value 639 are used for detecting a mismatch that occurs between a moving image content file and face meta data. The mechanism of this mismatch occurrence is similar to that described above with reference to (1) Step 1 to (3) Step 3. For example, while there are a number of still image editing software programs for editing a still image content file, in some of these still image editing software programs, the content update date and time information within content is not updated even when a still image has been edited. In such a case, a mismatch can be detected with greater reliability by making a comparison using the content image size in addition to a comparison using the content update date and time.

FIG. 11 is a diagram schematically showing face data stored in the face data section 640. In the face data section 640, individual pieces of face data are stored in the descending order of the numbers of bits assigned in the face data structure flag 660 of the header section 630.

The face data section 640 records face detection time information 641, face basic information 642, face score 643, smile score 644, and face importance 645. The storage unit of these pieces of information is specified in bytes. The following description will be directed to the case of meta data that is defined as face data in a case where the meta data version is "1.00" as described above.

The face detection time information 641 records, with the top of the corresponding moving image content file taken as "0", the time of a frame in which this face data was detected. The face detection time information 641 stores a value of an integer multiple of a time scale stored in the time scale 634 of the header section 630.

The face basic information 642 stores the position and size of a face detected from each of frames constituting a moving image content file. As the face basic information 642, face position information is specified by the upper 4 bytes, and face size information is specified by the lower 4 bytes. The face position information represents, for example, the value of a difference between an upper left portion in an image from which a face is detected and an upper left portion of the detected face. The value of a position on the horizontal axis is specified by the upper 16 bits, and the value of a position on the vertical axis is specified by the lower 16 bits. The face size information represents, for example, a value indicating the image size of a detected face. A value indicating the width of a face is specified by the upper 16 bits, and a value indicating the height of a face is specified by the lower 16 bits. The face basic information 642 is the most important meta data for an application that uses face meta data.

The face score 643 stores information related to a score indicating the faceness of a detected face.

The smile score 644 stores score information related to the degree of smiling of a detected face.

The face importance 645 stores information indicating the priorities (importance) of images detected at the same time. Accordingly, for example, in a case where a plurality of faces were detected in one frame, it is possible to assign higher priorities to faces located closer to the center of a screen or to assign a high priority to a face that is being focused. As for the information to be stored, assuming, for example, that a smaller value indicates a greater importance, "1" can be specified as indicating the greatest importance. Accordingly, for example, in the case of using a mobile device with a small display section for displaying an image, instead of displaying the entire face image small, only a face with a high priority can be displayed large.

In the embodiment of the present invention, pieces of face data are recorded in the order of their detection times. This enables quick retrieval when retrieving face data by time. Further, assuming that the type of meta data included in all pieces of face data is the same within the same moving image content file, pieces of face data are recorded in the order as shown in FIG. 11. It should be noted, however, that although it is not necessary to record all the pieces of data shown in FIG. 11, the same kind of meta data is recorded in the same moving image content file. Accordingly, all the pieces of face data have a fixed length, thus improving the ease of access to face data. Since the same kind of meta data is stored in the same moving image content file, it is possible to improve the ease of access to a predetermined piece of meta data.

FIG. 12 is a diagram showing the data structure of the face data structure flag 660 of the header section 630 shown in FIG. 10. FIGS. 13A to 16B are diagrams showing the relationship between bits stored in the face data structure flag 660, and face data stored in the face data section 640.

In the embodiment of the present invention, as shown in FIG. 11, since five pieces of meta data are defined in the face data section 640, the individual pieces of data are assigned to the 0th to 4th bits sequentially from the LSB (Least Significant Bit) of the face data structure flag 660 in accordance with the data order in the face data section 640. Information indicating the presence/absence of data in a data field of face meta data is stored in each bit of the face data structure flag 660. That is, in each bit of the face data structure flag 660, "1" is stored if data exists in a data field of face meta data, and "0" is stored if data does not exist. In this way, "1" is set for the corresponding bit if meta data that exists in the face data section 640 exists. The area from the sixth bit onwards is reserved for future data extension within face data.

Specifically, as shown in FIG. 13A, for example, it is assumed that data specified in the meta data version "1.00" is stored in the face data section 640. In this case, as shown in FIG. 13B, "1" is stored in each of the 0th to 4th bits from the LSB. The content recording apparatus does not need to record all the pieces of defined data but can record only necessary data. This enables flexible recording of face meta data in accordance with an application using face meta data, which also enables a reduction in data size.

Figures 14A, 14B:
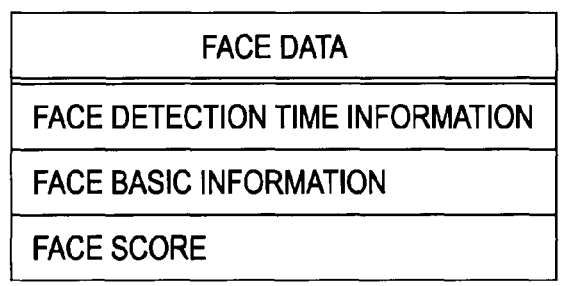
FIGS. 14A and 14B are diagrams showing the relationship between bits stored in face data structure flag, and face data stored in a face data section.

Further, as shown in FIG. 14A, it is assumed that of five pieces of data specified in the meta data version "1.00", three pieces of data are stored in the face data section 640 by another content recording apparatus. In this case, pieces of face data are to be recorded in the order as shown in FIG. 11. Pieces of data that are not to be recorded are deleted and the subsequent pieces of data are moved up. FIG. 14B shows an example of the real data of the face data structure flag 660 recorded by the above-mentioned other content recording apparatus. "1" is stored in a flag assigned to a data field existing as face data. As described above, as long as meta data is one whose meta data version is specified in "1.00", the content recording apparatus can record any kind of meta data. Further, even when different meta data has been recorded by another content recording apparatus, a content playback apparatus for playing back face meta data can check the presence/absence of meta data within face data by referring to information in the header section. Further, since face data has a fixed length, access can be made to a desired piece of meta data at high speed.

Next, with reference to the drawings, a description will be given of an extension method for face data stored in the face data section 640 in the embodiment of the present invention.

In cases such as when the face detection technology is improved in the future or the results of a detected face are to be used by a new application, there may arise situations where using only face meta data specified in the meta data version "1.00" proves inadequate.

FIG. 15A shows an example of extended face data. In this example, "gender score" indicating the degree of gender of a detected face, and "angle information" indicating the degree of tilting of a face on a frame are shown as extended face data. The meta data version of the face meta data with these pieces of face data added thereto is defined as "1.10", and "1.10" is recorded in the meta data version field of the header section. Extension of meta data is performed by adding new meta data under data defined in the previous version. Specifically, when recording data onto the recording medium 170, data specified in the version "1.10" is recorded starting at a physical address succeeding the physical address where data specified in the version "1.00" is recorded on a face data-by-face data basis. Then, likewise, recording of the next meta data on a face data-by-face data basis is started at an address succeeding the physical address where the meta data specified in the version "1.10" is recorded.

FIG. 16B shows meta data recorded by a given recorder, from among meta data defined in the version "1.10". For example, even when recording the extended face data shown in FIG. 15A, it is not necessary to record all the pieces of face data shown in FIG. 15A. It should be noted, however, that in a case where there are pieces of face data that are not recorded as described above, of the face data shown in FIG. 15A, predetermined pieces of face data are recorded in the order as shown in FIG. 16A. Fields in which no face data is to be recorded are deleted and the subsequent fields are moved up.

Further, the face data structure flag is also extended following the upgrading to the version "1.10", a new bit is assigned in accordance with the field order defined as shown in FIG. 15A to the bit that was a reserved area at the time of the version "1.00", and "1" is set to bits with data present in the face data section as shown in FIG. 15B. Accordingly, a player that supports the version "1.10" can understand the data structure of the face data section by checking the bit string of the face data structure flag in the header section. Since each individual piece of face data has a fixed length, access can be quickly made to a desired piece of meta data.

Now, a case is considered in which face meta data is recorded onto a removable recording medium by a recorder that supports the version "1.10", and this recording medium is moved to a player that supports only the version "1.00". In this case, this player can recognize the 0th to 4th bits of the face data structure flag of the face data section. Further, since the specification of the face data size has not been changed, even if a piece of face data not assumed by the version "1.00" is stored, this player can recognize the pieces of face data specified in the version "1.00". For example, in the case shown in FIGS. 16A and 16B, this player can understand the "face detection time information", "face basic information", "face score", and "face importance". This player can thus access these pieces of meta data. As described above, a meta data entry represents a data structure that provides excellent ease of access, and even when the version of a recorder or player has been changed, adaptation to such change can be made.

Next, a description will be given of an example of the functional configuration of the image capturing apparatus 100 according to the embodiment of the present invention with reference to the drawings.

Figure 17:
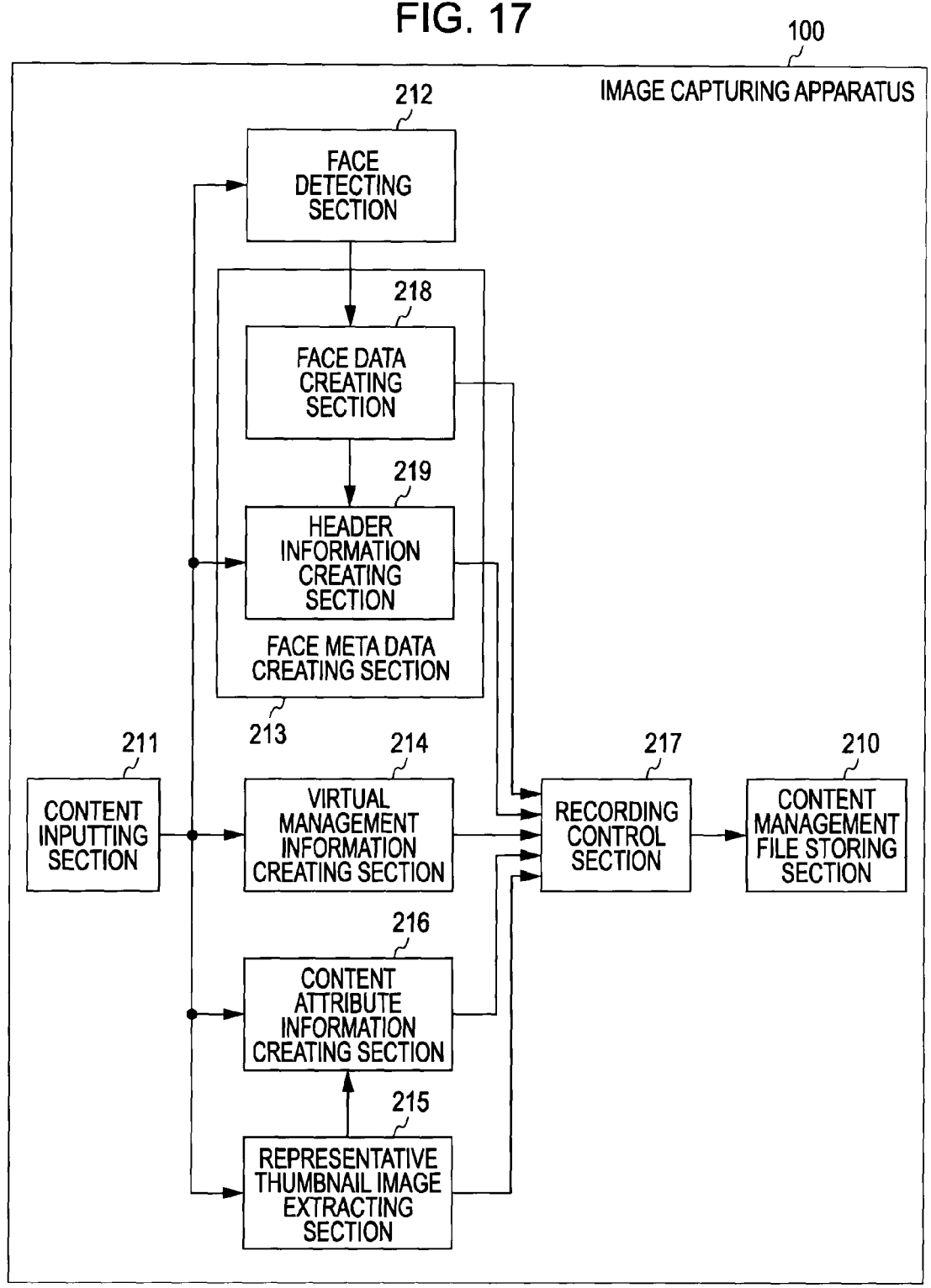
FIG. 17 is a block diagram showing an example of the functional configuration of an image capturing apparatus.

FIG. 17 is a block diagram showing an example of the functional configuration of the image capturing apparatus 100 according to the embodiment of the present invention. The image capturing apparatus 100 includes a content management file storing section 210, a content inputting section 211, a face detecting section 212, a face meta data creating section 213, a virtual management information creating section 214, a representative thumbnail image extracting section 215, a content attribute information creating section 216, and a recording control section 217.

The content management file storing section 210 stores a content management file 340 that records hierarchical entries organized in a virtual hierarchical structure. The details of the content management file 340 are illustrated in FIGS. 3 to 9 and the like.

The content inputting section 211 inputs content files, and outputs the inputted content files to the face detecting section 212, the face meta data creating section 213, the virtual management information creating section 214, the representative thumbnail image extracting section 215, and the content attribute information creating section 216. Specifically, frames photographed with the camera section 110 are sequentially inputted from the content inputting section 211.

The face detecting section 212 detects a face included in the content files inputted from the content inputting section 211, and outputs the time of appearance, position, and the like of the detected face to the face meta data section 213. If a plurality of faces are detected from images captured at the same time, the time of appearance, position, and the like of each of the detected faces are outputted to the face meta data creating section 213.

The face meta data creating section 213 creates face meta data on the basis of content files inputted from the content inputting section 211, and outputs the created face meta data to the recording control section 217. The face meta data creating section 213 includes a face data creating section 218 and a header information creating section 219. On the basis of the time of appearance, position, and the like of a face detected by the face detecting section 212, the face data creating section 218 creates face data (the individual pieces of data in the face data section 640 in FIG. 11) related to that face. The header information creating section 219 creates header information (the individual pieces of information in the header section 630 in FIG. 10) for managing face data created by the face data creating section 218. The face data created by the face data creating section 218 and the header information created by the header information creating section 219 are outputted to the recording control section 217. The face data creating section 218 may not create face data related to a face, with respect to a face that does not satisfy a predetermined condition from among faces detected at a predetermined interval.

The virtual management information creating section 214 creates the virtual management information 401 (FIG. 5) for virtually managing content files inputted from the content inputting section 211, on the basis of the content file, and outputs the created virtual management information to the recording control section 217.

The representative thumbnail image extracting section 215 extracts, from content files inputted from the content inputting section 211, the representative thumbnail images 501 to 506 (FIG. 5) of the content files, and outputs the extracted representative thumbnail images to the content attribute information creating section 216 and the recording control section 217.

The content attribute information creating section 216 creates the content attribute information 402 (FIG. 5) related to content files inputted from the content inputting section 211, on the basis of the content files, and outputs the created content attribute information to the recording control section 217. Also, the content attribute information creating section 216 creates attribute information by adding, to content attribute information related to content files corresponding to the representative thumbnail images extracted by the representative thumbnail image extracting section 215, the recording positions (thumbnail addresses) of the representative thumbnail images in the thumbnail file 500.

The recording control section 217 records the moving image file entry 414 including the virtual management information 401 created by the virtual management information creating section 214 and the content attribute information 402 created by the content attribute information creating section 216, to the content management file storing section 210 as the property file 400. Also, the recording control section 217 records the meta data entry 415 including face meta data created by the face meta data creating section 213, to the content management file storing section 210 as an hierarchical entry at a lower hierarchical level in the property file 400 than the moving image file entry 414 corresponding to the content file in which that face meta data is created. Further, the recording control section 217 records the representative thumbnail images extracted by the representative thumbnail image extracting section 215 to the content management file storing section 210 as the thumbnail file 500.

Figure 18:
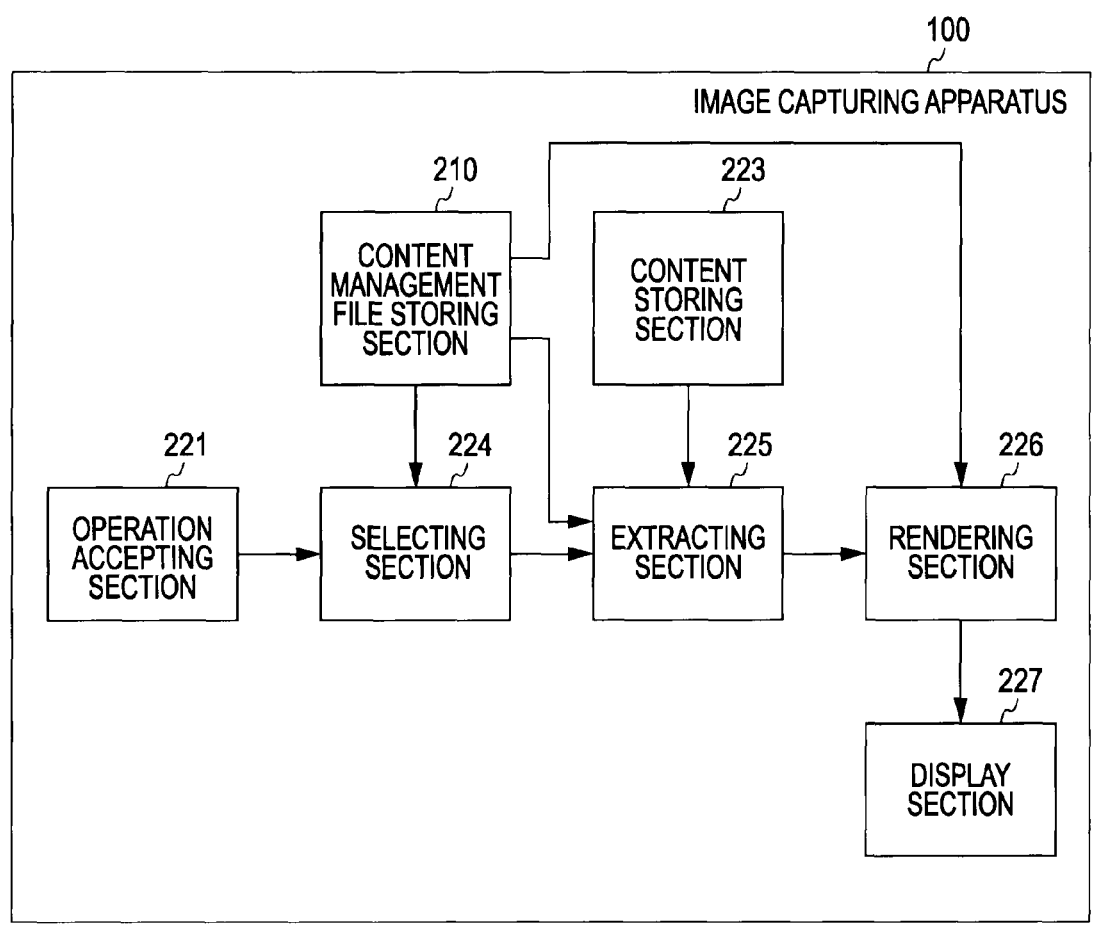
FIG. 18 is a block diagram showing an example of the functional configuration of an image capturing apparatus.

FIG. 18 is a block diagram showing an example of the functional configuration of the image capturing apparatus 100 according to the embodiment of the present invention. The image capturing apparatus 100 includes the content management file storing section 210, an operation accepting section 221, a content storing section 223, a selecting section 224, an extracting section 225, and a rendering section 226.

The content management file storing section 210 stores the content management file 340 recorded by the recording control section 217 (FIG. 17). Further, the content management file storing section 210 outputs individual entries recorded in the content management file 340 to the selecting section 224 and the extracting section 225.

The operation accepting section 221 includes various input keys. Upon accepting an operation input from these input keys, the operation accepting section 221 outputs the details of the accepted operation input to the selecting section 224. At least a part of the operation accepting section 221 and a display section 227 may be formed integrally as a touch panel.

The content storing section 223 stores content files such as moving images or still images, and outputs the recorded content files to the extracting section 225 and the rendering section 226.

The selecting section 224 executes a selection process according to an operation input inputted from the operation accepting section 221, and outputs the selection results to the extracting section 225. Specifically, when an operation input for selecting one representative thumbnail image from among representative thumbnail images displayed on the display section 227 is inputted from the operation accepting section 221, in response to the operation input, the selecting section 224 selects a file entry corresponding to the selected representative thumbnail image, and outputs the entry number of the selected file entry to the extracting section 225. Further, when an operation input for selecting one face thumbnail image from among face thumbnail images displayed on the display section 227 is inputted from the operation accepting section 221, in response to the operation input, the selecting section 224 selects face data corresponding to the selected face thumbnail image, and outputs the face detection time information 641 of the selected face data to the extracting section 225. That is, the selecting section 224 selects a desired file entry from among file entries recorded in a content management file stored in the content management file storing section 210, and also selects a desired piece of face data from among the pieces of face data of face meta data included in meta data entries.

The extracting section 225 extracts a content file stored in the content storing section 223 on the basis of the entry number of a file entry inputted from the selecting section 224. Also, the extracting section 225 extracts face data included in a meta data entry recorded at a lower hierarchical level than a file entry corresponding to the entry number inputted from the selecting section 224, and on the basis of the time, position, and the like of a face included in this face data, extracts a face thumbnail image corresponding to this face data from the content file. Further, the extracting section 225 extracts a content file on the basis of a file entry recorded at a higher hierarchical level than a meta data entry including the face detection time information 641 of the selected face data inputted from the selecting section 224. Further, the extracting section 225 extracts a moving image recorded after the recording time corresponding to the face detection time information 641 inputted from the selecting section 224, from a content file stored in the content storing section 223. The extracting section 225 outputs these extraction results to the rendering section 226. The above-mentioned selections and extractions will be described later in detail with reference to FIGS. 19 and 20.

Further, the extracting section 225 checks whether or not an image corresponding to a content file stored in the content storing section 223 and face data corresponding to this image satisfy a predetermined condition. The extracting section 225 then calculates, with respect to face data related to a face included in an image that satisfies the predetermined condition, the recording offset value of desired element information from the top in each piece of face data, and reads the desired element information from face data on the basis of this calculated recording offset value. Further, if the predetermined condition is not satisfied, the extracting section 225 retrieves face data and face data management information corresponding to an image different from the image that has been judged as not satisfying the predetermined condition. This reading of element information will be described later in detail with reference to FIGS. 26, 27, 32, and 33.

The rendering section 226 renders, on the basis of the extraction results inputted from the extracting section 225, face thumbnail images extracted from content files stored in the content storing section 223, moving images extracted from content files stored in the content storing section 223, or the like. Also, the rendering section 226 renders representative thumbnail images stored in the thumbnail file 500 of the content management file storing section 210.

The display section 227 displays images rendered by the rendering section 226.

Next, the relationships between a property file, a thumbnail file, and a moving image content file will be described in detail with reference to the drawings.

Figure 19:
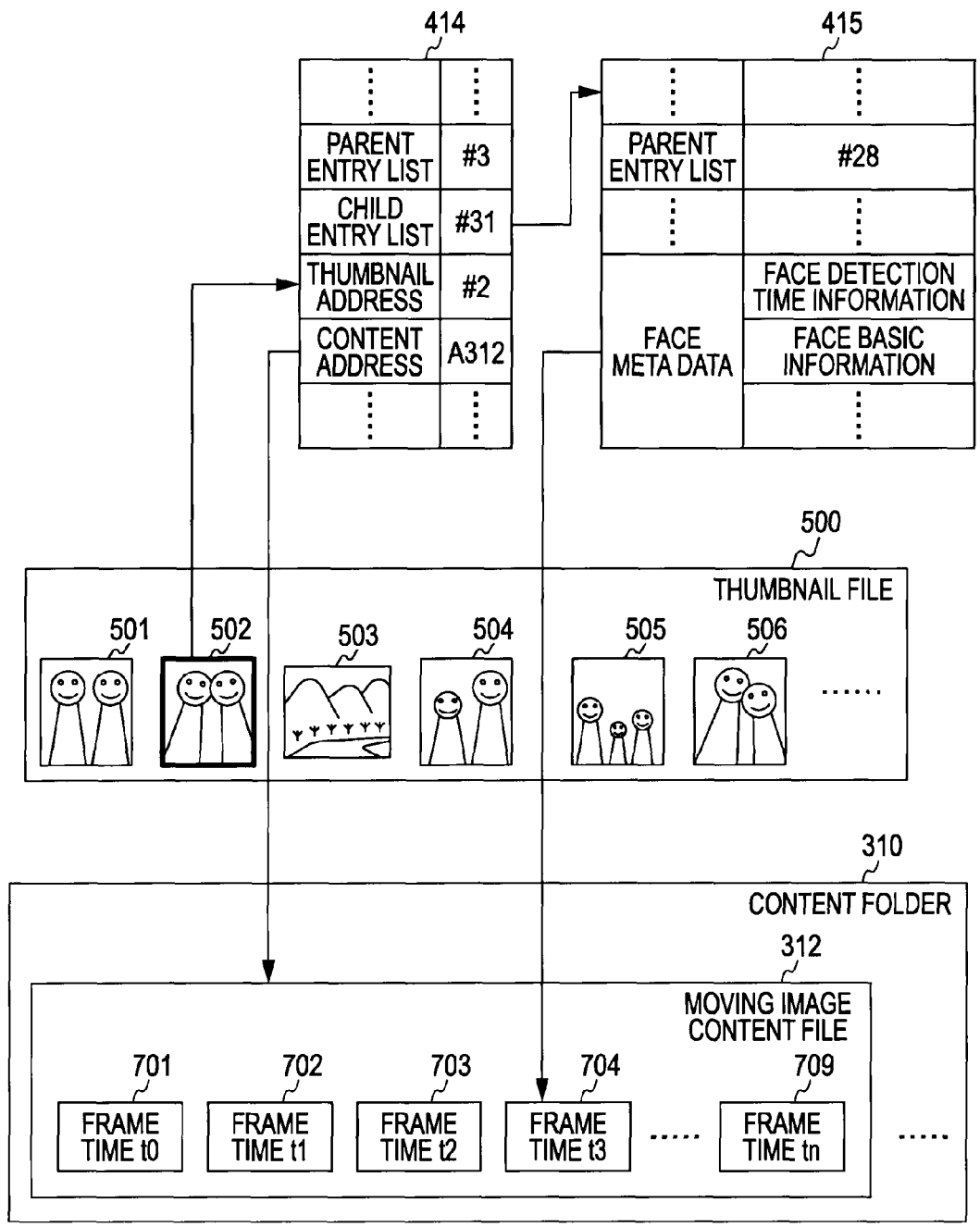
FIG. 19 is a diagram schematically showing the relationships between a moving file entry, a meta data entry, a thumbnail file, and a moving image content file.

FIG. 19 is a diagram schematically showing the relationships between the moving file entry 414, the meta data entry 415, the thumbnail file 500, and the moving image content file 312.

For example, as shown in FIG. 19, the moving image file entry 414 stores "A312" indicating the content address of the moving image content file 312, and "#2" indicating the thumbnail address of the representative thumbnail image 502 corresponding to the moving image content file 312. The child entry list of the moving image file entry 414 stores "#31" indicating the entry number of the meta data entry 415 in which meta data related to the moving image content file 312 is stored. The parent list of the meta data entry 415 stores "#28" indicating the entry number of the moving image file 414. Further, as shown in FIGS. 9 and 11, the face meta data of the meta data entry 415 stores various kinds of face meta data related to a detected face. One frame can be identified from individual frames of the moving image content file 312 on the basis of the face detection time information and face basic information of this face meta data. The relationships between these pieces of data are indicated by arrows.

By associating the contents of individual entries with each other in this way for management, it is possible to perform a search a content file quickly.

For example, to display a list of moving images photographed on Jan. 11, 2006, of the individual entries of the property file 400, the moving image folder entry 410 that manages moving image content files is searched. Then, from the date folder entries 411 and 416 stored in the child entry list within the moving image folder entry 411 thus searched, the date folder entry 411 that manages a file corresponding to the date of Jan. 11, 2006 is searched. Subsequently, the moving image file entries 412 and 414 stored in the child entry list of the date folder entry 411 thus searched are searched, and the thumbnail address (entry reference information) of the thumbnail file 500 recorded in each of the moving image file entries 412 and 414 is extracted. Subsequently, the thumbnail file 500 is opened, and a representative thumbnail image is extracted from the thumbnail file 500 on the basis of the extracted thumbnail address, and the extracted representative thumbnail address is displayed.

When displaying a list of moving images photographed on Jan. 11, 2006 without using the content management file 340, all the real content files must be opened and closed in order to search the individual content files, which requires a long processing time. Further, when displaying a representative thumbnail image, a process of compressing an image corresponding to a real content file for display is required, leading to a further increase in processing time.

For example, when displaying the faces of persons appearing in a moving image recorded on Jan. 11, 2006, the moving image file entry 414 and the meta data entry 415 are extracted on the basis of the representative thumbnail image 502 being displayed, the moving image content file 312 managed by the moving image file entry 414 is accessed, face images are extracted from the moving image content file 312 on the basis of face meta data (the face detection time information 641 and the face basic information 642) stored in the meta data entry 415, and the extracted face images can be displayed.

Figure 20:
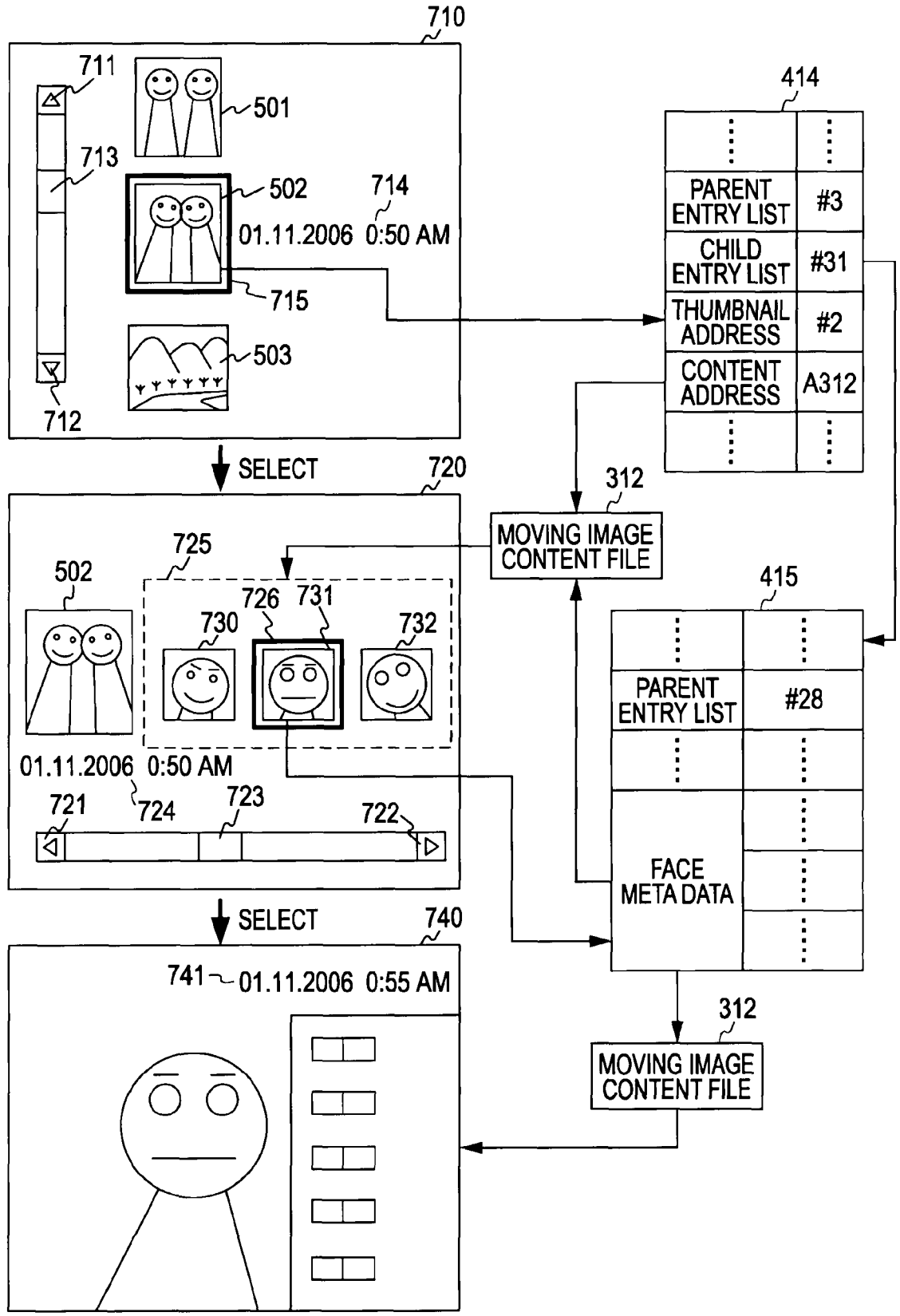
FIG. 20 is a diagram showing an example of an application using a content management file.

FIG. 20 is a diagram showing an example of an application using the content management file 340. A description will be given here of a case where various images related to the moving image content file 312 are displayed on the LCD 162, and an image corresponding to the moving image content file 312 is played back from a desired point in time.

First, as shown in FIG. 19, the thumbnail file 500 is opened, and a list of the representative thumbnail images 501 to 506 stored in the thumbnail file 500 are displayed on the LD 162. For example, as indicated by a display screen 710, the representative thumbnail images 501 to 503 are displayed. On the right side of the representative thumbnail image 502 marked with a selection mark 715, recording date and time 714 of the moving image content file 312 corresponding to the representative thumbnail image 502 is displayed. By depressing an upper button 711 and a lower button 712, a scroll bar 713 can be moved up and down to move representative thumbnail images displayed on the displayed screen 710 up and down, thereby displaying other representative thumbnail images. Representative thumbnail images can be displayed from the top in the order of their recording date and time, for example.

When an operation input for selecting the representative thumbnail image 502 is made on the display screen 710, on the basis of a content address stored in the moving image file entry 414 corresponding to the representative thumbnail image 502, the moving image content file 312 corresponding to the moving image file entry 414 is extracted. Then, on the basis of the child entry list stored in the moving image file entry 414, the meta data entry 415 corresponding to the moving image file entry 414 is extracted. Subsequently, on the basis of face meta data stored in the meta data entry 415, face thumbnail images are extracted from the moving image content file 312, and a list of the extracted face thumbnail images is displayed on the LCD 162. Each of these face thumbnail images is, for example, a rectangular image including the face of one person. Further, as indicated by, for example, a display screen 720, the representative thumbnail image 502 selected on the display screen 710 is displayed on the left side, and extracted face thumbnail images 730 to 732 are displayed in a face thumbnail image display area 725 on the right side. A face thumbnail image that is being selected is marked with a selection mark 726. Also, recording date and time 724 of the moving image content file 312 corresponding to the representative thumbnail image 502 selected on the display screen 710 is displayed. By depressing a left button 721 and a right button 722, a scroll bar 723 can be moved to the left and right to move face thumbnail images displayed on the displayed screen 720 to the left and right, thereby displaying other face thumbnail images. Face thumbnail images can be displayed from the left in the order of their recording date and time, for example.

When an operation input for selecting the face thumbnail image 731 is made on the display screen 720, from among pieces of face detection time information of face meta data stored in the meta data entry 415, face detection time information corresponding to the face thumbnail image 731 is extracted. In this case, on the basis of the ordinal position of the selected face thumbnail image 731 as counted from the top, a piece of face meta data corresponding to the face thumbnail image 731 is identified from face meta data stored in the meta data entry 415, and face detection time information included in this face data is extracted. Subsequently, on the basis of the extracted face detection time information, a playback image starting from the time corresponding to face detection time information of the moving image content file 312 is displayed on the LCD 162. For example, as shown in FIG. 19, a moving image is played back starting from the frame 704 of the moving image content file 312. Then, as indicated by the display screen 740, the playback image is displayed, and recording date and time 741 of the playback image is displayed in an upper right portion. When it is desired to play back a moving image from a point in time at which a predetermined person (for example, the user himself/herself) appears, the moving image can be readily played back from that point in time by selecting a face thumbnail image related to that person. In a case where a plurality of faces are detected from images captured at the same time, a plurality of pieces of face data captured at the same time are created. In this case, face thumbnail images are extracted on the basis of the individual pieces of face data. Therefore, there are cases where a plurality of face thumbnail images captured at the same time are displayed. In a case where a plurality of face thumbnail images captured at the same time are displayed as described above, a moving image is played back from the same time when one of the face thumbnail images captured at the same time is selected.

Since linkage information (content address) from entries in the virtual file structure to the real file structure is stored as described above, when retrieving and playing back a content file from a given piece of information (for example, information related to recording date and time) within a file entry, a file entry in which the date and time information is recorded is retrieved, and a content file can be played back on the basis of a content address within that file entry. As described above, since it suffices to open only the property file without opening all of content files, and due to the fixed-length management (entry-number management) using slots, fast processing can be performed.

Provided that the same retrieval is done in a case where virtual file management is not performed, this requires a process of actually opening a content file, reading information (for example, recording date and time information) within the content file, closing the file, and then opening the next content file, which takes enormous amount of time. Since the number of contents to be recorded increases as the recording capacity of a recording medium becomes larger, this problem becomes even more pronounced.

Next, operation of the image capturing apparatus 100 according to the embodiment of the present invention will be described with reference to the drawings.

Figure 21:
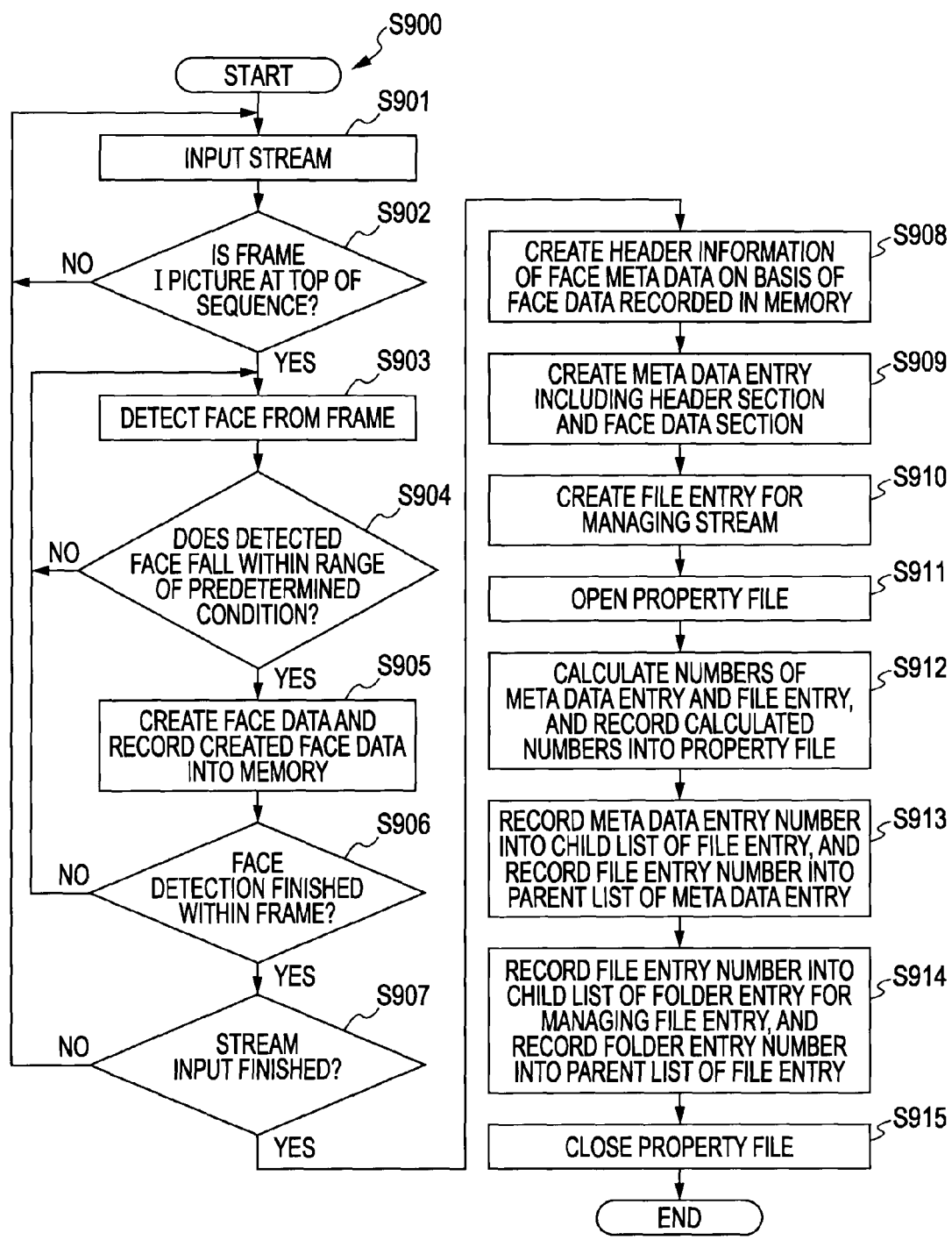
FIG. 21 is a flowchart showing the processing steps of a recording process of a property file by an image capturing apparatus.

FIG. 21 is a flowchart showing the processing steps of a recording process of the property file 400 by the image capturing apparatus 100. A description will be given here of a case where a moving image content file corresponding to captured image data is inputted as a content file.

First, an image captured with the camera section 110 is encoded, and a stream as the encoded image data is inputted to the content inputting section 211 (step S911).

Subsequently, it is sequentially judged whether or not a frame constituting the inputted stream is an I picture or IDR picture at the top of a sequence (step S902). If a frame constituting the inputted stream is neither an I picture nor IDR picture (step S902), inputting of a stream is continued (step S901).

On the other hand, if a frame constituting the inputted stream is an I picture or IDR picture (step S902), a face is detected from that frame by the face detecting section 212 (step S903). Subsequently, it is judged whether or not the detected face falls within the range of the predetermined condition (step S904). If a face is not detected, or if the detected face does not fall within the range of the predetermined condition (step S904), the process returns to step S903, and detection of a face from a frame is repeated.

On the other hand, if the detected face falls within the range of the predetermined condition (step S904), face data is created on the basis of the detected face, and the created face data is recorded into a memory (step S905). Subsequently, it is judged whether or not face detection has been finished within one frame (step S906). That is, face detection is performed for the entire area within one frame. If face detection has not been finished within one frame (step S906), the process returns to step S903, and detection of a face from a frame is repeated.

On the other hand, if face detection has been finished within one frame (step S906), it is judged whether or not input of a stream has been finished (step S907). That is, it is judged whether or not input of one set of image contents has been finished (step S907). If input of a stream has not been finished (step S907), the process returns to step S901, and input of a stream is continued.

If input of a stream has been finished (step S907), header information to be recorded into the header section 630 (FIG. 10) of face meta data is created on the basis of face data recorded in a memory (step S908).

Subsequently, a meta data entry including a header section that records the created header information, and a face data section that records face data corresponding to the detected face is created (step S909). Subsequently, a file entry for managing a moving image content file corresponding to the inputted stream is created (step S910).

Subsequently, the property file 400 is opened (step S911), and entry numbers for the created meta data entry and file entry are calculated, and on the basis of the calculated results, the created meta data entry and file entry are assigned to the property file 400 (step S912). That is, a plurality of entries are assigned to the property file 400 in the order of their slot numbers.

Subsequently, the entry number of a meta data entry belonging to a file entry assigned to the property file 400 is recorded into the child entry list of this file entry, and the entry number of a file entry to which this meta data entry belongs is recorded into the parent entry list of this meta data entry (step S913).

Subsequently, the entry number of a file entry assigned to the property file 400 is recorded into the child entry list of a folder entry to which this file entry belongs, and the entry number of this folder entry is recorded into the parent entry list of this file entry (step S914). Subsequently, the property file 400 is closed (step S915), and the processing steps of the recording process of the property file 400 end.

If a frame constituting the stream inputted in step S901 is the top frame, a representative thumbnail image as a representative image is extracted (step S903). This representative thumbnail image is stored into the thumbnail file 500, and the thumbnail address of this representative thumbnail image is recorded to the thumbnail address of the corresponding file entry (step S912). Also, the content address of a content file corresponding to the inputted stream is stored to the content address of the corresponding file entry (S912).

Next, a description will be given with reference to the drawings of an operation of playing back a moving image content file from desired photography time.

Figure 22:
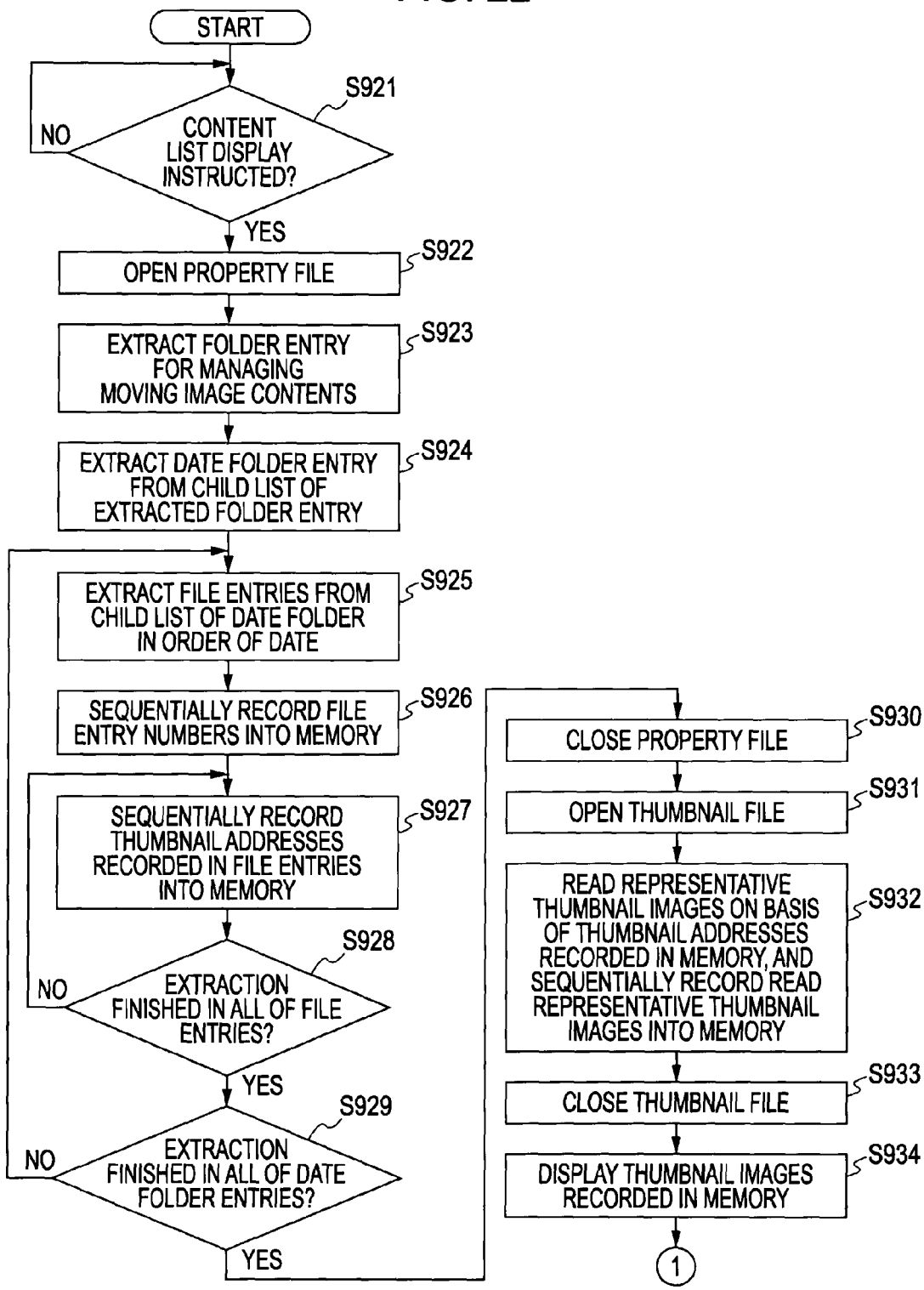
FIG. 22 is a flowchart showing the processing steps of a playback process of a moving image content file by an image capturing apparatus.
Figure 23:
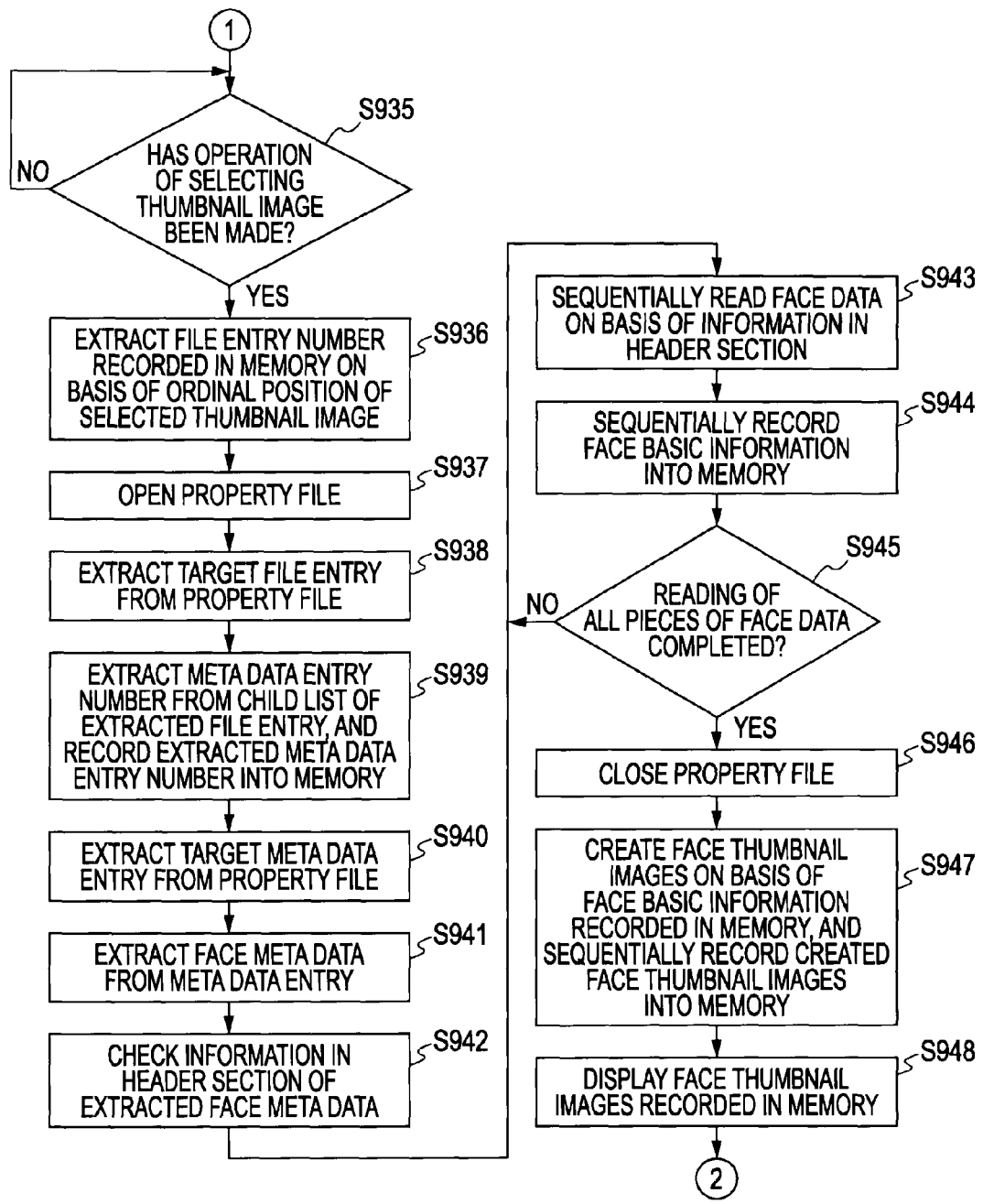
FIG. 23 is a flowchart showing the processing steps of a playback process of a moving image content file by an image capturing apparatus.
Figure 24:
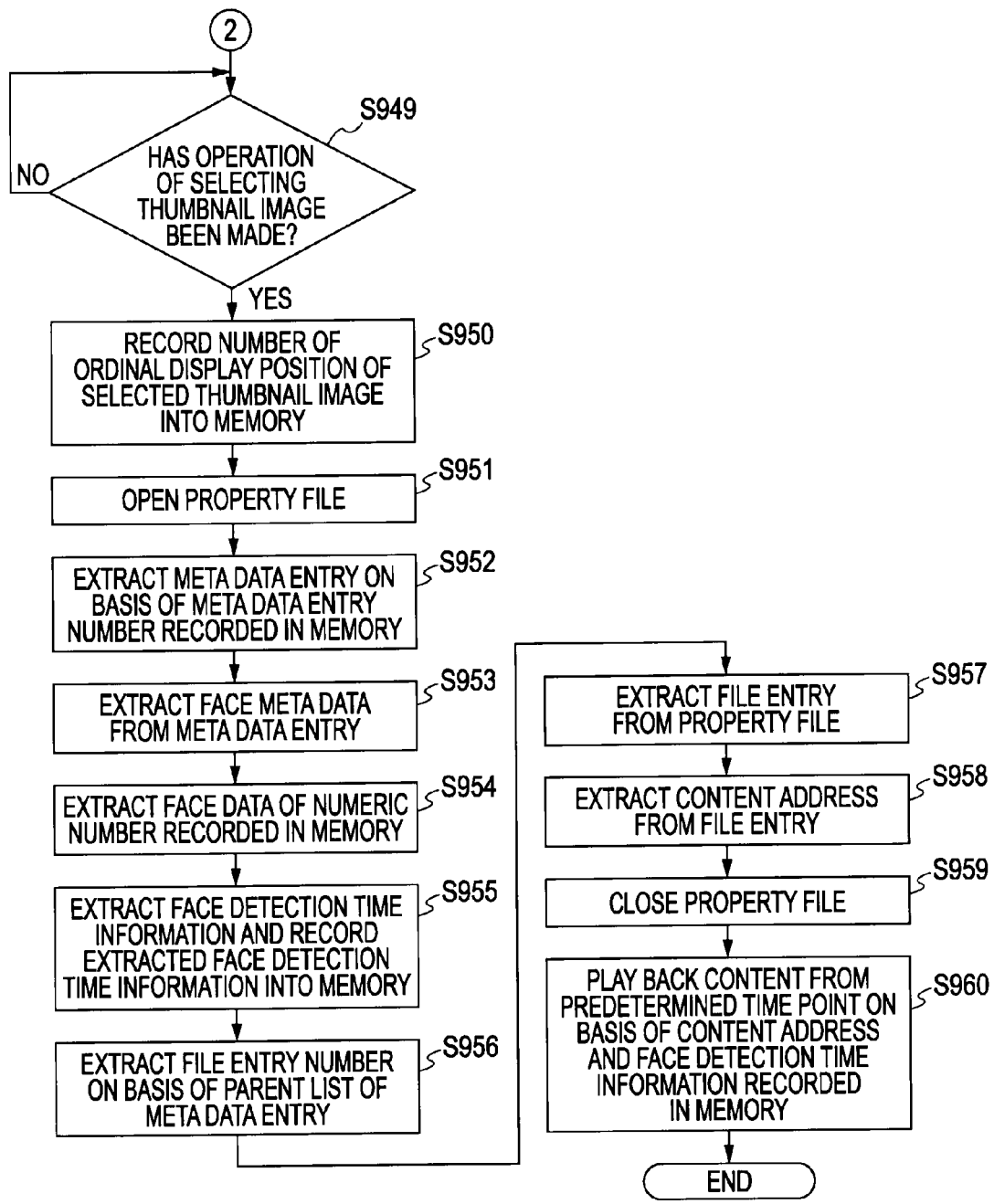
FIG. 24 is a flowchart showing the processing steps of a playback process of a moving image content file by an image capturing apparatus.

FIGS. 22 to 24 are flowcharts showing the processing steps of a playback process of a moving image content file by the image capturing apparatus 100.

By monitoring an operation input from the operating section 140, it is judged whether or not an operation input for instructing display of a list of moving image content files has been made (step S921). If an operation input for instructing display of a content list has not been made (step S921), the monitoring of an input operation is continued.

If an operation input for instructing display of a content list has been made (step S921), the property file 400 is opened (step S922), and a folder entry that manages moving image content files is extracted from the property file 400 (step S923). Subsequently, the entry number of a date folder entry is extracted from the child entry list recorded in the extracted folder entry, and the date folder entry is extracted on the basis of the extracted entry number (step S924).

Subsequently, the entry numbers of moving image file entries are extracted from the child entry list recorded in the extracted date folder entry, and moving image file entries are extracted on the basis of the extracted entry number (step S925). Subsequently, the extracted entry numbers of the file entries are sequentially recorded into a memory (step S926). Subsequently, thumbnail addresses recorded in the file entries corresponding to the entry numbers recorded in the memory are sequentially recorded into the memory (step S927).

Subsequently, it is judged whether or not extraction of all of thumbnail addresses recorded in file entries belonging to one date folder entry has been finished (step S928). If the extraction has not been finished, the process returns to step S927, and the extraction process is repeated.

On the other hand, if the extraction of all of thumbnail images has been finished (step S928), it is judged whether or not extraction has been finished with respect to all of date folder entries (step S929). If extraction has not been finished with respect to all of date folder entries (step S929), the process returns to step S925, and the extraction process is repeated.

If extraction has been finished with respect to all of date folder entries (step S929), the property file 400 is closed (step S930), and the thumbnail file 500 is opened (step S931). Subsequently, on the basis of the thumbnail addresses recorded into the memory in step S927, representative thumbnail images are read from the thumbnail file 500, and the read representative thumbnail images are sequentially recorded into the memory (step S932). Subsequently, the thumbnail file 500 is closed (step S933). Subsequently, the representative thumbnail images recorded into the memory in step S932 are displayed on the LCD 162 (step S934). For example, the representative thumbnail images are displayed as indicated by the display screen 710 in FIG. 20.

Subsequently, it is judged whether or not an operation input for selecting one thumbnail image from among thumbnail images displayed on the LCD 162 has been made from the operating section 140 (step S935). If no such operation input has been made (step S935), the monitoring of an operation input is continued.

When an operation input for selecting a representative thumbnail image is made (step S935), on the basis of the ordinal position of the selected thumbnail image, the entry number of a file entry recorded into the memory in step S926 is extracted (step S936). Subsequently, the property file 400 is opened (step S937), and the file entry corresponding to the extracted entry number is extracted from the property file 400 (step S938).

Subsequently, the entry number of a meta data entry is extracted from the child entry list recorded in the extracted file entry, and the extracted entry number of the meta data entry is recorded into the memory (step S939). Subsequently, a meta data entry corresponding to the entry number recorded in the memory is extracted from the property file (step S940). Subsequently, face meta data is extracted from the extracted meta data entry (step S941), and information of the header section of the extracted face meta data is checked (step S942).

Subsequently, face data is sequentially read on the basis of the information in the header section (step S943), and face basic information included in the read face data is sequentially recorded into the memory (step S944). Subsequently, it is judged whether or not reading of all pieces of face data has been finished (step S945). If reading of all pieces of face data has not been finished (step S945), the reading of face data and recording of the face data into the memory are continued (step S943 and step S944). If reading of all pieces of face data has been finished (step S945), the property file 400 is closed (step S946). Then, on the basis of face basic information recorded into the memory in step S944, face thumbnail images are created from a moving image content file, and the created face thumbnail images are sequentially recorded into the memory (step S947). Subsequently, the face thumbnail images recorded into the memory in step S947 are displayed on the LCD 162 (step S948). For example, the face thumbnail images are displayed as indicated by the display screen 720 in FIG. 20.

Subsequently, it is judged whether or not an operation input for selecting one face thumbnail image from among the face thumbnail images displayed on the LCD 162 has been made from the operating section 140 (step S949). If no such operation input has been made (step S949), the monitoring of an operation input is continued.

When an operation input for selecting a face thumbnail image is made (step S949), a number corresponding to the ordinal position at which the selected face thumbnail image is displayed recorded into the memory (step S950). Subsequently, the property file 400 is opened (step S951), and on the basis of the entry number of the meta data entry recorded into the memory in step S939, this meta data entry is extracted from the property file 400 (step S952).

Subsequently, face meta data is extracted from the extracted meta data entry (step S953), and face data corresponding to the number recorded into the memory in step S950 is extracted from the extracted face meta data (step S954). Subsequently, face detection time information is extracted from the extracted face data, and the extracted face detection time information is recorded into the memory (step S955).

Subsequently, the entry number of a file entry corresponding to a parent entry list of a meta data entry whose entry number is recorded in the memory is extracted (step S956), and a file entry corresponding to the extracted entry number is extracted from the property file 400 (step S957). Subsequently, a content address recorded in the extracted file entry is extracted, and the extracted content address is recorded into the memory (step S958). Then, the property file 400 is closed (step S959).

Subsequently, playback of a content file corresponding to the content address extracted in step S957 is started from a point in time corresponding to the face detection time information recorded into the memory in step S955 (step S960).

Figure 25:
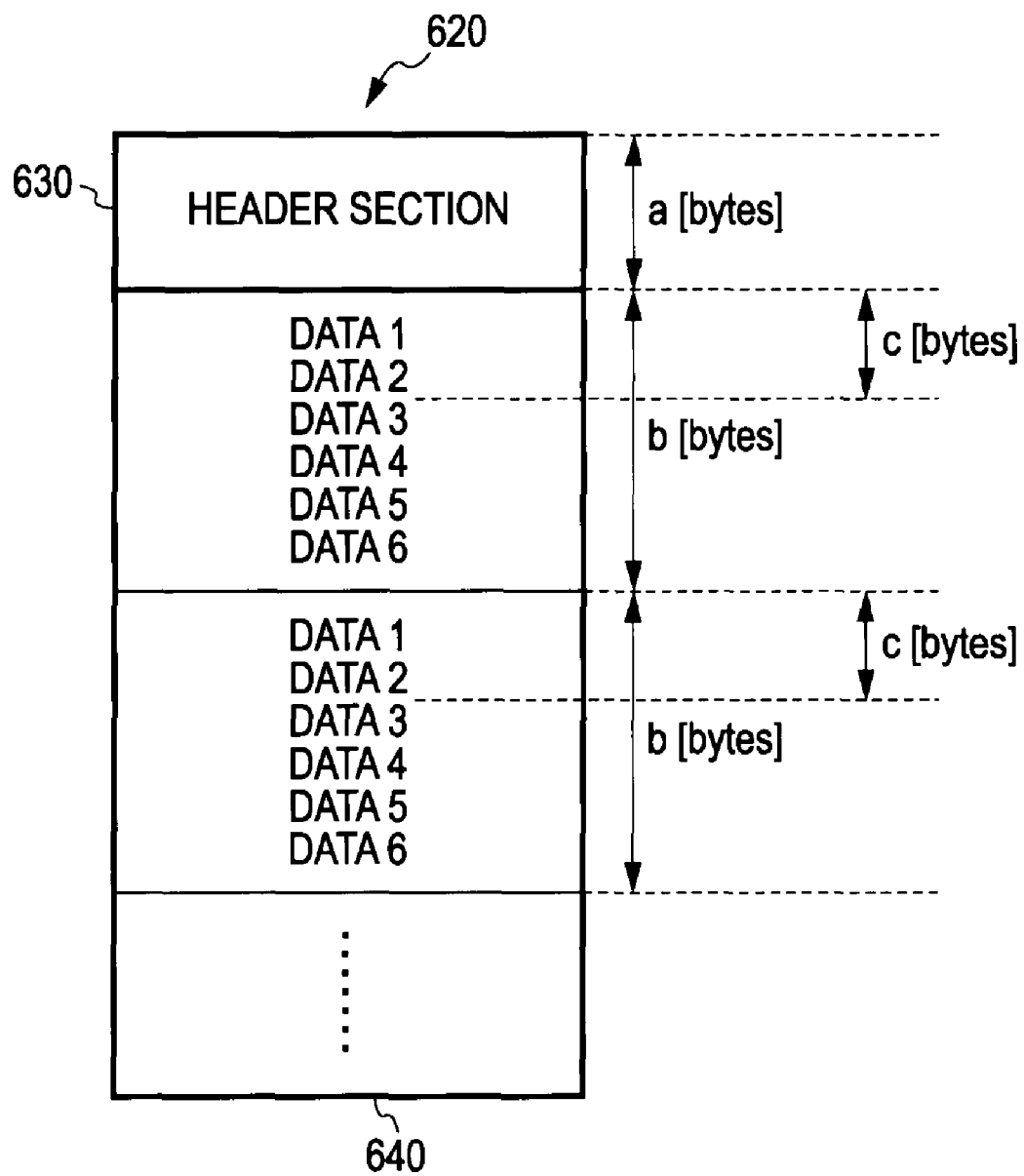
FIG. 25 is a diagram schematically showing the configuration of face meta data included in a meta data entry.

FIG. 25 is a diagram schematically showing the configuration of the face meta data 620 included in the meta data entry 600 shown in FIG. 9. A description will be given here of a method of calculating an offset value of face data in a reading process of face data, with pieces of data recorded in the face data indicated as Data 1 to 6.

The header size "a" of the face meta data 620 is recorded in the header size 631 of the header section 630 of the face meta data 620. The face data size "b" of the face meta data 620 is recorded in the face data size 636 of the header section 630 of the face meta data 620. "c" indicates the distance to a desired piece of data in one piece of face data. To read required data from the face meta data 620, the offset value from the top of each piece of face data is calculated by using Formula 1 below, and data is read by using the thus calculated offset value. This enables a quick reading process when reading desired data from data recorded in the face data. For example, FIG. 25 shows a case where required data (desired data) is Data 3.

$$a+c+n \times b \text{ (n: an integer not smaller than 0)[byte]} \quad \text{(Formula 1)}$$

Figure 26:
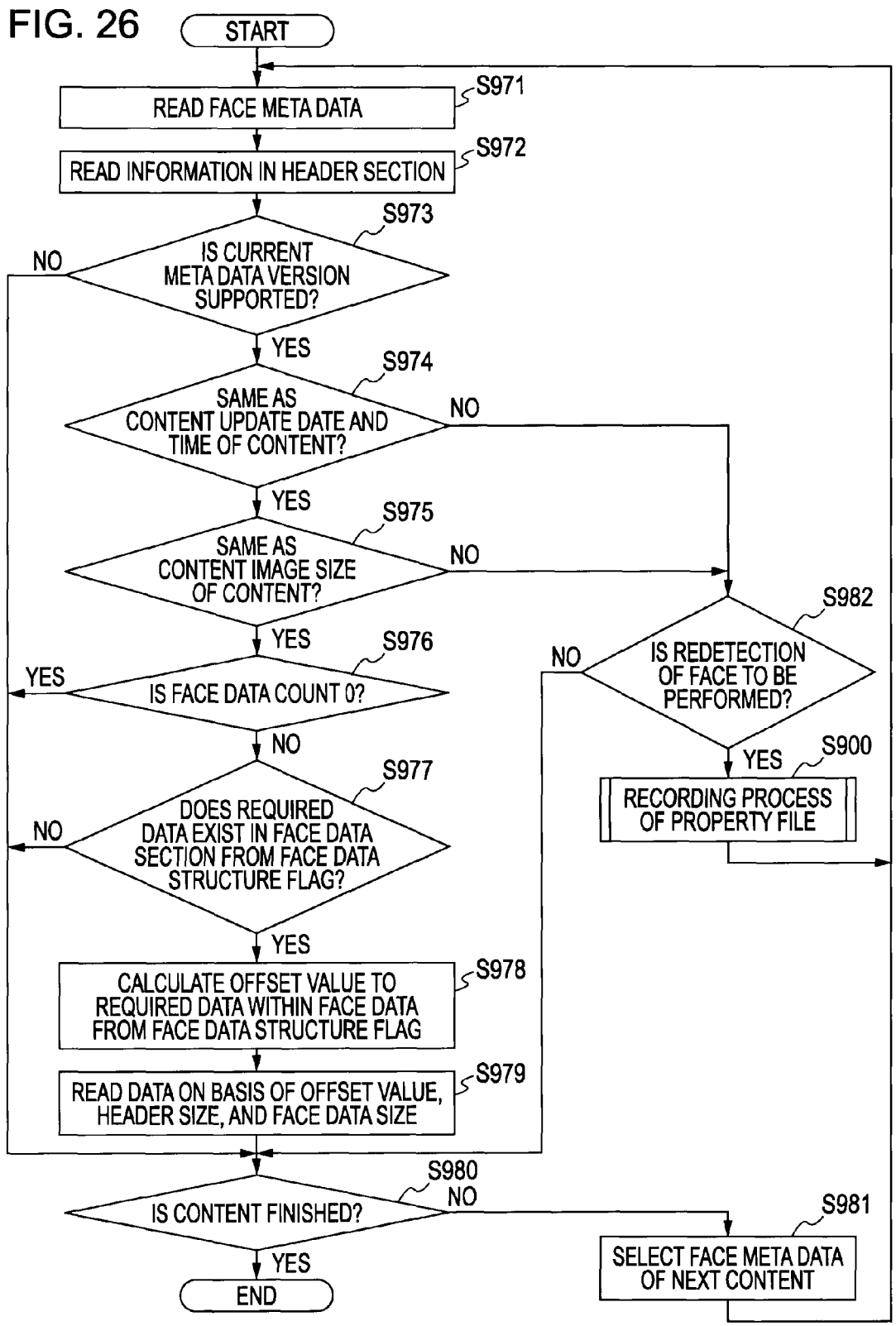
FIG. 26 is a flowchart showing the processing steps of a reading process of face data by an image capturing apparatus.

FIG. 26 is a flowchart showing the processing steps of a reading process of face data by the image capturing apparatus 100. These processing steps corresponds to, for example, step S941 to step S953 shown in FIG. 23. In the following description, reference will be made to the header section 630 shown in FIG. 10.

First, face meta data is read from a meta data entry (step S971). Subsequently, information in the header section 630 of the read face meta data is read (step S972). Subsequently, on the basis of the version information of face meta data recorded in the meta data version 632 of the header section 630 thus read, it is judged whether or not the current version of face meta data is one that can be supported by the image capturing apparatus 100 (step S973). It is also judged here whether or not the version of face meta data is one in which desired data exists. For example, when using face meta data added from the version "1.10", the process proceeds to step S980 if the version "1.00" is confirmed.

If the current version of face meta data is one that cannot be supported (step S973), the process proceeds to step S980, and it is judged whether or not the reading process of face data has been finished with respect to all of contents stored in the content storing section 223 (step S980).

If the current version of face meta data is one that can be supported (step S973), it is judged whether or not the update date and time of the corresponding moving image content file and the update date and time recorded in the content update date and time 633 of the header section 630 are the same (step S974).

If the update date and time of the moving image content file and the update date and time recorded in the content update date and time 633 of the header section 630 are not the same (step S974), it is judged whether or not redetection of a face is to be performed under the current setting (step S982). If redetection of a face is to be performed under the current setting, the recording process of a property file in step S900 is executed with respect to the moving image content file whose update date and time is judged as not being the same (step S900), and the process returns to step S971. Then, face meta data is read from a meta data entry corresponding to the moving image content file for which the recording process of a property file has been executed (step S971).

If the update date and time of the moving image content file and update date and time recorded in the content update date and time 633 of the header section 630 are the same (step S974), it is judged whether or not the image size of the corresponding moving image content file and an image size recorded in the content image size 638 of the header section 630 are the same (step S975). If the image size of the moving image content file and the image size recorded in the content image size 638 of the header section 630 are not the same (step S975), the process proceeds to step S982, and the above-described process is repeated.

If the image size of the moving image content file and the image size recorded in the content image size 638 of the header section 630 are the same (step S975), it is judged whether or not "0" is recorded in the face data count 635 of the header section 630 (step S976). If "0" is recorded in the face data count 635 (step S976), this means that a face is not detected from a target moving image content file and no face data exists, so the process proceeds to step S980.

If "0" is not recorded in the face data count 635 (step S976), on the basis of information recorded in the face data structure flag 660 of the header section 630, it is judged whether or not required data has been recorded as face data (step S977). This is performed because there is a possibility of required data not being included even when the version is the same. If required information has not been recorded as face data (step S977), the process proceeds to step S980.

If required data has been recorded as face data (step S977), on the basis of information recorded in the face data structure flag 660, the offset value to the required data within the face data is calculated by using Formula 1 (step S978). The purpose of this process is to determine at which byte counted from the top the required data begins within face data. Another purpose of this process is to find how face data is structured. Subsequently, face data is read on the basis of the calculated offset value (step S979). Subsequently, it is judged whether or not the reading process of face data has been finished with respect to all of contents stored in the content storing section 223 (step S980). If the reading process of face data has been finished with respect to all of contents stored in the content storing section 223 (step S980), the reading process of face data is ended.

On the other hand, if the reading process of face data has not been finished with respect to all of contents stored in the content storing section 223 (step S980), face meta data is selected from a meta data entry corresponding to a content from among the contents stored in the content storing section 223 for which the reading process of face data has not been finished (step S981), and the reading process of face data is repeated (step S971 to step S979). While in this example a description has been given of a case where the reading process of face data is executed with respect to all of contents stored in the content storing section 223, this example is also applicable to a case where the reading process of face data is executed with respect to only a desired content from among the contents stored in the content storing section 223.

By making a comparison based on content image size in addition to a comparison based on content update date and time, a more reliable mismatch detection can be performed.

Figure 27:
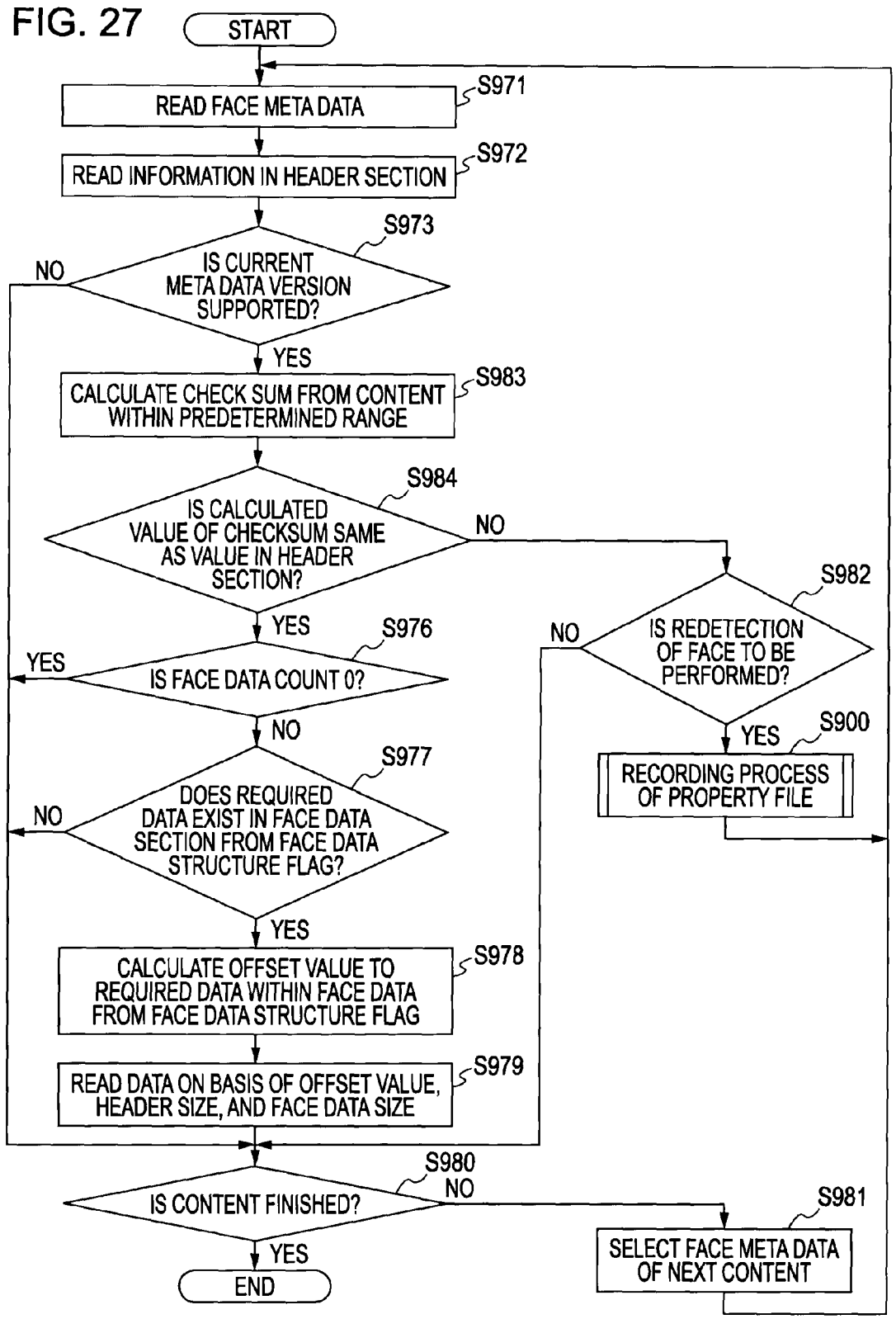
FIG. 27 is a flowchart showing the processing steps of a reading process of face data by an image capturing apparatus.

FIG. 27 is a flowchart showing the processing steps of a reading process of face data by the image capturing apparatus 100. These processing steps are processing steps for detecting a mismatch by using a checksum, in which the process of step S983 and step S984 is performed instead of step S974 and S975 in the processing steps shown in FIG. 26. For this reason, while a detailed description will be given of step S983 and step S984, a description of other processes will be omitted. In the following description, reference will be made to the header section 630 shown in FIG. 10.

On the basis of the version information of face meta data recorded in the meta data version 632 of the header section 630 read in step S972, it is judged whether or not the current version of face meta data is one that can be supported by the image capturing apparatus 100 (step S973). If the current version of face meta data is one that can be supported (step S973), a checksum is calculated from the image data of the corresponding moving image content file (step S983). This calculation of a checksum is considered to take a long processing time if the checksum is calculated on the basis of all the pieces of corresponding image data. Accordingly, by extracting an amount of image data that does not affect the recording/playback process from the corresponding image data, the checksum may be calculated by using the extracted image data. For example, the checksum can be calculated by using values from the beginning to the 100th byte of image data. In this case, the value of a checksum recorded in the error detection code value 639 of the header section 630 is also calculated by using values from the beginning to the 100th byte of image data.

Subsequently, it is judged whether or not the calculated value of the checksum and the value of the checksum recorded in the error detection code value 639 of the header section 630 are the same (step S984).

If the calculated value of the checksum and the value of the checksum recorded in the error detection code value 639 of the header section 630 are the same (step S984), it can be judged that the face meta data is reliable, so the process proceeds to step S976. On the other hand, if the calculated value of the checksum and the value of the checksum recorded in the error detection code value 639 of the header section 630 are not the same (step S984), the process proceeds to step S982. These processing steps are similarly applicable to a case where a CRC or a hash value using a hash function is used as the error detection code value. Further, a mismatch may be detected by a combination of at least two of the comparison based on content update date and time shown in FIG. 26 and FIG. 27 (step S974), the comparison based on content image size (step S975), and the comparison based on checksum (step S983 and step S984).

Next, a modification of the embodiment of the present invention will be described in detail with reference to the drawings.

Here, a description will be given of an example in which, in a case where a content file is a moving image content file, a meta data entry including face meta data created on the basis of this moving image content file is recorded to the content management file 340, and also recorded to this moving image content file as well. In this example, a description will be given of a case where face meta data is recorded as addition information of a SEI NAL unit included in the AU (Access Unit) shown in FIG. 2.

As described above with reference to FIG. 2, in the embodiment of the present invention, the timing for detecting a face included in a moving image stream encoded in MPEG4-AVC is the timing at which the IDR AU or non-IDR-I AU appears. Therefore, when a face is detected from a frame corresponding to the IDR AU, face meta data corresponding to this detected face is recorded as additional information of a SEI NAL unit included in that IDR AU. For example, when a face is detected from a frame corresponding to the AU 180, face meta data related to this detected face is recorded as additional information of the SEI NAL unit 181 included in the AU 180. Also, when a face is detected from a frame corresponding to the AU 190, face meta data related to this detected face is recorded as additional information of the SEI NAL unit 191 included in the AU 190.

Face meta data recorded in a SEI NAL unit (hereinafter, referred to as SEI) is, for example, the face meta data 620 including the header section 630 shown in FIG. 10 and the face data section 640 shown in FIG. 11. As described above with reference to FIGS. 13A to 16B and the like, the face data section 640 may include only required information.

Now, a predetermined condition that should be satisfied by face data recorded in SEI will be described in detail with reference to FIG. 28. As described above, when recording the value of face data to the face data section in the content management file 340, for example, of faces detected in one frame, face data to be recorded to the face data section is specified and restricted on the basis of a predetermined condition (face size, position, increase/decrease in the number of faces detected immediately previously, or the like). In contrast, when recording face data to SEI, face meta data related to faces detected in one frame is to be recorded as much as possible. That is, when recording face data to SEI, face data is recorded on the basis of a condition that is less restrictive than the predetermined condition that applies when recording face data to the content management file 340.

For example, an upper limit value is set in advance for the number of faces to be stored in SEI, and face meta data to be recorded to SEI is restricted on the basis of the size, position, or the like of each detected face, only when the number of detected faces exceeds the upper limit value. Here, an example of a method of recording face data will be described with reference to FIG. 28.

Figure 28:
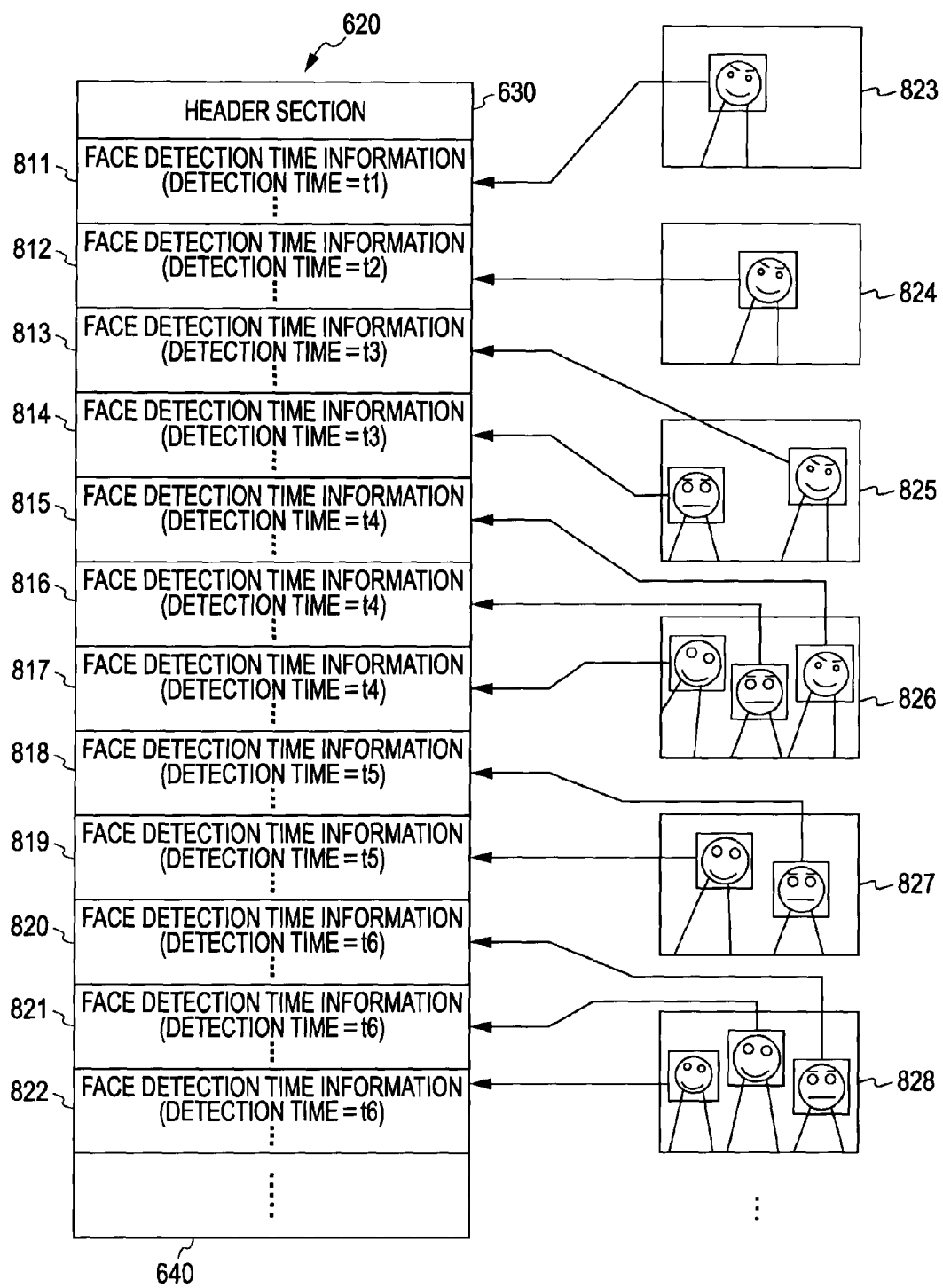
FIG. 28 is a diagram showing the relationship between faces detected in frames, and face data.

FIG. 28 is a diagram showing the relationship between faces detected in frames 823 to 828 constituting a moving image content file, and pieces of face data 811 to 822 recorded in the face data section 640. FIG. 28 shows a state in which faces detected in the frames 823 to 828 are each surrounded by a square box. The face of one person is detected in the frame 823 or 824, the faces of two persons are detected in the frame 825 or 827, and the faces of three persons are detected in the frame 826 or 828.

For example, even when the number of faces detected in the frame 823 at detection time t1 and the number of faces detected in the frame 824 at detection time t2 are equal, unless the number of detected faces exceeds an upper limit value, the face data of faces detected in the frame 823 at detection time t1 and in the frame 824 at detection time t2 is recorded to the face data section 640. Likewise, even through the number of faces detected in the frame 827 at time t5 is less than the number of faces detected in the frame 826 at time t4, unless the number of detected faces exceeds an upper limit value, the face data of faces detected in the frame 826 at detection time t4 and in the frame 827 at detection time t5 is recorded to the face data section 640.

In contrast, the predetermined condition that applies when recording face data to the content management file 340 is that, for example, when the number of faces detected in a frame at given detection time and the number of faces detected in a frame at the next detection time are equal, face data related to the faces detected at the next detection time is not recorded to the face data section. This is because the possibility of meta data related to the same face being recorded is high since the numbers of detected faces are equal. Likewise, when the number of faces detected in a frame at given detection time is less than the number of faces detected in a frame at the next detection time, face data related to the faces detected at the next detection time may not be recorded to the face data section.

For example, in a case where, as shown in FIG. 28, the number of faces detected in the frame 823 at detection time t1 and the number of faces detected in the frame 824 at detection time t2 are equal, when recording face data to the content management file 340, face data of the faces detected in the frame 824 at detection time t2 is not recorded to the face data section 640. Further, the number of faces detected in the frame 827 at detection time t5 is less than the number of faces detected in the frame 826 at detection time t4. Therefore, face data of the faces detected in the frame 825 at detection time t5 is not recorded to the face data section 640.

As described above, when recording face data into SEI, whether or not face meta data should be recorded is determined on the basis of a condition that is less restrictive than the condition that applies when recording face meta data to the content management file. Accordingly, even when a content file including SEI in which face data is recorded is moved from a recording device in which this face data is recorded to another device, this content file can be adapted to a wide range of applications on the device as a target device.

For instance, in a case where face meta data related to a detected face is recorded on the basis of a predetermined condition on a recording device, the face meta data recorded on the basis of the predetermined condition on the recording device as a source device may not always be useful on a target device. Accordingly, to enable adaptation to a wide range of applications on the target device, the condition that applies when recording face data into SEI is made less restrictive so that a relatively large number of pieces of face data are recorded. This makes it possible to allow a more latitude in selecting or deselecting face meta data.

However, in a case where face meta data is recorded to both a content management file and a moving image stream, there is no need to record the same meta data to each of the content management file and the moving image stream. For example, in a case where face meta data is recorded to both a content management file and a moving image stream, even if face detection time information is recorded in the content management file, face detection time information may not be recorded into SEI since time information is recorded in another NAL unit in the AU including SEI. This makes it possible to reduce the size of face meta data. Further, an AU in which a face was detected is normally an AU that serves as an edit point. Therefore, a correct value can be retained with respect to face detection time information even when a moving image stream is deleted while being played back. Further, in a case where a moving image stream is edited, when performing maintenance on face meta data within a content management file, time information recorded in another NAL unit of the AU including SEI can be used.

Further, in the case of a recording device including a content management file, when the content management file is broken for some reason upon recording face meta data into a stream, face meta data of the content management file can be quickly reconstructed by using the face meta data within the stream. This allows face meta data of the content management file to be reconstructed more quickly than by detecting faces from all of streams to repair face meta data.

In the case of a recording device that does not include a content management file, face data is recorded only to a SEI NAL unit in a predetermined AU of a moving image stream. In this case, an application can be quickly executed by using face meta data recorded within this moving image stream. In contrast, when executing an application using face meta data with respect to a moving image stream in which no face meta data is recorded, it is necessary to detect faces from the moving image stream, so it may become difficult to perform execution of the application quickly.

Next, a description will be given of an example in which, in a case where a content file is a still image content file, face meta data created on the basis of this still image content file is recorded into this still image content file without being recorded to the content management file 340.

Figure 29:
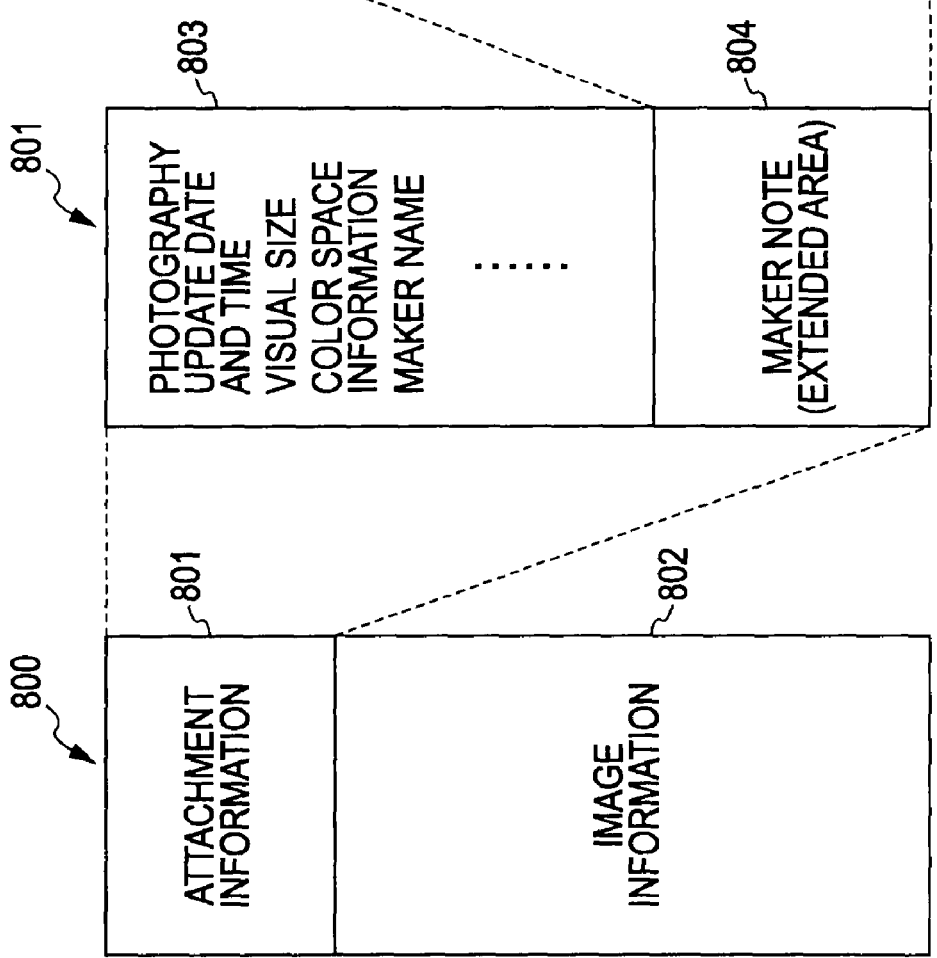
FIGS. 29A to 29C are diagrams schematically showing the file structure of a still image file recorded by the DCF standard.

FIGS. 29A to 29C are diagrams schematically showing the file structure of a still image file recorded by the DCF (Design rule for Camera File system) standard. DCF is a file system standard for realizing mutual use of images via a recording medium between such devices as a digital still camera and a printer. The DCF is based on Exif (Exchangeable image file format) and specifies a method of naming files and folder configuration when recording data to a recording medium. The Exif is a standard for adding image data and camera information into an image file, and specifies the format (file format) for recording an image file.

A still image file 800 is a still image file that is recorded by the DCF standard. As shown in FIG. 29A, the still image file 800 includes attachment information 801 and image information 802. The image information 802 refers to, for example, the image information of a subject captured with the camera section 110.

As shown in FIG. 29B, the attachment information 801 includes attribute information 803 and maker note 804. The attribute information 803 refers to attribute information or the like related to the still image file 800 and includes, for example, photography update date and time, visual size, color space information, maker name, and the like. The attribute information 803 includes rotation information (TAGID=274, Orientation) indicating whether or not an image has been rotated. As for this rotation information, it is possible to adopt a setting for not recording rotation information of an image as Exif information (that is, a setting for not recording rotation information to a tag). In the case where this setting is adopted, "0" is recorded as an invalid value.

The maker note 804 is generally an area in which user's unique data is recorded, and serves as an extended area in which each maker can freely record information (TAGID=37500, MakerNote). In this example, as shown in FIG. 29C, face meta data is recoded in the maker note 804. That is, the maker note 804 includes a face meta data recording area 805 for recording one or a plurality of pieces of face meta data such as face meta data 807, and a recording area 806 for recording other unique meta data or the like. As described above, when recording face meta data to a still image file, face meta data is recorded into the maker note 804 specified in Exif.

Now, face meta data recorded to the maker note 804 will be described. Face meta data recorded in the maker note 804 is, for example, the face meta data 620 including the header section 630 shown in FIG. 10 and the face data section 640 shown in FIG. 11. As described above with reference to FIGS. 13A to 16B and the like, the face data section 640 may include only required information. It should be noted, however, that although, of individual pieces of information recorded in the header section 630, the time scale 635 is not required in the case of a still image, "0" is recorded in the time scale 635 of a still image. This is due to the following reason. That is, by making the amount of meta data the same rather than making the amount of meta data differ between a moving image and a still image, it is possible to make the length of the header section 630 fixed, thereby facilitating data access. Also, making the meta data to be recorded differ between a moving image and a still image puts a heavy load on the system of a recording device. Accordingly, when creating face meta data related to a face detected in a moving image or still image, it is possible to reduce such load by creating the same meta data.

Figure 30:
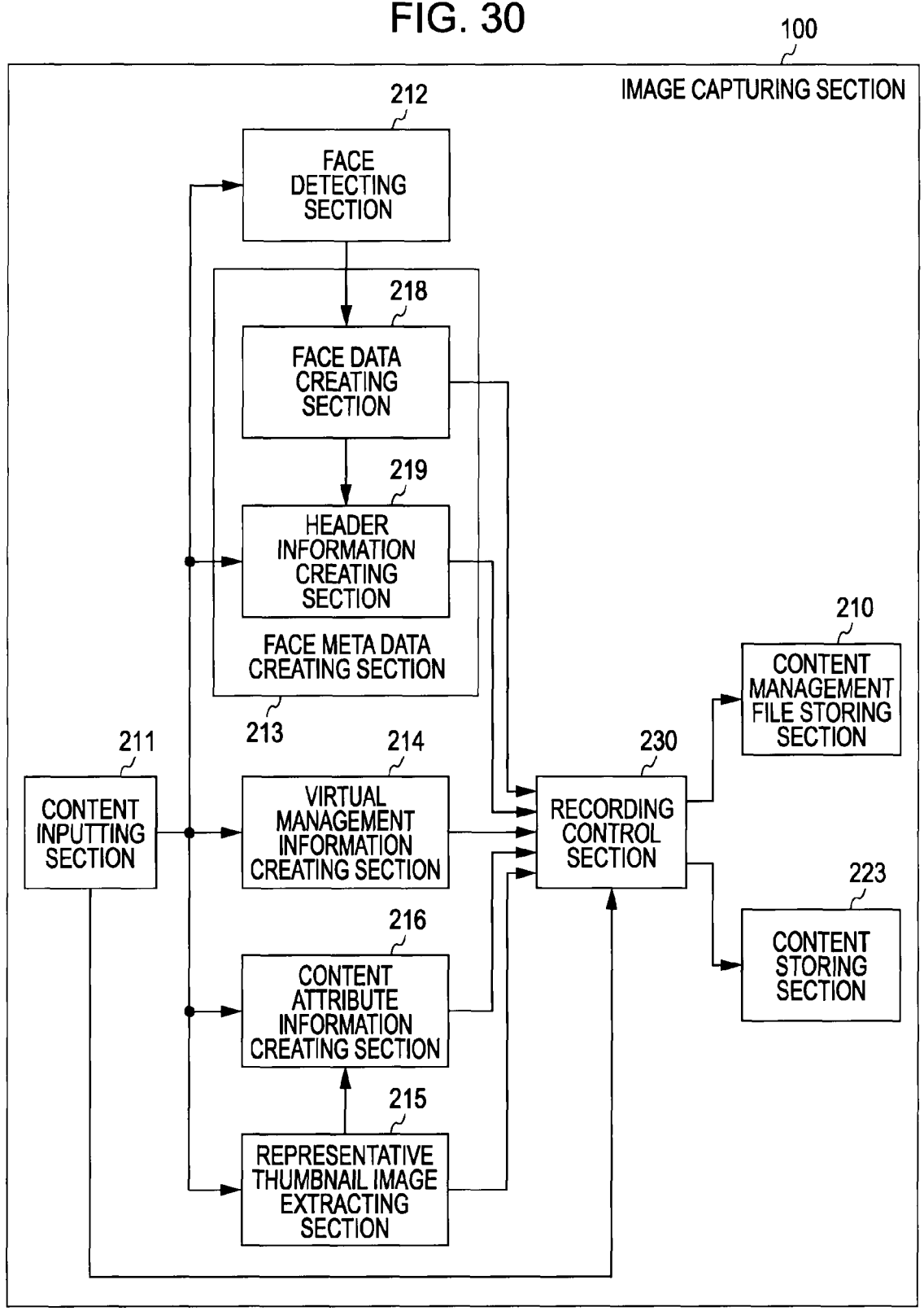
FIG. 30 is a block diagram showing an example of the functional configuration of an image capturing apparatus according to a modification of an embodiment of the present invention.

FIG. 30 is a block diagram showing an example of the functional configuration of the image capturing apparatus 100 according to a modification of the embodiment of the present invention. The image capturing apparatus 100 includes the content management file storing section 210, the content inputting section 211, the face detecting section 212, the face meta data creating section 213, the virtual management information creating section 214, the representative thumbnail image extracting section 215, the content attribute information creating section 216, a recording control section 230, and the content storing section 223. Now, with respect to the content management file storing section 210, the content inputting section 211, the recording control section 210, and the content storing section 223, portions that are different from those shown in FIG. 17 will be described in detail, and description of other structural features is omitted.

The content management file storing section 210 stores the content management file 340 that records hierarchical entries organized in a virtual hierarchical structure. In this modification, hierarchical entries related to still images are not recorded in the content management file storing section 210.

The content inputting section 211 inputs content files, and outputs the inputted content files to the face detecting section 212, the face meta data creating section 213, the virtual management information creating section 214, the representative thumbnail image extracting section 215, the content attribute information creating section 216, and the recording control section 230. Specifically, in the case of moving images, frames photographed with the camera section 110 are sequentially inputted from the content inputting section 211. In the case of still images, images photographed with the camera section 110 are sequentially inputted from the content inputting section 211.

The recording control section 230 records face meta data created by the face meta data creating section 213 to a content file corresponding to this face meta data. Further, with regard to a moving image content file, the recording control section 230 records face meta data created for each IDR picture or I picture to SEI in an AU including an IDR picture or I picture corresponding to this face meta data. Further, when recording meta data created at a predetermined interval with regard to a moving image content file to the moving image content file, the recording control section 230 records the face meta data to the moving image content file in accordance with a recording condition that is less restrictive than the recording condition that applies when recording face meta data to the content management file 340. Also, the recording control section 230 does not record face meta data related to a still image to the content management file 340.

The content storing section 223 stores content files of moving images or still images with face meta data recorded therein.

Now, the usage environments and the like of still images and moving images will be briefly described.

Generally, a still image is frequently moved between devices while recorded on a recording medium, and the portability of a still image is considered to be higher than that of a moving image. In a case where a still image is moved in this way, it is highly likely that a commercial image management application software that cannot understand a content management file is used on a device as a target device. Accordingly, it is considered that a still image need not be managed by a content management file.

Also, in the case of a still image, there are many kinds of PC application software that can edit a still image file on the PC. In many of these kinds of PC application software, proper maintenance is not performed on camera information (such as update date and time or rotation information) other than the maker note of Exif even when a still image has been subjected to trimming or rotation process. In some cases, a still image file edited with such PC application software is returned to a recording device with which a face was detected. In this case, a situation may arise in which even after executing a process of cutting out a face from a still image by using face data indicating a face position, the face is not properly cut out.

In order to avoid such a situation as much as possible, the possibility of mismatch detection can be increased by using image size information or the like in addition to update date and time information that is present within a still image content.

On the other hand, as for a moving image, unless a playback environment such as the AVCHD (Advanced Video Codec High Definition) or BD (Blu-ray Disc) has been properly set up, it is highly likely that the moving image can be played back by only the PC application software attached to an image capturing apparatus with which the moving image was photographed. Therefore, with respect to a moving image, it is highly likely that the user uses PC application software that can understand a content management file, so a moving image content is managed by a content management file in view of such advantage as the ease of access to meta data. Also, meta data of a moving image content is also recorded to a content management file.

When editing a moving image file, as described above, if there are not many editing applications that support a moving-image supporting format, it is highly likely that maintenance is reliably performed on update date and time information recorded to a content management file or moving image file as a unique file, by a PC application software that supports the unique file.

As described above, since the usage environment differs between a still image and a moving image, in this modification, a moving image content file, and meta data (not limited to face meta data) detected from this moving image content file are managed by a content management file. On the other hand, a still image content file is not managed by a content management file but managed by an ordinary file system, and meta data included in this still image content file is recorded into this still image file (that is, the maker note of Exif).

Next, a reading process of face data according to a modification of the embodiment of the present invention will be described in detail with reference to the drawings.

Figure 31:
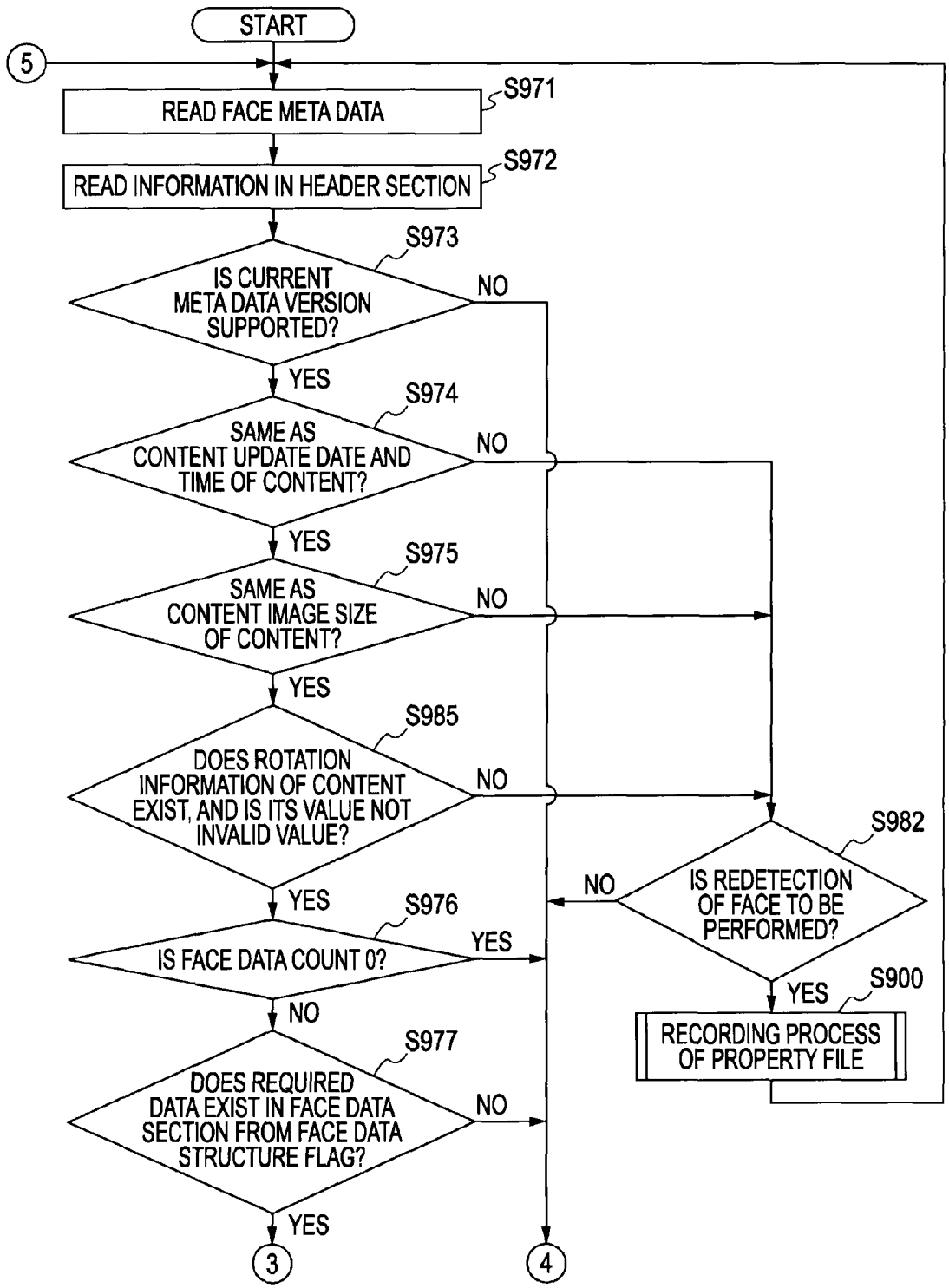
FIG. 31 is a flowchart showing the processing steps of a playback process of face data by an image capturing apparatus.
Figure 32:
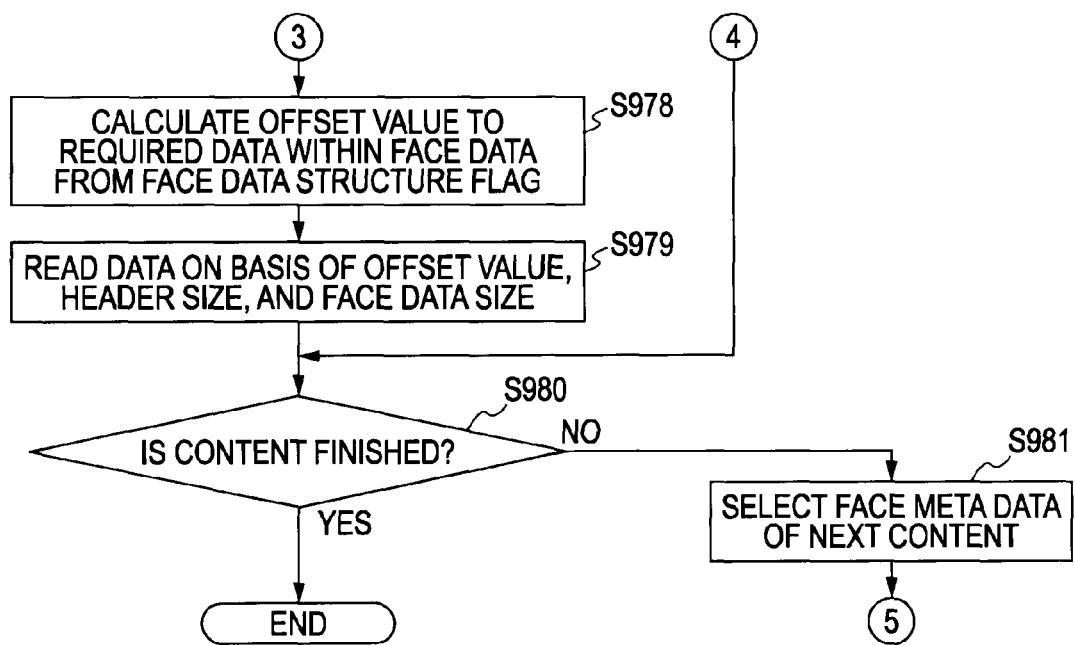
FIG. 32 is a flowchart showing the processing steps of a playback process of face data by an image capturing apparatus.

FIGS. 31 and 32 are flowcharts showing the processing steps of a reading process of face data by the image capturing apparatus 100. This example illustrates processing steps in which with respect to a still image having face meta data recorded in the maker note 804, a mismatch between the still image and the meta data is detected by using the content update date and time, content image size, and content rotation information. According to these processing steps, the process of step S985 is performed between the processes of step S975 and step S976 in the processing steps shown in FIG. 26. Therefore, while a detailed description will be given of step S985, a description of other processes will be omitted. Further, in the following description, reference will be made to the header section 630 shown in FIG. 10.

On the basis of the version information of face meta data recorded in the meta data version 632 of the header section 630 read in step S972, it is judged whether or not the current version of face meta data is one that can be supported by the image capturing apparatus 100 (step S973). In a case where the current version of face meta data is one that can be supported (step S973), and if the update date and time of a corresponding still image content file and update date and time recorded in the content update date and time 633 of the header section 630 are not the same (step S974), or if the image size of the corresponding still image content file and an image size recorded in the content image size 638 of the header section 630 are not the same (step S975), it is highly likely that such processing as trimming or resolution conversion has been applied to the image of the corresponding still image content file, so the process proceeds to step S982, and the above-described process is repeated.

On the other hand, if the update date and time of a corresponding still image content file and update date and time recorded in the content update date and time 633 of the header section 630 are the same (step S974), and the image size of the corresponding still image content file and an image size recorded in the content image size 638 of the header section 630 are the same (step S975), it is judged whether or not rotation information of the corresponding still image content file exists, and an invalid value is not recorded in this rotation information. If rotation information of the corresponding still image content file exists, and an invalid value is not recorded in this rotation information (step S985), the process proceeds to step S976.

On the other hand, if rotation information of the corresponding still image content file does not exist, or if an invalid value is recorded in this rotation information (step S985), it is highly likely that a rotation process has been performed on the image, so the process proceeds to step S982, and the above-described process is repeated. By means of these processes, the possibility of mismatch detection can be increased by taking processes that are used relatively often when editing a still image content file, such as image rotation, trimming, resolution conversion, and the like, into consideration. Further, a mismatch may be detected by a combination of at least two of the following processes: the comparison based on content update date and time, the comparison based on content image size, the comparison based on the checksum, and the checking of rotation information shown in FIGS. 26, 27, and 31.

Next, an example of execution of an application using face meta data will be described in detail with reference to the drawings.

Figure 33A:
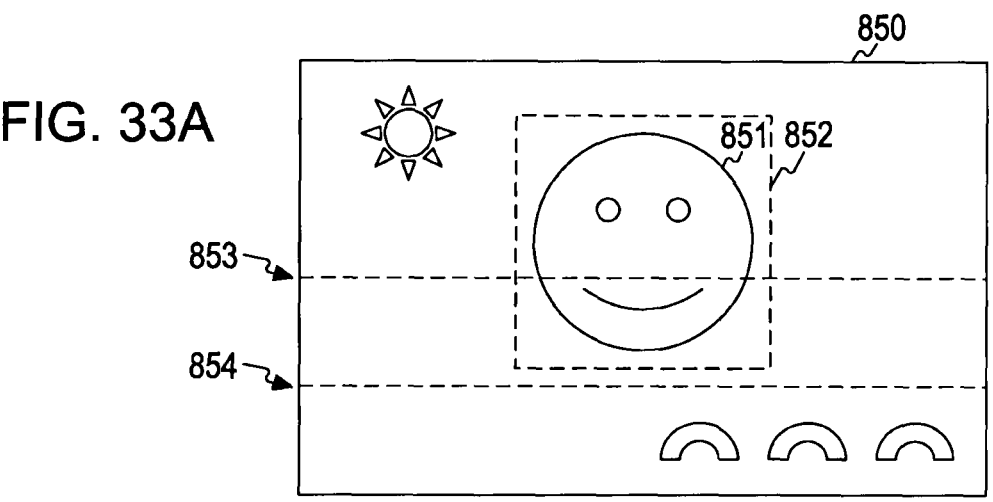
FIGS. 33A to 33C are views each showing an example of display in a case where a slideshow with respect to a still image content file is executed.
Figure 33B:
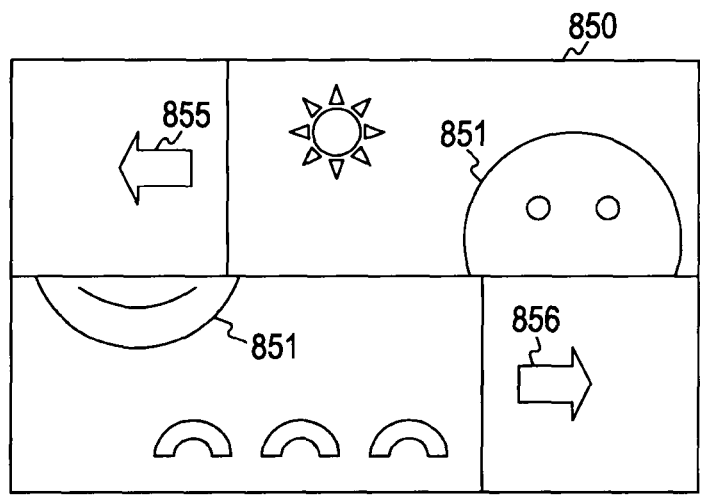
Figure 33C:
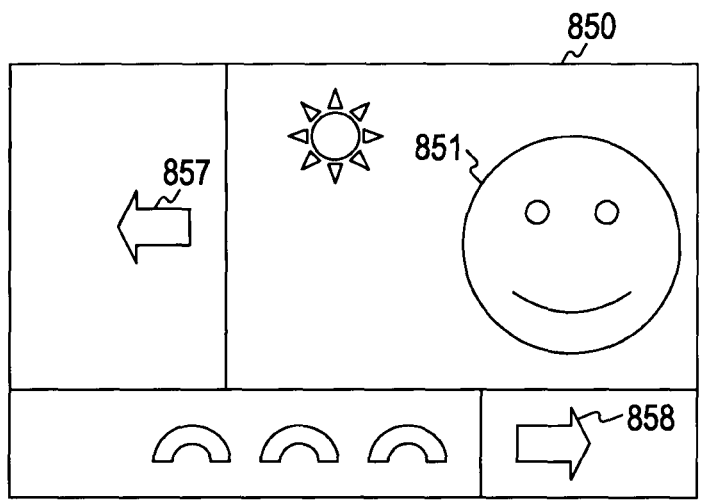

FIGS. 33A to 33C are views each showing an example of display in a case where a slideshow with respect to a still image content file is executed. FIG. 33A is a view showing a state in which an image including a face 851 is displayed on a display section 850. As for the face 851, face data is recorded in the maker note within a still image file, and an area 852 including the face 851 can be recognized by this face data.

In the related art, when displaying one image in slideshow, for example, a slideshow is displayed by means of a transition effect whereby one image is cut and divided right at its center into upper and lower parts, the upper part of the image thus divided is entered from the right side on the screen, and the lower part of the image is entered from the left side on the screen to thereby play back one image.

For example, when displaying the image shown in FIG. 33A in slideshow by the transition effect, the image is cut and divided right at the center indicated by a dotted line 853 shown in FIG. 33A into upper and lower parts. Then, as shown in FIG. 33B, the image in the upper part is sequentially moved in the direction of an arrow 855, and the image in the lower part is sequentially moved in the direction of an arrow 856, thereby making it possible to display the entirety of this image. However, when the image is cut and divided into upper and lower parts at the portion indicated by the dotted line 853 in this way, the face 851 included in this image is divided into upper and lower parts, so the whole of the face 851 cannot be viewed until the divided upper and lower images are combined with each other.

Accordingly, when displaying an image including a face in slideshow by the transition effect, before applying a transition, the position of the face is grasped on the basis of face basic information included in face meta data recorded in the maker note, thereby making it possible to adjust the position at which the image is split into upper and lower parts. This can ensure that the face 851 included in the area 852 will not be cut and divided. For example, the image can be cut into upper and lower parts at the portion indicated by a dotted line 854 shown in FIG. 33A so that the face 851 included in the area 852 will not be cut and divided. This makes it possible to view the whole of the face 851 even when the images split into upper and lower parts are being moved.

Further, as shown in FIG. 33A, an image with face data recorded in the maker note can be displayed in slideshow by means of a transition effect different from the above-described transition effect. For example, with respect to an image including a face, it is possible to employ a transition effect in which the face included in the image is not cut and divided, such as when returning to the normal face size from a zoom on the face included in the image. By switching between transitions with respect to an image including a face and an image not including an image, it is possible to execute a slideshow that can effectively display the face included in the image.

Next, with reference to the drawings, a description will be given in detail of an example in which a playback apparatus such as a video player uses face data added to image data captured by a recording apparatus such as a digital still camera or digital video camera.

Figure 34A:
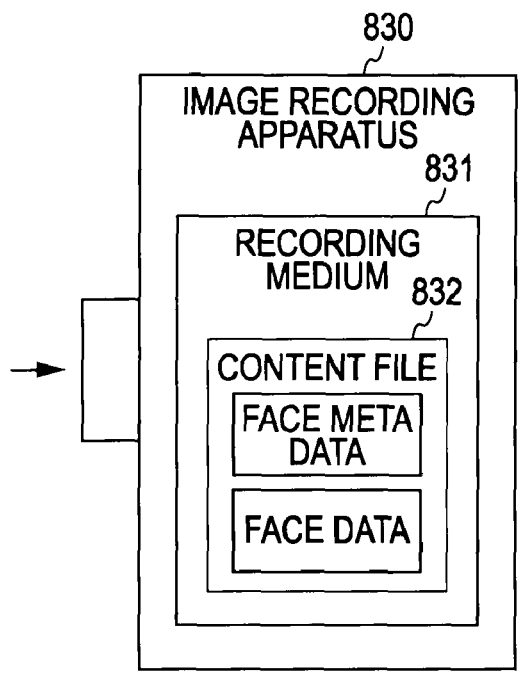
FIGS. 34A to 34C are diagrams showing an image recording apparatus and an image playback apparatus to which a removable recording medium can be connected.
Figure 34C:
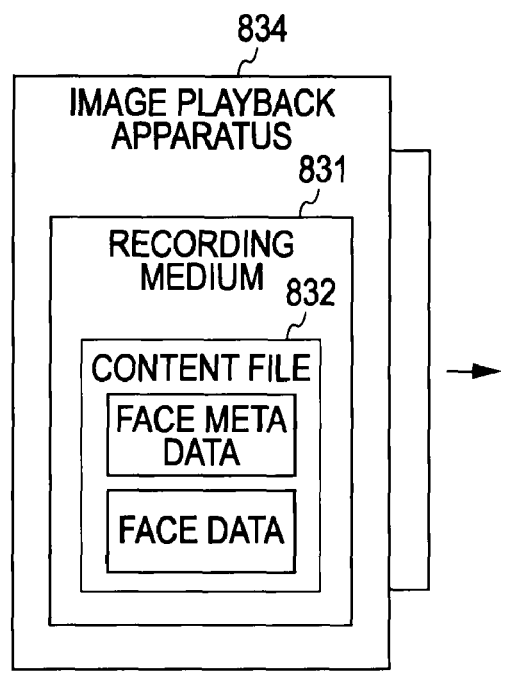
Figure 34B:
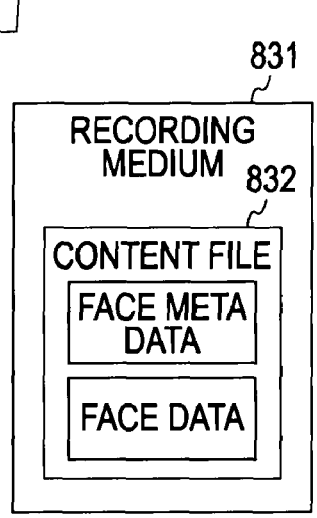

FIGS. 34A to 34C are diagrams showing an image recording apparatus 830 and an image playback apparatus 834 to which a removable recording medium 831 can be connected. Here, a description will be given of an example of use of face meta data in a case where face meta data is contained in a content file. The configurations of the image recording apparatus 830 and image playback apparatus 834 are substantially the same as the configuration of the image capturing apparatus 100 shown in FIGS. 17, 18, and 30.

As shown in FIG. 34A, the image of a subject is captured in a state with the recording medium 831 connected to the image recording apparatus 830, and image data thus captured and face meta data created by this image data are recorded onto the recording medium 831 as a content file 832. When playing back the content file 832 by the image playback apparatus 834, as shown in FIG. 34B, the recording medium 831 is detached from the image recording apparatus 830, and as shown in FIG. 34C, the recording medium 831 is connected to the image playback apparatus 834, thereby inputting the content file 832 recorded on the recording medium 831 to the image playback apparatus 834 for playback.

Since meta data added from the image recording apparatus 830 can be used by the image playback apparatus 834, playback using face meta data can be performed by the image playback apparatus 834 even when the image playback apparatus 834 does not have a face detecting function. This makes it possible to realize an advanced playback application even in the case of a device on which a large playback load cannot be imposed, such as a mobile device. Also, in the case of a playback device having a face detecting function, there is no need to retrieve a face at the time of playback, thus enabling a significant reduction in the time required for a playback process.

Figure 35:
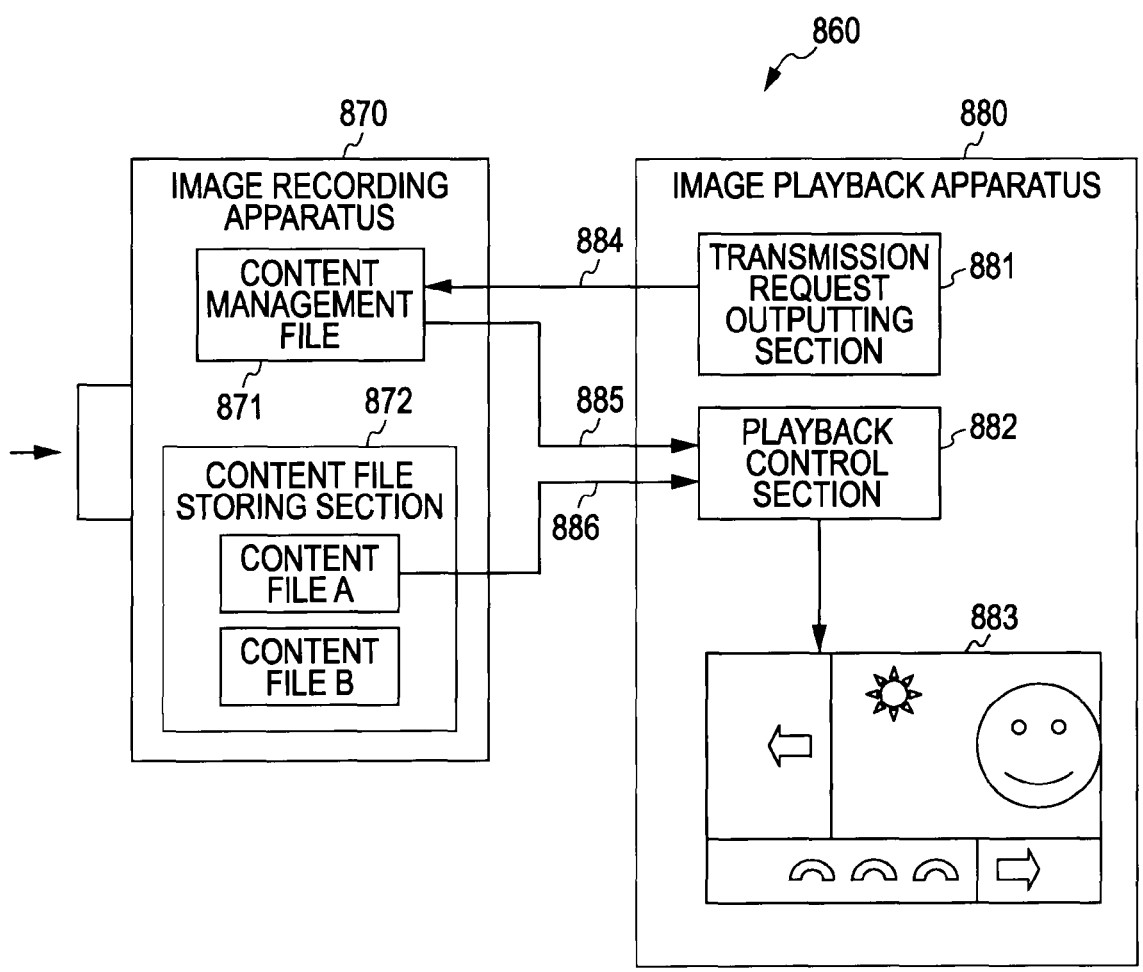
FIG. 35 is a system configuration diagram schematically showing an image processing system including an image recording apparatus and an image playback apparatus.

FIG. 35 is a system configuration diagram schematically showing an image processing system 860 including an image recording apparatus 870 and an image playback apparatus 880. The image recording apparatus 870 and the image playback apparatus 880 are connected to each other by an inter-apparatus interface such as a USB cable.

The image recording apparatus 870 is a digital still camera, a digital video camera, or the like. The image recording apparatus 870 stores captured image data into a content file storing section 872 as a content file, and records face meta data related to this content file to a content management file 871.

The image playback apparatus 880 includes a transmission request outputting section 881, a playback control section 882, and a display section 883. The image playback apparatus 880 reads a content file stored in the content file storing section 872 of the image recording apparatus 870 with which the image playback apparatus 880 is connected via an inter-apparatus interface, and displays the read content file on the display section 883 for display. Since the configuration of the image recording apparatus 870 is substantially the same as the configuration of the image capturing apparatus 100 shown in FIGS. 17, 18, and 30, illustration and description related to other structural features are omitted.

The transmission request outputting section 881 outputs to a signal line 884 a transmission request for extracting a desired piece of meta data from among pieces of meta data included in a meta data entry recorded in the content management file 871 of the image recording apparatus 870. In response to the transmission request outputted to the signal line 884, the desired piece of meta data is extracted from among the pieces of meta data included in the meta data entry recorded in the content management file 871, and a content file recorded in the content file storing section 872 is extracted on the basis of virtual management information included in a file entry recorded at a higher hierarchical level than the meta data entry including this extracted meta data. Then, the meta data extracted from the content management file 871 is outputted to a signal line 885, and the content file extracted from the content file storing section 872 is outputted to a signal line 886.

The playback control section 882 controls the playback of the content file outputted from the content storing section 872 to the signal line 886 and displayed on the display section 883, by using the meta data outputted to the signal line 885 from the content management file 871.

In this way, the image playback apparatus 880 reads the content management file 871 recorded in the image recording apparatus 870, and extracts required meta data from the read content management file 871 and uses the extracted meta data at the time of playing back a content file. Therefore, as described above with reference to FIGS. 33A to 33C, for example, by using meta data of the content management file 871 recorded in the image recording apparatus 870, a content file stored in the content file storing section 872 can be displayed on the display section 833.

While the above description is directed to an example in which an inter-apparatus interface such as a USB cable is used as connecting means for connecting between the image recording apparatus 870 and the image playback apparatus 880, other connecting means such as a network using a wired or wireless line may be also used.

As described above, according to the embodiment of the present invention, desired meta data can be quickly retrieved, and a corresponding content file can be quickly searched. A desired application can be thus quickly executed. Also, meta data related to a content file can be quickly used.

At present, there have been developed many applications that use face meta data, and it is considered that there will be increasingly diverse applications that use face meta data in the future. Thus, format extensions for face meta data are expected in the future. Even when the format of face meta data is extended as mentioned above, according to the embodiment of the present invention, it is possible to ensure compatibility on a playback device with respect to the format extension, so meta data related to a content file can be quickly accessed for use.

As described above, according to the embodiment of the present invention, a content file can be quickly accessed for use.

While in the embodiment of the present invention face meta data related to the face of a person is described as an example of meta data, the embodiment of the present invention is also applicable to other kinds of meta data. For example, an animal or the like included in an image is detected by using an animal or pet recognition algorithm, and the embodiment of the present invention can be applied with respect to meta data corresponding to information related to the face or the like of the detected animal. For example, by providing a pet detection engine instead of a face detection engine, the embodiment of the present invention can be applied by using meta data related to a pet detected by this pet detection engine. Further, the embodiment of the present invention can be also applied with respect to meta data obtained by recognizing the behavior of a person, animal, or the like and recording this recognized behavior by predetermined description. While in the embodiment of the present invention an image capturing apparatus is described as an example of content recording apparatus, the embodiment of the present invention can be also applied to another kind of content recording apparatus such as a mobile terminal for recording a content file. While in the embodiment of the present invention an image capturing apparatus is described as an example of content playback apparatus, the embodiment of the present invention can be also applied to another kind of content playback apparatus such as a DVD (Digital Versatile Disc) recorder for playing back content.

It should be understood that while the embodiment of the present invention has been illustrated as an example of implementing the present invention, and has a corresponding relationship to each of the invention specifying matters in the claims as described below, the present invention is not limited to this, and various modifications are possible without departing from the scope of the present invention.

That is, the content playback system corresponds to, for example, the image processing system 860. The content recording apparatus corresponds to, for example, the image capturing apparatus 100. The content playback apparatus corresponds to, for example, the image capturing apparatus 100. The image capturing apparatus corresponds to, for example, the image capturing apparatus 100.

The playback control means corresponds to, for example, the playback control section 882. Further, the playback means corresponds to, for example, the display section 883.

The content management file storing means corresponds to, for example, the content management file storing section 210.

The content inputting means corresponds to, for example, the content inputting section 210. Further, the virtual management information creating section corresponds to, for example, the virtual management information creating section 214.

The content attribute information creating means corresponds to, for example, the content attribute information creating section 216.

The recording control means corresponds to, for example, the recording control section 217.

The representative image extracting means corresponds to, for example, the representative thumbnail image extracting section 215.

The meta data creating means corresponds to, for example, the meta data creating section 213.

The content storing means corresponds to, for example, the content storing section 223.

The operation accepting means corresponds to, for example, the operation accepting section 221. Further, the selecting means corresponds to, for example, the selecting section 224.

The extracting means corresponds to, for example, the extracting section 225.

The rendering means corresponds to, for example, the rendering section 226.

The image capturing means corresponds to, for example, the camera section 110.

The content inputting step corresponds to, for example, step S901. The virtual management information creating step corresponds to, for example, step S910. The meta data creating step corresponds to, for example, step S905. The recording control step corresponds to, for example, steps S912 to S914.

The processing steps described in the embodiment of the present invention can be grasped as a method including a series of these steps. Further, the processing steps may be grasped also as a program for causing a computer to execute a series of these steps, or a recording medium that stores the program.

What is claimed is:

1. A content playback system comprising:

content inputting means for inputting content files;

content storing means for storing the inputted content files;

content management file storing means for storing a content management file that records hierarchical entries organized in a virtual hierarchical structure;

virtual management information creating means for creating virtual management information for virtually managing each of the inputted content files, on the basis of the content file;

meta data creating means for creating meta data related to each of the inputted content files, on the basis of the content file;

recording control means for recording file entries, which are the hierarchical entries including the created virtual management information, into the content management file, and records meta data entries, which are the hierarchical entries including the created meta data, at a lower hierarchical level than the file entries in the content management file;

extracting means for extracting a desired piece of meta data from the meta data included in each of the meta data entries recorded in the content management file, and extracting a content file stored in the content storing means on the basis of the virtual management information included in a file entry recorded at a higher hierarchical level than a meta data entry including the extracted meta data;

playback control means for controlling playback of the extracted content file on the basis of the extracted meta data; and playback means for playing back the extracted content file on the basis of control by the playback control means;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

2. A content recording apparatus comprising:

content management file storing means for storing a content management file that records hierarchical entries organized in a virtual hierarchical structure;

content inputting means for inputting content files;

virtual management information creating means for creating virtual management information for virtually managing each of the inputted content files, on the basis of the content file;

meta data creating means for creating meta data related to each of the inputted content files, on the basis of the content file; and recording control means for recording file entries, which are the hierarchical entries including the created virtual management information, into the content management file, and records meta data entries, which are the hierarchical entries including the created meta data, at a lower hierarchical level than the file entries in the content management file;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

3. The content recording apparatus according to claim 2, wherein the recording control means assigns to each of the hierarchical entries an entry identifier for identifying the hierarchical entry, records the entry identifier of each of the file entries to each of the meta data entries recorded at a lower hierarchical level than the file entries, and records the entry identifier of each of the meta data entries to each of the file entries recorded at a higher hierarchical level than the meta data entries.

4. The content recording apparatus according to claim 2, wherein the virtual management information includes a recording position of a content file corresponding to a file entry including the virtual management information on a file system.

5. The content recording apparatus according to claim 2, wherein the recording control means records, to the content management file, folder entries that are the hierarchical entries for sorting and managing the inputted content files, and sorts and records the created file entries at a lower hierarchical level than the folder entries.

6. The content recording apparatus according to claim 5, wherein the recording control means assigns to each of the hierarchical entries an entry identifier for identifying the hierarchical entry, records the entry identifier of each of the folder entries to each of the file entries recorded at a lower hierarchical level than the folder entries, and records the entry identifier of each of the file entries to each of the folder entries recorded at a higher hierarchical level than the file entries.

7. The content recording apparatus according to claim 2, wherein the content management file is stored under a directory different from the content files, and the directory is set to be invisible.

8. The content recording apparatus according to claim 2, wherein:

the content files are each an image content file; and the meta data recorded in each of the meta data entries includes at least positions and sizes of face images included in the image content file.

9. The content recording apparatus according to claim 2, wherein:

the recording control means records the meta data related to each of the content files to the content file.

10. The content recording apparatus according to claim 9, wherein:

if the content files are each a still image content file recorded by a DCF standard, the recording control means records the meta data related to the still image content file to a maker note in the still image content file.

11. The content recording apparatus according to claim 9, wherein:

if the content files are each a moving image content file, the meta data creating means creates the meta data related to the moving image content file for each of positions that satisfy a predetermined condition in the moving image content file; and the recording control means records, to the moving image content file, the meta data created for each of the positions that satisfy the predetermined condition with respect to the moving image content file.

12. The content recording apparatus according to claim 11, wherein:

if the content files are each a moving image content file encoded in AVC codec, the meta data creating means creates the meta data related to the moving image content file for each of IDR pictures or I pictures that is included in an AU to which an SPS is added; and the recording control means records the meta data created for each of the IDR pictures or I pictures with respect to the moving image content file, to SEI in the AU including the IDR picture or I picture.

13. The content recording apparatus according to claim 11, wherein:

when recording the meta data created at a predetermined interval with respect to the moving image content file to the moving image content file, the recording control means records the meta data to the moving image content file in accordance with a recording condition that is less restrictive than a recording condition that applies when recording the meta data to the content management file.

14. A content recording apparatus comprising:

content management file storing means for storing a content management file that records hierarchical entries organized in a virtual hierarchical structure;

content inputting means for inputting content files;

virtual management information creating means for creating virtual management information for virtually managing each of the inputted content files, on the basis of the content file;

content attribute information creating means for creating content attribute information as attribute information related to each of the inputted content files, on the basis of the content file; and recording control means for recording, to the content management file, file entries that are the hierarchical entries which store the created virtual management information and the created content attribute information in association with each other;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

15. The content recording apparatus according to claim 14, further comprising representative image extracting means for extracting from the inputted content files representative images of the content files, wherein:

the content management file includes a representative image file that records the extracted representative images;

the content attribute information creating means creates the content attribute information by adding recording positions of the representative images in the representative image file to the content attribute information related to the content files corresponding to the extracted representative images; and the recording control means records the extracted representative images to the representative image file included in the content management file.

16. A content playback apparatus comprising:

content storing means for storing content files;

content management file storing means for storing a content management file in which hierarchical entries organized in a virtual hierarchical structure are recorded, the content management file recording file entries that are the hierarchical entries including virtual management information for virtually managing each of the content files, and meta data entries that include meta data related to each of the content files and are the hierarchical entries at a lower hierarchical level than the file entries;

operation accepting means for accepting an operation input for selecting a desired piece of meta data from among the meta data included in each of the meta data entries recorded in the content management file;

selecting means for selecting, when the operation input for selecting the desired piece of meta data is accepted by the operation accepting means, a meta data entry including the selected meta data from among the meta data entries recorded in the content management file; and extracting means for extracting a content file recorded in the content storing means on the basis of the virtual management information included in a file entry recorded at a higher hierarchical level than the selected meta data entry;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

17. The content playback apparatus according to claim 16, wherein:

the content files are each an image content file;

the meta data includes positions and sizes of face images included in the image content file; and the extracting means extracts face images included in the extracted image content file on the basis of the meta data included in the selected meta data entry.

18. The content playback apparatus according to claim 16, wherein:

the content files are each a moving image content file;

the meta data includes positions and sizes of face images included in the moving image content file; and the extracting means extracts face images included in the extracted moving image content file on the basis of the meta data included in the selected meta data entry.

19. The content playback apparatus according to claim 18, further comprising rendering means for rendering the extracted face images, wherein:

the operation accepting means accepts an operation input for selecting a desired face image from among the rendered face images;

when the operation input for selecting the desired face image is accepted by the operation accepting means, the selecting means selects meta data corresponding to the selected face image from among the meta data entries recorded in the content management file; and the extracting means extracts from the extracted moving image content file a moving image recorded after a recording time of the face image corresponding to the selected meta data.

20. A content playback apparatus comprising:

content storing means for storing content files;

content management file storing means for storing a content management file in which hierarchical entries organized in a virtual hierarchical structure are recorded, the content management file recording file entries that are the hierarchical entries each storing virtual management information for virtually managing each of the content files, and content attribute information as attribute information related to each of the content files in association with each other;

operation accepting means for accepting an operation input for selecting a desired piece of content attribute information from among the content attribute information included in each of the file entries recorded in the content management file;

selecting means for selecting, when the operation input for selecting the desired piece of content attribute information is accepted by the operation accepting means, a file entry including the selected content attribute information from among the file entries recorded in the content management file; and extracting means for extracting a content file recorded in the content storing means on the basis of the virtual management information included in the selected file entry;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

21. The content playback apparatus according to claim 20, wherein:

the content management file includes a representative image file that records representative images that are images included in the content files;

the content attribute information includes recording positions of the representative images in the representative image file;

the content playback apparatus further comprises rendering means for rendering the representative images recorded in the representative image file;

the operation accepting means accepts an operation input for selecting a desired representative image from among the rendered representative images;

when the operation input for selecting the desired representative image is accepted by the operation accepting means, the selecting means selects a file entry corresponding to the selected representative image from among the file entries recorded in the content management file; and the extracting means extracts a content file stored in the content storing means on the basis of the virtual management information included in the selected file entry.

22. The content playback apparatus according to claim 20, wherein:

in the content management file, meta data entries that are the hierarchical entries including meta data related to each of the content files are recorded at a lower hierarchical level than the file entries corresponding to the content files; and the extracting means extracts meta data included in a meta data entry recorded at a lower hierarchical level than the selected file entry, and extracts a predetermined portion corresponding to the extracted meta data from the extracted content file.

23. An image capturing apparatus comprising:

image capturing means for capturing an image of a subject;

content inputting means for inputting content files each corresponding to the image captured by the image capturing means;

content management file storing means for storing a content management file that records hierarchical entries organized in a virtual hierarchical structure;

virtual management information creating means for creating virtual management information for virtually managing each of the inputted content files, on the basis of the content file;

meta data creating means for creating meta data related to each of the inputted content files, on the basis of the content file; and recording control means for recording file entries, which are the hierarchical entries including the created virtual management information, into the content management file, and records meta data entries, which are the hierarchical entries including the created meta data, at a lower hierarchical level than the file entries in the content management file;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

24. A content recording method for a content recording apparatus including content management file storing means for storing a content management file that records hierarchical entries organized in a virtual hierarchical structure, comprising the steps of:

inputting content files;

creating virtual management information for virtually managing each of the inputted content files, on the basis of the content file;

creating meta data related to each of the inputted content files, on the basis of the content file; and recording file entries, which are the hierarchical entries including the created virtual management information, into the content management file, and records meta data entries, which are the hierarchical entries including the created meta data, at a lower hierarchical level than the file entries in the content management file;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

25. A non-transitory computer program product having computer readable instructions stored thereon for a content recording apparatus including content management file storing means for storing a content management file that records hierarchical entries organized in a virtual hierarchical structure, the computer readable instructions when executed by a computer causing the computer to execute the steps of:

inputting content files;

creating virtual management information for virtually managing each of the inputted content files, on the basis of the content file;

creating meta data related to each of the inputted content files, on the basis of the content file; and recording file entries, which are the hierarchical entries including the created virtual management information, into the content management file, and records meta data entries, which are the hierarchical entries including the created meta data, at a lower hierarchical level than the file entries in the content management file;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

26. A content playback system comprising:

a content inputting section that inputs content files;

a content storing section that stores the inputted content files;

a content management file storing section that stores a content management file that records hierarchical entries organized in a virtual hierarchical structure;

a virtual management information creating section that creates virtual management information for virtually managing each of the inputted content files, on the basis of the content file;

a meta data creating section that creates meta data related to each of the inputted content files, on the basis of the content file;

a recording control section that records file entries, which are the hierarchical entries including the created virtual management information, into the content management file, and records meta data entries, which are the hierarchical entries including the created meta data, at a lower hierarchical level than the file entries in the content management file;

an extracting section that extracts a desired piece of meta data from the meta data included in each of the meta data entries recorded in the content management file, and extracting a content file stored in the content storing section on the basis of the virtual management information included in a file entry recorded at a higher hierarchical level than a meta data entry including the extracted meta data;

a playback control section that controls playback of the extracted content file on the basis of the extracted meta data; and a playback section that plays back the extracted content file on the basis of control by the playback control section;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

27. A content recording apparatus comprising:

a content management file storing section that stores a content management file that records hierarchical entries organized in a virtual hierarchical structure;

a content inputting section that inputs content files;

a virtual management information creating section that creates virtual management information for virtually managing each of the inputted content files, on the basis of the content file;

a meta data creating section that creates meta data related to each of the inputted content files, on the basis of the content file; and a recording control section that records file entries, which are the hierarchical entries including the created virtual management information, into the content management file, and records meta data entries, which are the hierarchical entries including the created meta data, at a lower hierarchical level than the file entries in the content management file;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

28. A content recording apparatus comprising:

a content management file storing section that stores a content management file that records hierarchical entries organized in a virtual hierarchical structure;

a content inputting section that inputs content files;

a virtual management information creating section that creates virtual management information for virtually managing each of the inputted content files, on the basis of the content file;

a content attribute information creating section that creates content attribute information as attribute information related to each of the inputted content files, on the basis of the content file; and a recording control section that records, to the content management file, file entries that are the hierarchical entries which store the created virtual management information and the created content attribute information in association with each other;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

29. A content playback apparatus comprising:

a content storing section that stores content files;

a content management file storing section that stores a content management file in which hierarchical entries organized in a virtual hierarchical structure are recorded, the content management file recording file entries that are the hierarchical entries including virtual management information for virtually managing each of the content files, and meta data entries that include meta data related to each of the content files and are the hierarchical entries at a lower hierarchical level than the file entries;

an operation accepting section that accepts an operation input for selecting a desired piece of meta data from among the meta data included in each of the meta data entries recorded in the content management file;

a selecting section that selects, when the operation input for selecting the desired piece of meta data is accepted by the operation accepting section, a meta data entry including the selected meta data from among the meta data entries recorded in the content management file; and an extracting section that extracts a content file recorded in the content storing section on the basis of the virtual management information included in a file entry recorded at a higher hierarchical level than the selected meta data entry;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

30. A content playback apparatus comprising:

a content storing section that stores content files;

a content management file storing section that stores a content management file in which hierarchical entries organized in a virtual hierarchical structure are recorded, the content management file recording file entries that are the hierarchical entries each storing virtual management information for virtually managing each of the content files, and content attribute information as attribute information related to each of the content files in association with each other;

an operation accepting section that accepts an operation input for selecting a desired piece of content attribute information from among the content attribute information included in each of the file entries recorded in the content management file;

a selecting section that selects, when the operation input for selecting the desired piece of content attribute information is accepted by the operation accepting section, a file entry including the selected content attribute information from among the file entries recorded in the content management file; and an extracting section that extracts a content file recorded in the content storing section on the basis of the virtual management information included in the selected file entry;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

31. An image capturing apparatus comprising:

an image capturing section that captures an image of a subject;

a content inputting section that inputs content files each corresponding to the image captured by the image capturing section;

a content management file storing section that stores a content management file that records hierarchical entries organized in a virtual hierarchical structure;

a virtual management information creating section that creates virtual management information for virtually managing each of the inputted content files, on the basis of the content file;

a meta data creating section that creates meta data related to each of the inputted content files, on the basis of the content file; and a recording control section that records file entries, which are the hierarchical entries including the created virtual management information, into the content management file, and records meta data entries, which are the hierarchical entries including the created meta data, at a lower hierarchical level than the file entries in the content management file;

wherein each of the hierarchical entries is a hierarchical entry including at least one slot that are each a physically fixed-length data area;

the slot is sequentially recorded into a property file included in the content management file; and an entry identifier assigned to each of the hierarchical entries to identify the hierarchical entry is an entry number assigned in accordance with an ordinal number of the slot constituting the hierarchical entry as counted from the top of the slots recorded in the property file.

* * * * *